(12) United States Patent
Ryu et al.

(10) Patent No.: US 11,740,786 B2
(45) Date of Patent: Aug. 29, 2023

(54) USER TERMINAL DEVICE AND CONTROL METHOD THEREOF

(71) Applicant: SAMSUNG ELECTRONICS CO., LTD., Suwon-si (KR)

(72) Inventors: Jong-hyun Ryu, Daejeon (KR); Youn-ho Choi, Seoul (KR); Yong-Ho Kim, Seoul (KR); Jin La, Suwon-si (KR); Yong-gook Park, Yongin-si (KR); Yu-dong Bae, Suwon-si (KR); Ae-young Lim, Yongin-si (KR); Kyung-ho Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/940,028

(22) Filed: Jul. 27, 2020

(65) Prior Publication Data

US 2020/0356265 A1    Nov. 12, 2020

Related U.S. Application Data

(63) Continuation of application No. 16/404,338, filed on May 6, 2019, now Pat. No. 10,747,431, which is a
(Continued)

(30) Foreign Application Priority Data

Jan. 26, 2015  (KR) .................. 10-2015-0012069
Jan. 26, 2015  (KR) .................. 10-2015-0012126
(Continued)

(51) Int. Cl.
*G06F 3/04886*    (2022.01)
*G06F 3/04883*    (2022.01)
(Continued)

(52) U.S. Cl.
CPC .......... *G06F 3/04886* (2013.01); *G06F 1/165* (2013.01); *G06F 1/1626* (2013.01);
(Continued)

(58) Field of Classification Search
CPC ............ G06F 3/03; G06F 3/14; G06F 3/0481
(Continued)

(56) References Cited

U.S. PATENT DOCUMENTS 4,979,554 A    12/1990 Nelson
5,486,871 A    1/1996 Filliman et al.
(Continued)

FOREIGN PATENT DOCUMENTS

| CN | 101183292 A | 5/2008 |
| CN | 101212752 A | 7/2008 |

(Continued)

OTHER PUBLICATIONS

Communication dated Oct. 9, 2020 issued by the European Intellectual Property Office in European Application No. 16 182 538.5.
(Continued)

*Primary Examiner* — Calvin C Ma
(74) *Attorney, Agent, or Firm* — Sughrue Mion, PLLC

(57) ABSTRACT

A portable device having a display, the display including a main surface area, a first curved surface area extending from a first side of the main surface area, and a second curved surface area extending from a second side of the main surface area that is opposite the first side, a sensor configured to detect a state of the portable device, and a controller configured to control the display to display a user interface (UI) on one of the first curved surface and the second curved surface based on the state detected by the sensor.

30 Claims, 143 Drawing Sheets

Related U.S. Application Data continuation of application No. 15/207,206, filed on Jul. 11, 2016, now Pat. No. 10,331,341, which is a continuation of application No. 14/745,926, filed on Jun. 22, 2015, now Pat. No. 9,710,161.

(60) Provisional application No. 62/115,864, filed on Feb. 13, 2015, provisional application No. 62/097,223, filed on Dec. 29, 2014.

(30) Foreign Application Priority Data

Feb. 23, 2015 (KR) ........................ 10-2015-0025157
Mar. 16, 2015 (KR) ........................ 10-2015-0035825

(51) Int. Cl.
| | |
|---|---|
| G06F 3/00 | (2006.01) |
| G06F 3/0482 | (2013.01) |
| G06F 3/04817 | (2022.01) |
| G06F 3/0354 | (2013.01) |
| G06F 3/01 | (2006.01) |
| G06F 3/0481 | (2022.01) |
| G06F 1/16 | (2006.01) |
| G06F 3/0488 | (2022.01) |
| H04M 1/72454 | (2021.01) |
| H04M 1/02 | (2006.01) |
| G06F 3/04847 | (2022.01) |
| G06F 3/16 | (2006.01) |

(52) U.S. Cl.
CPC .......... *G06F 1/1647* (2013.01); *G06F 1/1692* (2013.01); *G06F 1/1694* (2013.01); *G06F 3/002* (2013.01); *G06F 3/013* (2013.01); *G06F 3/017* (2013.01); *G06F 3/03545* (2013.01); *G06F 3/0481* (2013.01); *G06F 3/0482* (2013.01); *G06F 3/0488* (2013.01); *G06F 3/04817* (2013.01); *G06F 3/04847* (2013.01); *G06F 3/04883* (2013.01); *G06F 3/165* (2013.01); *H04M 1/0269* (2022.02); *H04M 1/72454* (2021.01); *G06F 2200/1614* (2013.01); *G06F 2200/1637* (2013.01); *G06F 2203/04803* (2013.01); *G06F 2203/04807* (2013.01); *G06F 2203/04808* (2013.01); *H04M 2250/16* (2013.01)

(58) Field of Classification Search
USPC .................................. 345/1.3, 173, 174, 156
See application file for complete search history.

(56) References Cited

U.S. PATENT DOCUMENTS

| | | | |
|---|---|---|---|
| 7,023,490 B2 | 4/2006 | Konuma | |
| 7,075,587 B2 | 7/2006 | Lee | |
| 7,224,401 B2 | 5/2007 | Ackley et al. | |
| 7,705,833 B2 | 4/2010 | Kim | |
| 8,098,328 B2 | 1/2012 | Fujisawa et al. | |
| 8,098,868 B2 | 1/2012 | Kim et al. | |
| 8,543,166 B2 | 9/2013 | Choi et al. | |
| 8,817,189 B2 | 8/2014 | Freund et al. | |
| 8,958,026 B2 | 2/2015 | Park et al. | |
| 8,988,381 B1 | 3/2015 | Kim et al. | |
| 9,076,364 B2 | 7/2015 | Hung et al. | |
| 9,116,662 B1 | 8/2015 | Song et al. | |
| 9,189,101 B2 | 11/2015 | Park et al. | |
| 9,307,658 B2 | 4/2016 | Song et al. | |
| 9,299,314 B2 | 5/2016 | Lee et al. | |
| 9,466,265 B2 | 10/2016 | Cho et al. | |
| 9,489,078 B2 | 11/2016 | Seo et al. | |
| 9,733,815 B2 | 8/2017 | Xia et al. | |
| 9,778,766 B2 | 10/2017 | Choi et al. | |
| 2002/0047918 A1 | 4/2002 | Sullivan | |
| 2004/0008191 A1 | 1/2004 | Poupyrev et al. | |
| 2007/0052851 A1 | 3/2007 | Ochs et al. | |
| 2008/0069384 A1 | 3/2008 | Kim et al. | |
| 2008/0088740 A1 | 4/2008 | Kondo | |
| 2008/0119237 A1 | 5/2008 | Kim | |
| 2008/0158189 A1 | 7/2008 | Kim | |
| 2008/0186415 A1 | 8/2008 | Boud et al. | |
| 2008/0263472 A1 | 10/2008 | Thukral et al. | |
| 2009/0091578 A1 | 4/2009 | Carnahan et al. | |
| 2010/0048252 A1 | 2/2010 | Kang et al. | |
| 2010/0056223 A1 | 3/2010 | Choi et al. | |
| 2010/0060548 A1* | 3/2010 | Choi ................... | G06F 3/04886 345/1.3 |
| 2010/0117975 A1 | 5/2010 | Cho | |
| 2010/0182265 A1 | 7/2010 | Kim et al. | |
| 2010/0188422 A1 | 7/2010 | Shingai et al. | |
| 2010/0247061 A1 | 9/2010 | Bennett et al. | |
| 2010/0302445 A1 | 12/2010 | Kunihara | |
| 2011/0065479 A1 | 3/2011 | Nader | |
| 2011/0095975 A1 | 4/2011 | Hwang et al. | |
| 2011/0134144 A1 | 6/2011 | Moriwaki | |
| 2011/0148772 A1 | 6/2011 | Oksman et al. | |
| 2011/0148930 A1 | 6/2011 | Lee et al. | |
| 2012/0072953 A1 | 3/2012 | James et al. | |
| 2012/0075166 A1 | 3/2012 | Marti et al. | |
| 2012/0169609 A1 | 7/2012 | Britton | |
| 2012/0188153 A1 | 7/2012 | Tziortzis | |
| 2012/0235894 A1 | 9/2012 | Phillips | |
| 2012/0274575 A1 | 11/2012 | Solomon et al. | |
| 2013/0076605 A1 | 3/2013 | Cope et al. | |
| 2013/0076649 A1 | 3/2013 | Myers et al. | |
| 2013/0111384 A1 | 5/2013 | Kim et al. | |
| 2013/0114193 A1 | 5/2013 | Joo et al. | |
| 2013/0127912 A1 | 5/2013 | Lin | |
| 2013/0155655 A1 | 6/2013 | Lee et al. | |
| 2013/0169545 A1 | 7/2013 | Eaton et al. | |
| 2013/0176232 A1 | 7/2013 | Waeller | |
| 2013/0176248 A1 | 7/2013 | Shin et al. | |
| 2013/0178248 A1 | 7/2013 | Kim | |
| 2013/0207946 A1 | 8/2013 | Kim et al. | |
| 2013/0215041 A1 | 8/2013 | Kim et al. | |
| 2013/0222271 A1 | 8/2013 | Alberth et al. | |
| 2013/0278873 A1 | 10/2013 | Enomoto | |
| 2013/0300682 A1 | 11/2013 | Choi et al. | |
| 2013/0300697 A1 | 11/2013 | Kim et al. | |
| 2013/0314341 A1* | 11/2013 | Lee ....................... | G06F 3/0481 345/173 |
| 2013/0321264 A1 | 12/2013 | Park et al. | |
| 2013/0321340 A1 | 12/2013 | Seo et al. | |
| 2013/0321434 A1 | 12/2013 | Ko et al. | |
| 2014/0028597 A1 | 1/2014 | Cho et al. | |
| 2014/0071043 A1 | 3/2014 | Jung et al. | |
| 2014/0089833 A1 | 3/2014 | Hwang et al. | |
| 2014/0092356 A1 | 4/2014 | Ahn et al. | |
| 2014/0118258 A1 | 5/2014 | Park et al. | |
| 2014/0118271 A1 | 5/2014 | Lee et al. | |
| 2014/0132481 A1 | 5/2014 | Bell et al. | |
| 2014/0183473 A1 | 7/2014 | Lee et al. | |
| 2014/0191956 A1 | 7/2014 | Suo | |
| 2014/0218321 A1 | 8/2014 | Lee et al. | |
| 2014/0226266 A1 | 8/2014 | Kang et al. | |
| 2014/0226275 A1 | 8/2014 | Ko et al. | |
| 2014/0232668 A1 | 8/2014 | Kim | |
| 2014/0240289 A1 | 8/2014 | Myers et al. | |
| 2014/0247252 A1 | 9/2014 | Lee | |
| 2014/0247405 A1 | 9/2014 | Jin et al. | |
| 2014/0267097 A1 | 9/2014 | Lee et al. | |
| 2014/0268623 A1 | 9/2014 | Kim et al. | |
| 2014/0285433 A1 | 9/2014 | Park et al. | |
| 2014/0285450 A1 | 9/2014 | Cho et al. | |
| 2014/0300557 A1 | 10/2014 | Cho et al. | |
| 2014/0351748 A1 | 11/2014 | Xia et al. | |
| 2014/0354791 A1 | 12/2014 | Lee et al. | |
| 2014/0375219 A1 | 12/2014 | Lee et al. | |
| 2014/0376163 A1 | 12/2014 | Song et al. | |
| 2015/0009125 A1 | 1/2015 | Kim et al. | |
| 2015/0029166 A1 | 1/2015 | Park et al. | |

(56) References Cited

U.S. PATENT DOCUMENTS

| | | | |
|---|---|---|---|
| 2015/0035812 | A1 | 2/2015 | Shin et al. |
| 2015/0049090 | A1 | 2/2015 | Kim et al. |
| 2015/0103002 | A1 | 4/2015 | Yoon et al. |
| 2015/0130775 | A1 | 5/2015 | Kim et al. |
| 2015/0163445 | A1 | 6/2015 | Park et al. |
| 2015/0185761 | A1 | 7/2015 | Song et al. |
| 2015/0185911 | A1 | 7/2015 | Kim |
| 2015/0187325 | A1 | 7/2015 | Yeo et al. |
| 2015/0241925 | A1 | 8/2015 | Seo et al. |
| 2015/0242006 | A1 | 8/2015 | Kim et al. |
| 2015/0294438 | A1 | 10/2015 | Kang |
| 2015/0301672 | A1 | 10/2015 | Kim et al. |
| 2015/0301738 | A1 | 10/2015 | Nishigaki |
| 2015/0317949 | A1 | 11/2015 | Cho |
| 2015/0334211 | A1* | 11/2015 | Shin ............... G06F 1/1637 455/566 |
| 2015/0370423 | A1 | 12/2015 | Liu |
| 2016/0006862 | A1* | 1/2016 | Park ............... G06F 1/1626 455/411 |
| 2016/0041680 | A1* | 2/2016 | Chi ............... G06F 3/0346 345/173 |
| 2016/0054796 | A1 | 2/2016 | Cho |
| 2016/0055006 | A1 | 2/2016 | In et al. |
| 2021/0011610 | A1 | 1/2021 | Hwang et al. |

FOREIGN PATENT DOCUMENTS

| | | | |
|---|---|---|---|
| CN | 201248078 | Y | 5/2009 |
| CN | 101656788 | A | 2/2010 |
| CN | 103197879 | A | 7/2013 |
| CN | 103324435 | A | 9/2013 |
| CN | 103389866 | A | 11/2013 |
| CN | 103677627 | A | 3/2014 |
| CN | 103744586 | A | 4/2014 |
| CN | 103793167 | A | 5/2014 |
| CN | 104077061 | A | 10/2014 |
| CN | 104115095 | A | 10/2014 |
| CN | 104160632 | A | 11/2014 |
| EP | 1 923 778 | A2 | 5/2008 |
| EP | 2701049 | A2 | 2/2014 |
| EP | 2 711 821 | A1 | 3/2014 |
| EP | 2 725 474 | | 4/2014 |
| EP | 2728437 | A2 | 5/2014 |
| EP | 2 830 293 | A1 | 1/2015 |
| EP | 2947538 | A2 | 11/2015 |
| JP | 2014-99764 | | 5/2014 |
| KR | 10-2008-0025558 | | 3/2008 |
| KR | 10-2010-0027501 | A | 3/2010 |
| KR | 10-2011-0112943 | A | 10/2011 |
| KR | 10-2013-0081617 | A | 7/2013 |
| KR | 10-2013-0127050 | | 11/2013 |
| KR | 10-2014-0040975 | | 4/2014 |
| KR | 10-2014-0054746 | | 5/2014 |
| KR | 10-2014-0086712 | A | 7/2014 |
| KR | 10-2014-0101274 | | 8/2014 |
| KR | 10-2014-0106285 | A | 9/2014 |
| KR | 10-2014-0120470 | A | 10/2014 |
| WO | 2012/108668 | A2 | 8/2012 |
| WO | 2012/108668 | A3 | 8/2012 |
| WO | 2013/103278 | A1 | 7/2013 |
| WO | 2013/118941 | A1 | 8/2013 |
| WO | 2014/175513 | | 10/2014 |

OTHER PUBLICATIONS

Communication dated Oct. 9, 2020 issued by the European Intellectual Property Office in European Application No. 19 195 701.8.
Communication dated Dec. 22, 2020 issued by the Korean Intellectual Property Office in Korean Application No. 10-2015-0035825.
Communication dated Apr. 17, 2015 issued by the Korean Intellectual Property Office in counterpart Korean Patent Application No. 10-2015-0012069, 7 pages in English and Korean.
International Search Report dated Mar. 14, 2016 in International Application No. PCT/KR2015/012891.
International Search Report dated Apr. 15, 2016 in International Application No. PCT/KR2015/014346.
Communication dated Apr. 29, 2016 issued by the European Intellectual Property Office in counterpart European Application No. 15196816.1.
International Search report dated May 24, 2016 in the International Application No. PCT/KR2015/014342.
Office Action dated Jul. 19, 2016, issued by the United States Patent and Trademark Office in U.S. Appl. No. 14/837,185.
Notice of Allowance dated Aug. 24, 2016, issued by the United States Patent and Trademark Office in U.S. Appl. No. 14/826,317.
Office Action dated Dec. 30, 2015, issued by the United States Patent and Trademark Office in U.S. Appl. No. 14/837,185.
Communication dated Oct. 31, 2016, issued by the European Patent Office in counterpart European Application No. 16182538.5.
Office Action dated Oct. 27, 2016, issued by the United States Patent and Trademark Office in U.S. Appl. No. 14/837,185.
Communication dated Mar. 28, 2017, issued by the European Patent Office in counterpart European Application No. 15196816.1.
Office Action dated Mar. 30, 2017, issued by the United States Patent and Trademark Office U.S. Appl. No. 14/953,670.
Communication dated Jul. 3, 2018, issued by the State Intellectual Property Office of P.R. China in counterpart Chinese Application No. 201510906432.3.
Communication dated Jul. 3, 2018, issued by the State Intellectual Property Office of P.R. China in counterpart Chinese Application No. 201610585781.4.
Communication dated Jul. 10, 2018, issued by the European Patent Office in counterpart European Application No. 15196816.1.
Communication dated Jul. 9, 2018, issued by the European Patent Office in counterpart European Application No. 16182538.5.
Communication dated Dec. 28, 2018, issued by the State Intellectual Property Office of P.R. China in counterpart Chinese Application No. 201510906432.3.
Communication dated Jan. 4, 2019, issued by the State Intellectual Property Office of P.R. China in counterpart Chinese Application No. 201610585781.4.
Office Action dated Mar. 26, 2019, issued by the United States Patent and Trademark Office U.S. Appl. No. 15/864,354.
Communication dated May 21, 2019, issued by the State Intellectual Property Office of P.R. China in counterpart Chinese Application No. 201610585781.4.
Communication dated Nov. 26, 2019 issued by the European Patent Office in counterpart European Application No. 19195701.8.
Communication dated Nov. 26, 2019 issued by the European Patent Office in counterpart European Application No. 16 182 538.5.
Communication dated Dec. 4, 2019, issued by the Indian Patent Office in counterpart Indian Application No. 3640/DEL/2015.
Communication dated Aug. 4, 2021 issued by the Indian Patent Office in counterpart Indian Application No. 201915025922.
Communication dated Aug. 5, 2021 issued by the Indian Patent Office in counterpart Indian Application No. 202015009094.
Communication dated Mar. 30, 2022 issued by the Chinese Patent Office in CN Application No. 201910659777.1.
Communication dated Dec. 6, 2021 issued by the Korean Intellectual Property Office in counterpart Korean Application No. 10-2021-0127898.
Communication dated Sep. 7, 2022 issued by the China National Intellectual Property Administration in Chinese Patent Application No. 201910659777.1.
Communication dated Jan. 9, 2023, issued by the State Intellectual Property Office of the People's Republic of China in counterpart Chinese Application No. 201910659777.1.
Communication dated Jan. 24, 2023, issued by the European Patent Office in counterpart European Application No. 22194752.6.

* cited by examiner

5610

5620

5630

USER TERMINAL DEVICE AND CONTROL METHOD THEREOF

CROSS-REFERENCE TO RELATED APPLICATIONS

This application is a continuation of U.S. patent application Ser. No. 16/404,338, filed on May 6, 2019, in the U.S. Patent and Trademark Office, which is a continuation of U.S. patent application Ser. No. 15/207,206, filed on Jul. 11, 2016, in the U.S. Patent and Trademark Office, now U.S. Pat. No. 10,331,341, issued on Jun. 25, 2019, which is a continuation of U.S. patent application Ser. No. 14/745,926, filed on Jun. 22, 2015, in the U.S. Patent and Trademark Office, now U.S. Pat. No. 9,710,161, issued on Jul. 18, 2017, which (1) claims priority from (i) Korean Patent Application Nos. 10-2015-0012126 and 10-2015-0012069, respectively filed on Jan. 26, 2015, in the Korean Intellectual Property Office, (ii) Korean Patent Application No. 10-2015-0025157, filed on Feb. 23, 2015, in the Korean Intellectual Property Office, and (iii) Korean Patent Application No. 10-2015-0035825, filed on Mar. 16, 2015, in the Korean Intellectual Property Office, and (2) claims the benefit of (i) U.S. Provisional Patent Application No. 62/097,223, filed on Dec. 29, 2014, in the U.S. Patent and Trademark Office, and (ii) U.S. Provisional Patent Application No. 62/115,864, filed on Feb. 13, 2015, in the United States Patent and Trademark Office, the disclosures of which are incorporated herein by reference in their entireties.

BACKGROUND

1. Field

Devices and methods consistent with exemplary embodiments relate to a user terminal device and a control method thereof, and more particularly, to a user terminal device configured to receive an input of user interactions, using a curved display which includes a main region, a first sub region extended from the main region and bent toward a first side of the user terminal device, and a second sub region extended from the main region and bent toward a second side of the user terminal device, and a control method thereof.

2. Description of the Related Art

With the development of the electronic technology, various types of user terminal devices have been developed and distributed. Recently, demands for the user terminal devices have further increased, as the devices are minimized and equipped with numerous functions.

The user terminal device can provide a variety of contents, such as multimedia contents or application screens, in response to user's request. The user can select a desired function using buttons or touch screen provided on the user terminal device. The user terminal device can selectively execute programs in response to interactions with a user and display a result of the executing.

Meanwhile, as the functions provided in the user terminal device are increasingly varied, needs for various ways of displaying contents or controlling user interactions have emerged. That is, as the types and functions of the contents increase, the conventional interaction, i.e., selecting buttons or touching on touch screen, sometimes do not provide desired interaction.

Accordingly, a user interaction technology is necessary, which allows a user to more conveniently utilize a user terminal device.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an aspect of an exemplary embodiment, there is provided a portable device including a display, the display including a main surface area, a first curved surface area extending from a first side of the main surface area, and a second curved surface area extending from a second side of the main surface area that is opposite the first side, a sensor configured to detect a state of the portable device, and a controller configured to control the display to display a user interface (UI) on one of the first curved surface and the second curved surface based on the state detected by the sensor.

The sensor may include a gyroscope and the state comprises an orientation of the portable terminal detected by the gyroscope.

The state may include a first state corresponding to a first orientation detected by the gyroscope and a second state corresponding to a second orientation detected by the gyroscope.

The first orientation may include a horizontal orientation and the second orientation comprises a vertical orientation.

The controller may further control the display to switch display of the UI from the one of the first curved surface and the second curved surface to another one of the first curved surface and the second curved surface based on a change in the orientation detected by the gyroscope.

The change in orientation may include a change in an angle of the orientation along an axis of rotation about which the portable device rotates.

The controller may further control the display to display an application in the main surface area, and the UI may include a UI of the application.

The UI of the application may include event information of an event corresponding to the application.

The UI of the application may include at least one graphical UI element for controlling a function of the application.

The main surface area may be flat.

As described above, according to various embodiments, the user terminal device provides various user experiences, by using a plurality of sub regions included in the curved device. Accordingly, user convenience and satisfaction are enhanced.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
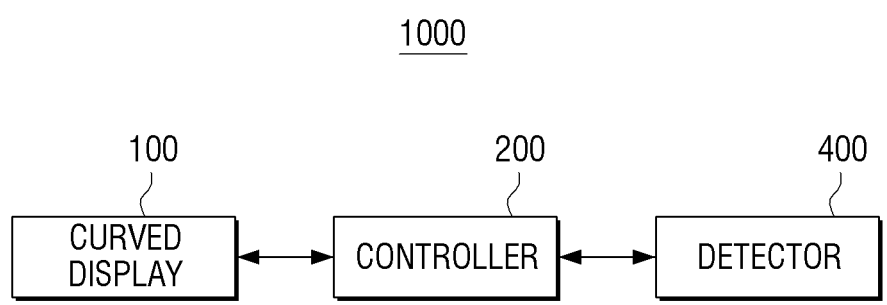
FIG. 1 is a schematic block diagram of a user terminal device according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

The terms such as "first" and "second" may be used herein to describe various elements, but should not be construed as limiting the elements. Terms should be used only to distinguish one element from the other.

The terms and expressions are used herein only to describe specific embodiments, but not intended to limit the scope of the disclosure. A singular form may include a plural form, unless otherwise stated specifically. As used herein, it should be understood that the expression "comprise" or "consist of" intends to designate existence of characteristics, numbers, steps, operations, elements, components or combinations thereof, but not to foreclose existence or possibility of addition of one or more other characteristics, numbers, steps, operations, elements, components or combinations thereof.

Throughout the embodiments, "module" or "unit" is the one that is configured to perform one or more functions or operations, and may be implemented as a combination of hardware and software. Further, a plurality of "modules" or a plurality of "units" may be integrated, except for the "modules" or "units" which do not have to be implemented on specific hardware, into one or more modules and implemented as one processor (not illustrated).

Further, throughout the embodiments, a 'user interface (UI)' may include one or more of configuration to receive user interactions and configurations indicating notification information. The UI may include a UI element and the UI element may include not only an element that can interact with a user to provide visual, auditory or olfactory feedbacks, but also an element that provides notification information. The UI element may be expressed in one of image, text and video forms, or an area which does not display the information mentioned above, but is capable of providing feedback in response to user input may be considered a UI element.

Certain exemplary embodiments will be explained below with reference to the accompanying drawings.

FIG. 1 is a block diagram illustrating a basic configuration of a user terminal device 1000, which is provided to explain various embodiments. Referring to FIG. 1, the user terminal device 1000 includes a curved display 100, a detector 400 and a controller 200. Meanwhile, the user terminal device 1000 may be implemented as various types of devices including, to be specific, TV, PC, laptop PC, mobile phone, tablet PC, PDA, MP3 player, kiosk, electronic frame, or table display. When implemented as a mobile type device, such as mobile phone, tablet PC, PDA, MP3 player or laptop PC, the user terminal device 1000 may be named as a "mobile terminal" or "portable terminal," although this will be collectively referred to as a "user terminal device" throughout the description.

The curved display 100 may be divided into a main region (e.g., main display area, main display region) and a plurality of sub regions (e.g., sub display regions, sub display areas, auxiliary display regions, auxiliary display areas). The 'main region' and 'sub region' may be defined in various ways. For example, one in relatively larger size among the regions may be defined as a main region, while the other smaller one may be defined as a sub region. Or, a main region may be the region that is placed on the same plane (i.e., flat plane) as a home button to return to home screen or as a front speaker, while the sub region may be the one that is placed on a side (i.e., area adjacent to or connecting with the flat plane). Or, the main region may represent the region where it is possible to directly control the UI in the region, while the sub region may represent the region where it is possible to control the UI of the main region.

In certain exemplary embodiment, the curved display 100 may include a main region provided on a front surface of the user terminal device 100, a first sub region extended from the main region and bent toward a first side of the user terminal device 1000, and a second sub region extended from the main region and bent toward a second side of the user terminal device 1000. Meanwhile, the first and second sub regions may include only the regions that are bent to a direction of the sides of the user terminal device 100 and fixed, but not limited thereto. Accordingly, the first and second sub regions may include not only the regions that are bent toward the sides of the user terminal device 1000 and fixed, but also portion of planar (flat) area positioned in front (i.e., front surface) of the user terminal device 1000.

In the above example, the plurality of sub regions may each have area smaller than the main region. Further, the plurality of sub regions may form different planes than the main region. For example, when the main region is arranged on a front surface of the user terminal device 1000, one or more sub regions may be arranged on different surfaces, such as right side surface, left side surface, upper side surface or lower side surface, among the surfaces that form an outer shape of the user terminal device 1000. The surface including the main region and the surface including one or more sub regions may be fixed so as to form obtuse angle therebetween. Shapes, positions and number of the sub regions may vary depending on embodiments. This will be explained in detail below in the relevant description with reference to the drawings. Meanwhile, when the sub regions are on a side surface among the surfaces forming the outer shape of the terminal device 1000, the sub region may be referred to as an "edge region."

The detector 400 detects motion of the user terminal device 1000. The detector 400 may particularly detect a rotational motion of the user terminal device 1000 using a plurality of sensors. To be specific, the detector 400 may use a tilt detecting sensor, such as a gyro sensor or acceleration sensor, to detect rotational tilting and variation in the tilting (i.e., rotational motion) on x, y, and z axes of the user terminal device 1000.

The controller 200 may control the overall functions of the user terminal device 1000 using the main region and a plurality of sub regions of the curved display 100.

That is, the controller 200 may control the curved display 100 to display a user interface (UI) on one or more of the plurality of sub regions, in response to a motion of the user terminal device 1000 detected through the detector 400. First, the controller 200 may acquire information about the rotational motion of the user terminal device 1000 through the detector 400.

Additionally, the controller 200 may determine a sub region on which to display the UI, among the plurality of sub regions, according to the motion of the user terminal device 1000. The controller 200 may then control the curved display 100 to display the UI on the determined sub region. At this time, the UI may include UI elements to control the user terminal device 1000, UI elements to control application or UI elements that includes event information, but is not limited thereto.

In one embodiment, when the first UI is provided on the first sub region and the second UI is provided on the second sub region, in response to detecting a rotational movement beyond a preset angle in a first direction, the controller 200 may control the curved display 100 to remove the first UI provided on the first sub region and to provide only the second UI on the second sub region. Then, while the second UI is provided on the second sub region, in response to detecting a rotational motion beyond a preset angle in a second direction which is opposite to the first direction, the controller 200 may control the curved display 100 to remove the second UI provided on the first sub region and to again control display of the first UI on the first sub region.

In another embodiment, while the first UI is provided only on the first sub region, in response to detecting a rotational motion of the user terminal device 1000, the controller 200 may control the curved display 100 to remove the first UI provided on the first sub region and to provide the first UI on the second sub region. When a screen to execute an application is displayed on the main region, the first UI may include a UI element to control the application.

In yet another embodiment, after a notification event is detected, in response to detecting a rotational motion of the user terminal device 1000, the controller 200 may control the curved display 100 to provide a notification UI corresponding to the notification event on either the first sub region or the second sub region, in accordance with the rotational motion. The notification event may include one of message reception event indicating reception of a message, e-mail reception event indicating reception of e-mail, SNS reception event indicating reception of SNS, phone call request event indicating reception of a phone call, push service information reception event indicating reception of a push notification, notification event indicating reception or occurrence of an event, and battery amount notification event indicating a battery notification related to battery usage.

While the notification UI is being provided, in response to detecting a touch input in a preset time, the controller 200 may control the curved display 100 to provide an application execution screen corresponding to the notification event on the main region. For example, when the notification event is a message reception event, the controller 200 may control the curved display 100 to provide a message application execution screen on the main region.

In yet another embodiment, the controller 200 may control the curved display 100 so that among a plurality of sub regions, a first type of UI is displayed on a first sub region located on a first side and a second type of UI is displayed on a second region located on a second side. The controller 200 may control the curved display 100 to display a first type of UI on the first sub region and display a second type of UI on the second sub region, according to the type of application provided on the main region.

For example, the controller 200 may control the curved display 100 to display a UI associated with a previously-performed task on the first sub region and display a UI associated with a frequently used task by a user on the second sub region. For another example, the controller 200 may control the curved display 100 to display a UI associated with a task requiring low level of security on the first sub region and display a UI associated with a task requiring high level of security on the second sub region. For yet another example, when the user terminal device 100 is concurrently executing first and second applications, the controller 200 may control the curved display 100 to display a UI associated with a first application on the first sub region and display a UI associated with a second application on the second sub region. For yet another example, the controller 200 may control the curved display 100 to display a UI including a first depth menu item on the first sub region and display a second depth menu item subordinate to the first depth, on the second sub region.

In one embodiment, the controller 200 may control the curved display 100 to provide a first UI associated with a first application on the first sub region, while the first application is being executed. When a specific even occurs while the first application is being executed, the controller 200 may control the curved display 100 to provide a second UI associated with a second application corresponding to the specific event on the second sub region, while providing an execution screen of at least one of the first and second applications on the main region.

In a state that the execution screen for the first application is provided on the main region, that the first UI is provided on the first sub region, and that the second UI is being provided on the second sub region, in response to receiving a touch interaction on the second UI, the controller 200 may control the curved display 100 to provide a second application execution screen on the main region.

In a state that the execution screen for the first application is provided, that the first UI is provided on the first sub region and that the second UI is provided on the second sub region, in response to detecting a touch interaction on one of a plurality of UI elements included in the second UI, the controller may execute the function of the second application that corresponds to the UI element associated with an input touch interaction. For example, when the second application is a music application and when the second UI includes a plurality of UI elements to control the music application, in response to detecting a touch interaction at a position of a volume adjustment UI element among a plurality of UI elements to control the music application, the controller 200 may control currently-outputted volume in accordance with the touch interaction inputted to the volume adjustment UI element.

Figure 2:
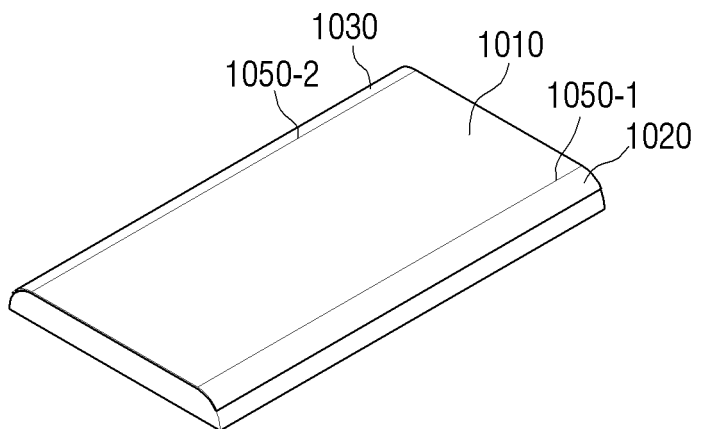
FIGS. 2 to 9 illustrate a curved display including a plurality of sub regions according to various exemplary embodiments.
Figure 3:
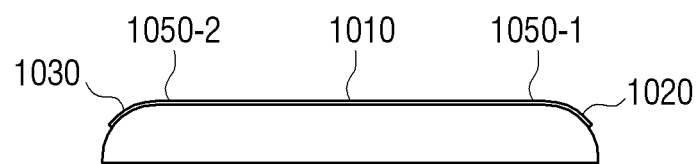

Meanwhile, FIGS. 2 and 3 illustrate outer appearance and cross section of the user terminal device 1000 including the curved display 100 which may be divided into a main region 1010 and two sub regions 1020, 1030. Referring to FIG. 2, the main region 1010 is arranged on a front side surface, while the sub regions 1020, 1030 are arranged on a right side surface and a left side surface. The main region 1010 and the respective sub regions 1020, 1030 are conceptually distinguished by boundary lines 1050-1, 1050-2.

FIG. 3 illustrates cross section of the user terminal device 1000 of FIG. 2. Referring to FIG. 3, the sub regions 1020, 1030 may each be arranged at obtuse angle with the main region 1010 to ensure viewability in a front direction. In other words, the sub regions 1020, 1030 may each be bent as if to wrap around only part of the left side surface and the right side surface. Further, the boundary lines 1050-1, 1050-2 may be the lines that are placed on planar surface rather than lines at which the curved display 100 transitions from the flat plane and begins bending.

Figure 4:
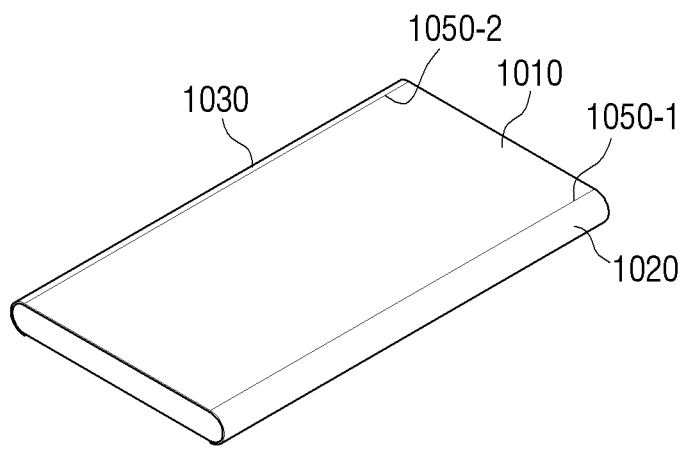
Figure 5:
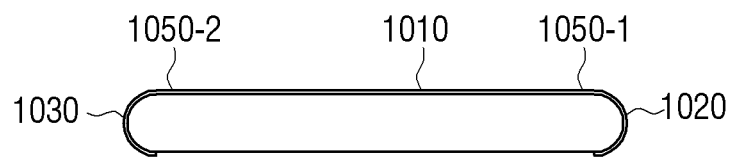

FIGS. 4 and 5 illustrate an outer configuration of the user terminal device 1000 and also cross-sectional configuration thereof, according to another embodiment, in which the user terminal device 1000 includes a curved display 100 divided into a main region 1010 and two sub regions 1020, 1030. According to FIG. 4, the two sub regions 1020, 1030 are arranged on both sides with reference to the main region 1010, and may be fixed at such an angle that allows viewing not from the front direction, but front right and left side directions. The main region 1010 and the respective sub regions 1020, 1030 are conceptually distinguished by the boundary lines 1050-1, 1050-2.

FIG. 5 illustrates a cross-sectional configuration of the user terminal device 1000 of FIG. 4. Referring to FIG. 5, each of the sub regions 1020, 1030 may be bent close to 90 degrees relative to a surface that includes the main region 1010. That is, as illustrated in FIG. 5, each of the sub regions 1020, 1030 may be bent to entirely wrap around the left side surface and the right side surface of the user terminal device 1000.

Figure 6:
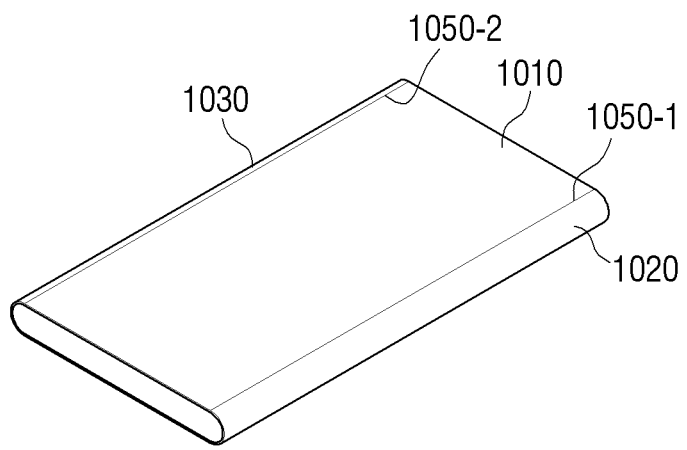
Figure 7:
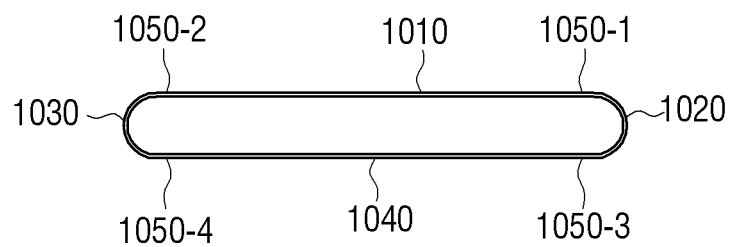

FIGS. 6 and 7 illustrate an outer configuration and also a cross-sectional configuration of the user terminal device 100 including the curved display 100 that is divided into a main region 1010 and three sub regions 1020, 1030, 1040. Referring to FIG. 6, two sub regions 1020, 1030 may be arranged on both sides with reference to the main region 1010, while one other sub region 1040 may be arranged on a rear side of the main region 1020. The main region 1010 and the two sub regions 1020, 1030 may be conceptually distinguished from each other by boundary lines 1050-1, 1050-2, while the sub region 1040 in the back may be conceptually distinguished from the two other sub regions 1020, 1030 by boundary lines 1050-3, 1050-4.

FIG. 7 illustrates a cross-sectional configuration of the user terminal device 1000 of FIG. 6. Referring to FIG. 7, the three sub regions 1020, 1030, 1040 may be bent so as to entirely wrap around the left side surface, the right side surface and the rear surface of the user terminal device 1000.

Meanwhile, FIGS. 3 to 9 illustrate that the sub regions 1020, 1030 are configured into a curved shape (i.e., round shape) so that the surface including the main region 1010 and the curved surface including the sub regions 1020, 1030 are connected to form obtuse angle (θ) therebetween. However, in an alternative embodiment, the sub regions 1020, 1030 may be configured in a plane shape, in which case the plane including the main region 1010 and the plane including the sub region 1020, 1030, 1040 may be adjoined with each other along the boundary lines.

Meanwhile, the user terminal device 1000 may have a triangular cross-section, in which case the plane including the main region 1010 and the plane including the sub region 1020 may be connected to form obtuse angle (θ) at the boundary line 1050. Additionally, trapezoidal cross section, pentagonal cross section or cross sections in various other shapes may be configured.

Further, although it is illustrated above that the curved display is bent horizontally relative to a front surface of the user terminal device, the embodiments are not strictly limited thereto. That is, the curved display may be vertically bent relative to the front surface of the user terminal device.

Figure 8:
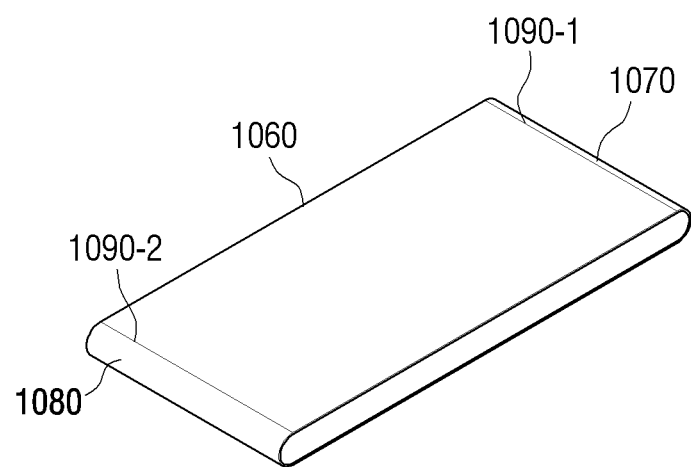
Figure 9:
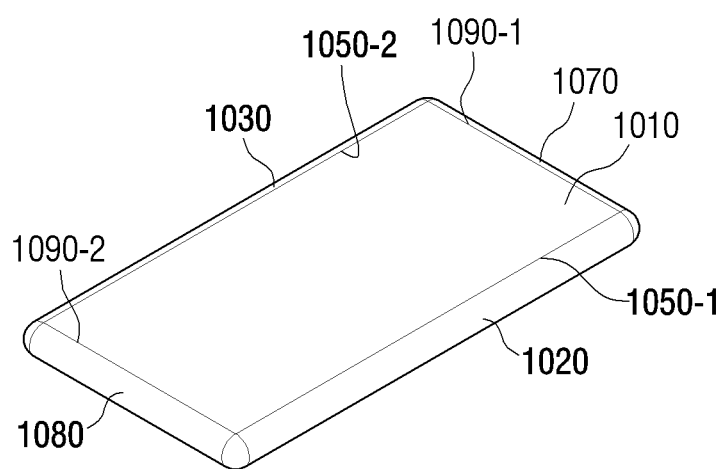

FIG. 8 illustrates the curved display bent in vertical direction. To be specific, the curved display may be divided into a main region 1060 arranged on a front side of the user terminal device, and sub regions 1070, 1080 arranged on an upper side surface and a lower side surface, respectively. The main region 1060 and the sub regions 1070, 1080 arranged on the upper and lower side surfaces may be conceptually distinguished from each other by boundary lines 1090-1, 1090-2.

Further, although FIGS. 2 to 8 illustrate that the sub regions exist only on two side surfaces, the embodiments are not limited thereto. Accordingly, the sub regions may be present in three or more side surfaces. For example, referring to FIG. 9, the curved display may include a main region 1010 and four sub regions 1020, 1030, 1070, 1080. The main region 1060 and the four sub regions 1020, 1030, 1070, 1080 arranged on four surfaces may be conceptually distinguished by the boundary lines 1050-1, 1050-2, 1090-1, 1090-2.

Meanwhile, although FIG. 1 illustrates a structure of a user terminal device having a curved display, a detector 400 and a controller 200, depending on embodiments, the user terminal device may additionally include various other elements. For example, the user terminal device may additionally include a memory which stores various applications. The controller 200 executes application stored on the memory in response to a user gesture to display content provided by the application on at least one of the main region and a plurality of sub regions. In other words, the controller 200 may control the curved display to display the content provided by the application on at least one of the main region and the plurality of sub regions.

Additionally, the user terminal device may have various other configurations.

Figure 10:
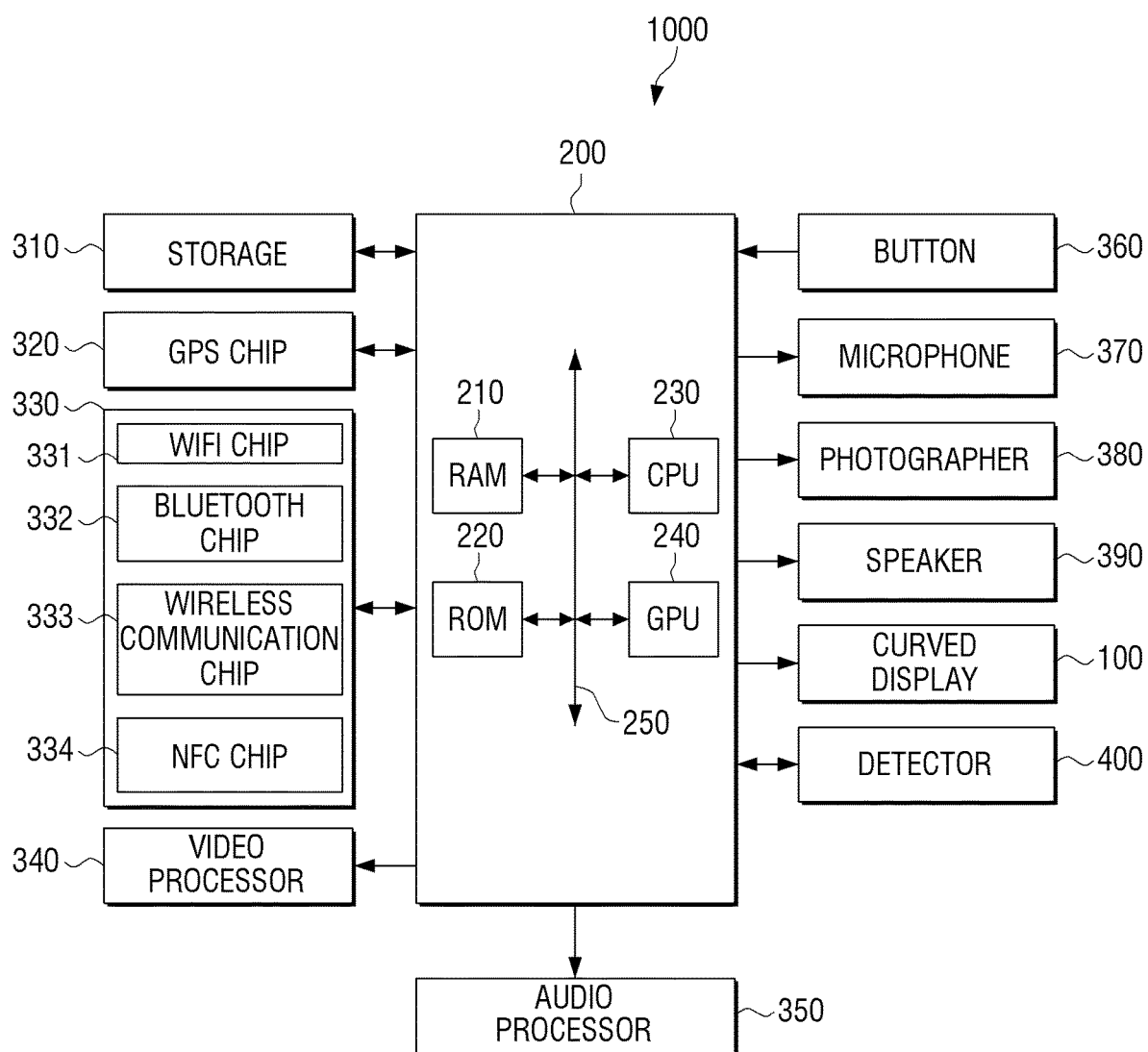
FIG. 10 is a detailed block diagram of a user terminal device according to another exemplary embodiment.

FIG. 10 is a detailed block diagram of a user terminal device implemented as a smart phone. According to FIG. 10, the user terminal device includes a curved display, a controller 200, a storage 310, a GPS chip 320, a communicator 330, a video processor 340, an audio processor 350, a button 360, a microphone 370, a photographer 380, a speaker 390 and a detector 400.

As described above, the curved display may be divided into a main region and a plurality of sub regions. The curved display may be implemented as a liquid crystal display (LCD), an organic light emitting diodes (OLED) display, a plasma display panel (PDP, or various forms of displays. The curved display may also include therein a driving circuit which may be implemented as a a-si TET, a low temperature poly silicon (LTPS) TFT, or an organic TFT (OTFT) and a backlight unit. Meanwhile, the curved display may be implemented as a touch screen by being combined with a touch detector included in the detector 400.

The touch detector may include at least one of touch panel and pen recognition panel. The touch panel may detect a gesture input by a user's finger and output a touch event value corresponding to the detected touch signal. The touch panel may be mounted below all of the main region and the sub regions of the curved display, or mounted only under the sub regions of the curved display. The touch panel may perceive the gesture input by the user's finger in capacitive manner or resistive manner. The capacitive manner involves sensing micro currents induced by user's body and calculating touch coordinates. The resistive manner involves using two electrode plates built in a touch panel in which upper and lower plates at a point of touch are brought into contact with each other, thus sensing flow of electric current and calculating it as touch coordinates.

The pen recognition panel may detect pen gesture input by a user as the user manipulates a touch pen (e.g., stylus pen, a digitizer pen, etc.), and output a pen proximity event value or a pen touch event value. The pen recognition panel may be mounted under at least one of the main region and a plurality of sub regions of the curved display. The pen recognition panel may be implemented in EMR manner, according to which it is possible to detect touch or proximity input based on a change in the magnitude of electromagnetic field in response to approach or touch of the pen. To be more specific, the pen recognition panel may be configured to include a grid structure of electromagnetic inductive coil sensor (not illustrated) and an electric signal processor (not illustrated) which provides AC signal with a predetermined frequency sequentially to respective loop coils of the electromagnetic inductive coil sensor. When a pen with a resonance circuit built therein is present in a proximity to the loop coils of the pen recognition panel, magnetic field transmitted from corresponding loop coils generate electric currents based on mutual electromagnetic induction at the resonance circuit inside the pen. Based on these electric currents, inductive magnetic field is generated from the coils that form the resonance circuit in the pen, and the pen recognition panel can detect location at which the pen is approaching or touching by detecting this inductive magnetic field at the loop coil which is in signal reception state.

Meanwhile, according to one embodiment, the user terminal device 1000 may be implemented as a curved display which includes a main region and a plurality of sub regions, but not limited to this example only. Accordingly, in an alternative embodiment, it is possible to construct a main region and a plurality of sub regions by using a plurality of general displays. When this is the case, it is possible to construct a bent form of display by connecting a plurality of displays together.

The storage 310 may store various programs and data necessary for the operation of the user terminal device 1000. To be specific, the storage 310 may store programs and data to construct various screens to be displayed on the main region and the sub regions. The controller 200 displays the contents on the main region and the respective sub regions of the curved display, using the programs and data stored at the storage 310. In other words, the controller 200 may control so that the curved display displays the contents. Further, in response to a user's touch inputted with respect to the main region, the sub region and the boundary line serving as a boundary therebetween, the controller 200 performs a corresponding control operation.

The controller 200 includes a RAM 210, a ROM 220, a CPU 230, a graphic processing unit (GPU) 240, and a bus 250. The RAM 210, the ROM 220, the CPU 230, and the GPU 240 may be connected together via the bus 250.

The CPU 230 accesses the storage 310 and performs booting using O/S stored at the storage 310. The CPU 230 then performs various operations, using various programs, contents or data stored at the storage 310.

The ROM stores instruction set for system booting, or the like. In response to input of turn-on command and power-on, the CPU 230 copies the O/S stored at the storage onto the RAM 210 according to the instruction stored at the ROM 230 and boots up the system by executing the O/S. When booting completes, the CPU 230 copies various programs stored at the storage 310 onto the RAM 210 and performs various operations by executing the programs copied onto the RAM 210. When the user terminal device 1000 is finished with the booting, the GP 240 displays a UI screen on an activated region among the main region and the sub regions. To be specific, the GPU 240 may generate a screen including various objects such as icon, image or text, using a calculator (not illustrated) and a renderer (not illustrated). The calculator calculates attribute values such as coordinate value, shape, size or color with which the respective objects are to be displayed according to a layout of the screen. The renderer generates screens of various layouts including objects, based on the attribute values calculated at the calculator. The screen generated at the renderer is provided to the curved display and displayed on the main region and the sub regions, respectively.

The GPS chip 320 is configured to receive a GPS signal from a global positioning system (GPS) satellite and calculate current position of the user terminal device 1000. The controller 200 may calculate the user's position by using the GPS chip 320, when using navigation program or when user's current position is necessary.

The communicator 330 is configured to perform communication with various types of external devices according to various types of communication methods. The communicator 330 includes a Wi-Fi chip 331, a Bluetooth chip 332, a wireless communication chip 333, and a nFC chip 334. The controller 200 performs communication with various external devices using the communicator 330.

The Wi-Fi chip 331 and the Bluetooth chip 332 perform communications with Wi-Fi method and Bluetooth method, respectively. When using Wi-Fi chip 331 or the Bluetooth chip 332, various connection information such as SSID and session keys are first exchanged to connect communication, after which various data can be transmitted and received. The wireless communication chip 333 refers to a chip that performs communication according to various communication standards such as IEEE, Zigbee, 3rd generation (3G), 3rd generation partnership project (3GPP) or long term evolution (LTE). The NFC chip 334 refers to a chip operating in near field communication (NFC) manner, using 13.56 MHz band among various RF-ID frequency bands such as 135 kHz, 13.56 MHz, 433 MHz, 860-960 MHz, and 2.45 GHz.

The video processor 340 is configured to process video data included in the contents received via the communicator 330 or the contents stored at the storage 310. The video processor 340 may perform various image processing of video data such as decoding, scaling, noise filtering, frame rate conversion, or resolution conversion.

The audio processor 350 is configured to process audio data included in the contents received via the communicator 330 or the contents stored at the storage 310. The audio processor 350 may perform various processing of the audio data such as decoding, amplification, or noise filtering.

When a playback program for multimedia contents is executed, the controller 200 may play back corresponding contents by driving the video processor 340 and the audio processor 350.

The curved display 100 may display the image frame generated at the video processor 340 on at least one of the main region and the sub regions.

Further, the speaker 390 outputs the audio data generated at the audio processor 350.

The button may be various types of button such as mechanical button, touch pad or wheel, which may be formed on arbitrary area including front side, side surface or rear surface of an outer side of the body of the user terminal device 1000.

The microphone 370 is configured to receive user voice or other sound and convert this into audio data. The controller 200 may use the user voice inputted through the microphone 370 in a call process or may convert the user voice into audio data and store the same at the storage 310.

The photographer 380 is configured to photograph still image or video image under control of the user. The photographer 380 may be implemented as a plurality of front camera, rear camera, or the like. As described, the photographer 380 may be used as a means to acquire a user's image in an embodiment to follow a gaze of the user.

When the photographer 380 and the microphone 370 are provided, the controller 200 may perform control operation in response to a user's voice inputted through the microphone 370 or a user's motion recognized through the photographer 380. That is, the user terminal device 1000 may operate in motion control mode or voice control mode. In motion control mode, the controller 200 may activate the photographer 380 to photograph the user, and follows a change in motion of the user to perform corresponding control operation. In voice control mode, the controller 200 analyzes the user's voice inputted through the microphone 370 and performs control operation according to analysis on the user's voice.

The user terminal device 1000 that supports motion control mode or voice control mode may adopt voice recognition technology or motion recognition technology in various embodiments described above. For example, when a user makes a motion as if he/she is selecting an object displayed on a home screen, or when a user pronounces a voice instruction that corresponds to the object, it may be determined that the corresponding object is selected so that a control operation matching the object is performed.

The detector 400 detects various states of the user terminal device 1000 and user's interactions. To be specific, the detector 400 may detect a grip state in which the user is gripping the user terminal device 1000. That is, the user terminal device 1000 may be rotated or tilted to various directions. At this time, the detector 400 may use at least one of the various sensors such as electromagnetic sensor, gyro sensor or acceleration sensor to detect rotational motion or tilting degree of the user terminal device 1000 held by the user relative to a direction of gravity. Further, the detector 400 may detect touch area and grip pressure distribution with respect to the sub regions.

Additionally, although not illustrated in FIG. 10, depending on embodiments, the user terminal device 1000 may include various external input ports to connect to various external terminals such as a USB port to connect to a USB connector, a headset, a mouse, or a LAN, or a DMB chip to receive a digital multimedia broadcasting (DMB) signal and process the same, or various sensors.

Figure 11:
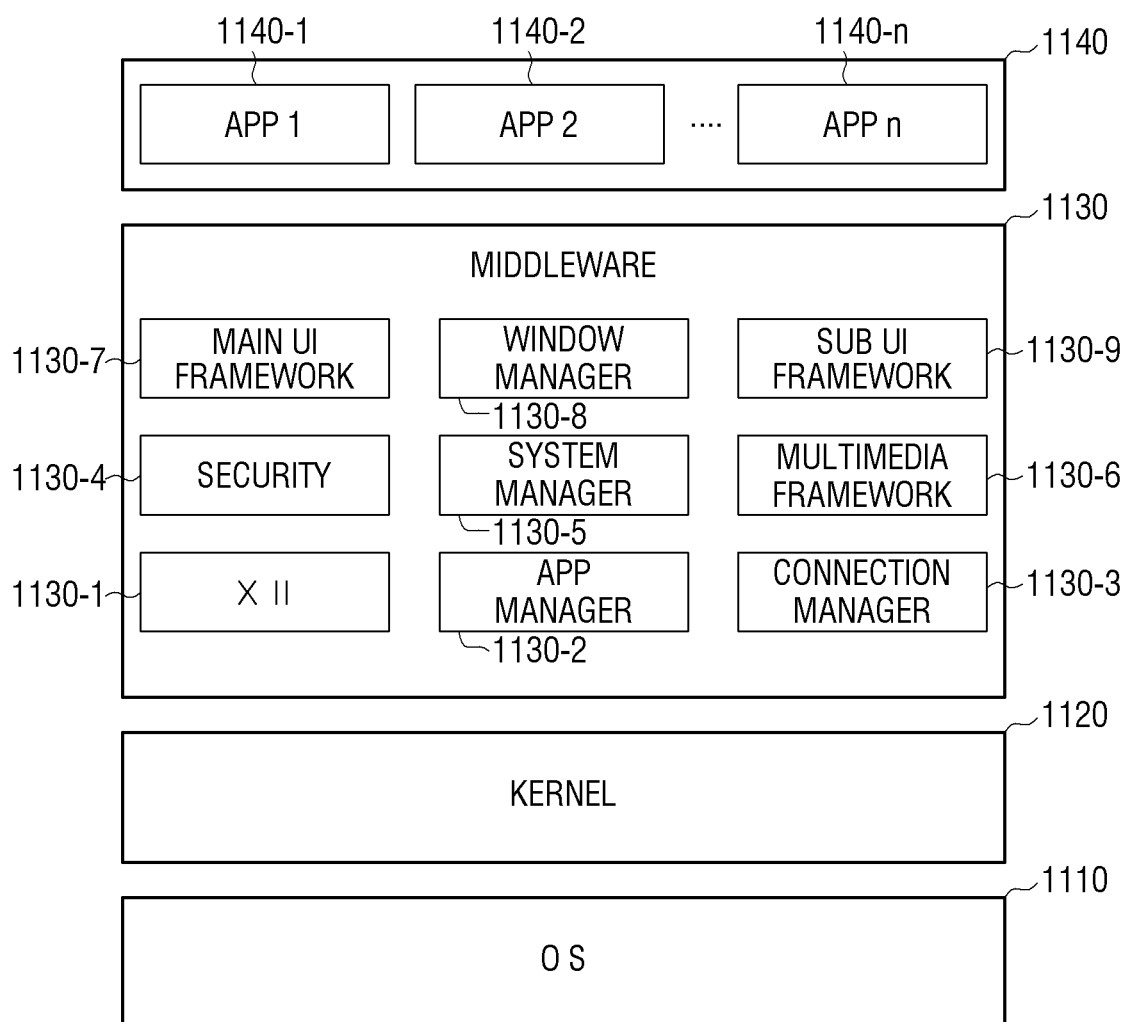
FIG. 11 illustrates an exemplary software construction of a user terminal device according to an exemplary embodiment.

Meanwhile, as described above, the storage 310 may store various programs. FIG. 11 illustrates a software structure stored at the user terminal device 1000. Referring to FIG. 11, the storage 310 may store software including an operating system (OS) 1110, a kernel 1120, a middleware 1130, or an application 1140.

The OS 1110 performs function of controlling and managing the overall operation of the hardware. That is, the OS 1110 is a layer that is responsible for the basic functions such as hardware management, memory or security.

The kernel 1120 serves as a passage through which various signals including touch signal detected from the detector 400 are delivered to the middleware 1120.

The middleware 1120 includes various software modules to control the operation of the user terminal device 1000. Referring to FIG. 11, the middleware 1130 includes an X II module 1130-1, an APP manager 1130-2, a connection manager 1130-3, a security module 1130-4, a system manager 1130-5, a multimedia framework 1130-6, a UI framework 1130-7, a window manager 1130-8 and a writing recognition module 1130-9.

The X II module 1130-1 receives various event signals from various hardware provided in the user terminal device 1000. The event may be set to be an event of sensing user's gesture, an event of generating system alarm, an event of executing or finishing a specific program, or various others.

The APP manager 1130-2 manages the state of executing various applications 1140 installed on the storage 310. Upon sensing an event of executing application from the X II module 1130-1, the APP manager 1130-2 calls an application corresponding to the event and executes the same.

The connection manager 1130-3 supports wired or wireless network connection. The connection manager 1130-3 may include various sub modules such as DNET module or UPnP module.

The security module 1130-4 supports hardware certification, permission for request, secure storage, or the like.

The system manager 1130-5 monitors states of the respective elements in the user terminal device 1000 and provides the result of monitoring to other modules. For example, in case of low battery or error, or sever in communication, the system manager 1130-5 may provide the result of monitoring to the main UI framework 1130-7 or the sub UI framework 1130-9 to output warning message or sound.

The multimedia framework 1130-6 is provided to play back multimedia contents stored at the user terminal device 1000 or provided from an external source. The multimedia framework 1130-6 may include a player module, a camcorder module, or a sound processing module. Accordingly, it is possible to perform various multimedia playback operations to generate screen and sound and play the same.

The main UI framework 1130-7 provides various UIs to be displayed on the main region of the curved display 100, and the sub UI framework 1130-9 provides various UIs to be displayed on the sub regions. The main UI framework 1130-7 and the sub UI framework 1130-9 may include an image compositor module to configure various objects, a coordinate combiner to calculate coordinates at which an object is displayed, a rendering module to render the configured object at the calculated coordinates, and a 2D/3D UI toolkit to provide tools to configure 2D or 3D form of UI.

The window manager 1130-8 may detect a touch event or an input event made with user's body or pen. When sensing such event, the window manager 1130-8 delivers an event signal to the main UI framework 1130-7 or to the sub UI framework 1130-9 to perform operation corresponding to the event.

Additionally, various program modules may be stored, such as a writing module to draw a line according to a trajectory of dragging made by the user who may touch on a screen and drag, or an angle calculation module to calculate pitch, roll, yaw or the like based on the detected values obtained at the detector 400.

The application module 1140 includes applications 1140-1~1140-*n* to support various functions. For example, the application module 1140 may include program modules to provide various services such as, for example, navigation program module, game module, electronic book module, calendar module or notification management module. These applications may be installed by default, or the user may arbitrarily install and use it during process.

The software structure illustrated in FIG. 11 is only an example and not to be construed as limiting. Accordingly, depending on needs, some may be omitted or modified, or added. For example, various programs including a sensing module to analyze the signals detected from various sensors, a messaging module such as a messenger program or a short message service (SMS) and multimedia message service (MMS) program, a call info aggregator program module, a VoIP module or a web browser module may be additionally provided.

Meanwhile, as described above, the user terminal device 1000 may be implemented as various types of devices such as a mobile phone, a tablet PC, a laptop PC, a PDA, a MP3 player, an electronic frame device, a TV, a PC, or a kiosk. Accordingly, the exemplary configurations described with reference to FIGS. 10 and 11 may be modified in various manners, depending on the type of the user terminal device 1000.

As described, the user terminal device 1000 may be implemented to have various forms and configurations. The controller 200 of the user terminal device 1000 may support various user interactions depending on embodiments.

In one embodiment, the controller 200 may determine a sub region to display a UI, among a plurality of sub regions, based on the motion or tilting degree of the user terminal device 1000.

The controller 200 may detect motion or tilting of the user terminal device 1000 by using one or more sensors. It is assumed herein that the detector 400 is an acceleration sensor and the operation of detecting tilting degree or motion of the user terminal device 1000 will be explained below with reference to FIG. 12.

The acceleration sensor of the detector 300 may measure acceleration speed of the user terminal device 1000 to generate electric signal and deliver the generated electric signal to the controller 200. For example, if it is assumed that the acceleration sensor is three-axis acceleration sensor, the acceleration sensor may measure gravitational acceleration with respect to X, Y and Z axes, respectively. While the acceleration sensor measures acceleration, which is acceleration of motion added with gravitational acceleration, when the user terminal device 1000 does not make motion, it is possible that only the gravitational acceleration is measured. In explaining an example below, it is assumed that the direction in which the front surface of the user terminal device 1000 faces upward is positive (+) direction of the gravitational acceleration, while the direction in which the rear surface of the user terminal device 1000 faces upward is negative (−) direction.

Figure 12:
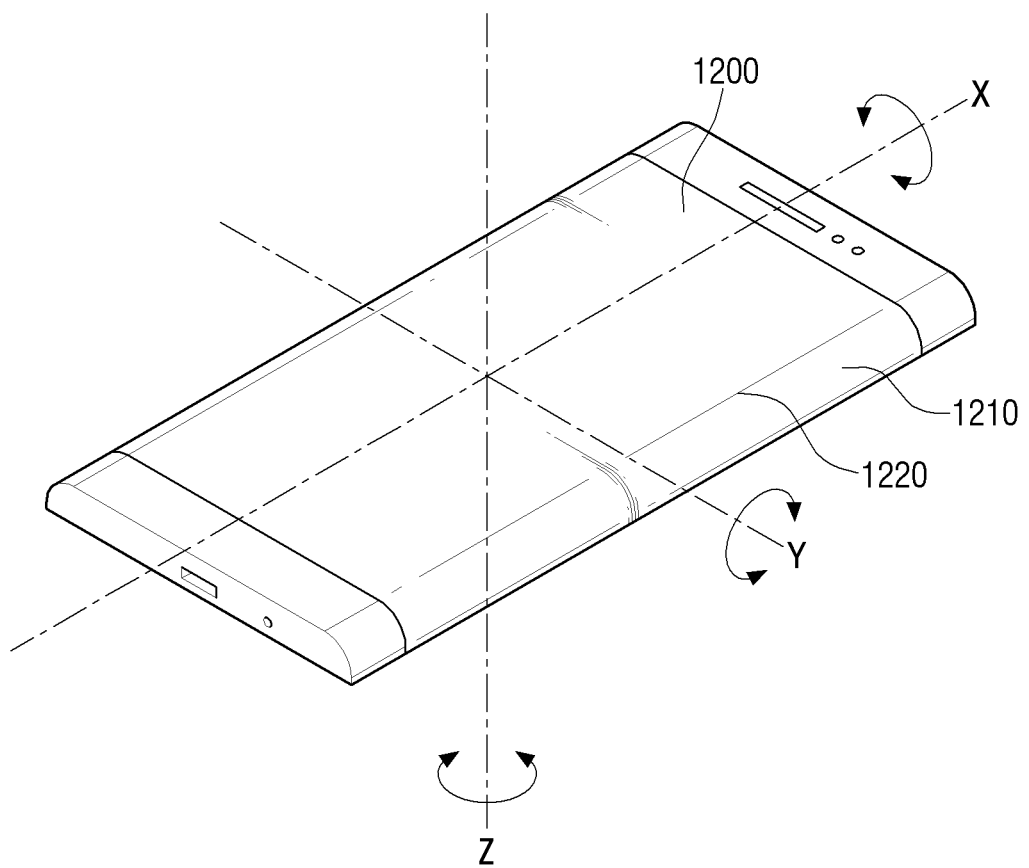
FIGS. 12 to 58 are views provided to explain various examples of controlling a user terminal device by using a curved display having a plurality of sub regions, according to various exemplary embodiments.

As illustrated in FIG. 12, when the rear surface of the user terminal device 1000 is in perpendicular relation with the direction of gravity, the gravitational acceleration is measured by the acceleration sensor such that X and Y axis components are 0 m/sec$^2$, while only the Z axis component may be a specific positive value (e.g., +9.8 m/sec$^2$). On the contrary, i.e., when the front surface of the user terminal device 1000 is in perpendicular relation with respect to the direction of gravity, the gravitational acceleration is measured by the acceleration sensor such that X and Y axis components are 0 m/sec$^2$, while only the Z axis component may be a specific negative value (e.g., −9.8 m/sec$^2$).

Additionally, when it is assumed that the user terminal device 1000 is placed diagonally to the surface of the table, the gravitational acceleration is measured by the acceleration sensor such that at least one axis is a value other than 0 m/sec$^2$, and the square root of the sum of the squares of the three axis components, i.e., the size of the vector sum may be the specific value (e.g., 9.8 m/sec$^2$). In the above example, the acceleration sensor detects accelerations in each of the X, Y and Z axis directions on the coordinate system. Of course, respective axes and corresponding gravitational accelerations may vary depending on locations at which the acceleration sensor is attached.

When the gravitational acceleration delivered from the acceleration sensor is measured by one or more axis components, the controller 200 may confirm (compute) the tilting degree of the user terminal device 1000 using the accelerations with respect to the respective axes. The tilting degree may be expressed by roll angle, pitch angle and yaw angle. The roll angle may represent angle of rotation about X axis in FIG. 12, the pitch angle may represent angle of rotation about Y axis in FIG. 13, and the yaw angle may represent angle of rotation about Z axis in FIG. 13.

In the example illustrated in FIG. 12, among the gravitational accelerations delivered from the acceleration sensor, when the Z axis gravitational acceleration is +9.8 m/sec$^2$, thus meaning that the tilting degree of the user terminal device 1000 is 0 by the roll angle and the pitch angle, it is understood that the tilting degree at which the user terminal device 1000 is placed is such that the rear surface subject to the Z axis gravitational acceleration is 90 degrees relative to the direction of gravity. In this manner, it is possible to detect the posture and tilting degree of the user terminal device 1000 and also to detect the rotational motion based on the variation in the tilting degree.

Particularly, in response to the rotational motion of the user terminal device 1000 as detected through the detector 400, the controller 200 may control the curved display 100 to display UI on one of the two sub regions included in the curved display 100.

Figure 13A:
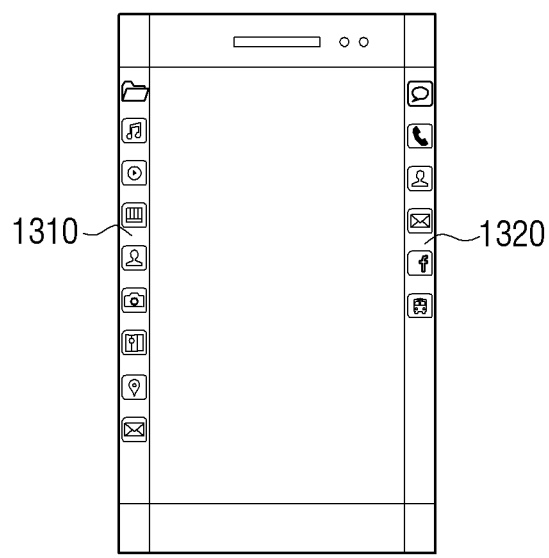

To be specific, referring to FIG. 13A, the controller 200 may control the curved display 100 to display a first UI on the first sub region 1310 and display a second UI on the second sub region 1320. The first UI and the second UI may be UIs that can control the same application, but is not limited thereto. Accordingly, the first and second UIs may be UIs to control different applications.

Figure 13B:
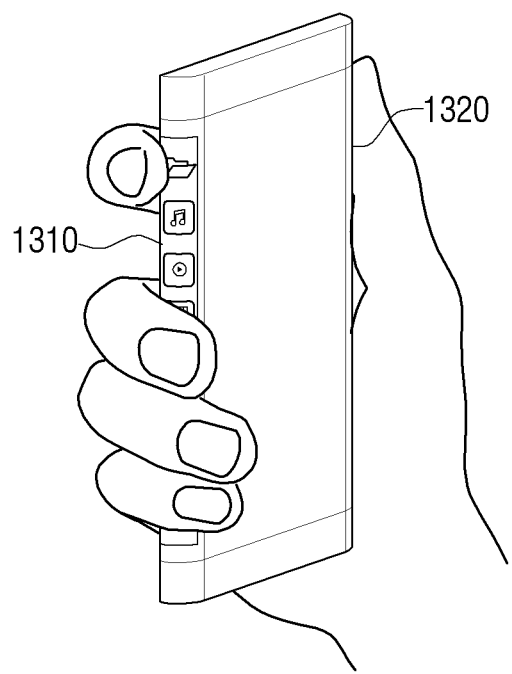

As illustrated in FIG. 13B, in response to sensing rotational motion beyond a preset angle to the right of the Z axis in the direction of gravity, the controller 200 may control the curved display 100 to remove the second UI displayed on the second sub region 1320 and display the first UI only on the first sub region 1310. At this time, if the first and second UIs are the UIs to control different applications, the first UI may include the same UI element regardless of sensing of the rotational motion. However, if the first and second UIs are the UIs to control the same applications, the first UI may include different UI element before and after sensing of the rotational motion. That is, after sensing rotational motion, the UI element that was provided to the second UI may be provided to the first UI. When the first UI is displayed on only the first sub region 1310, the second sub region 1320 may maintain a state of not outputting information. The state of not outputting information may be a screen being outputted monochromatically (e.g., in black) or power-off state.

Figure 13C:
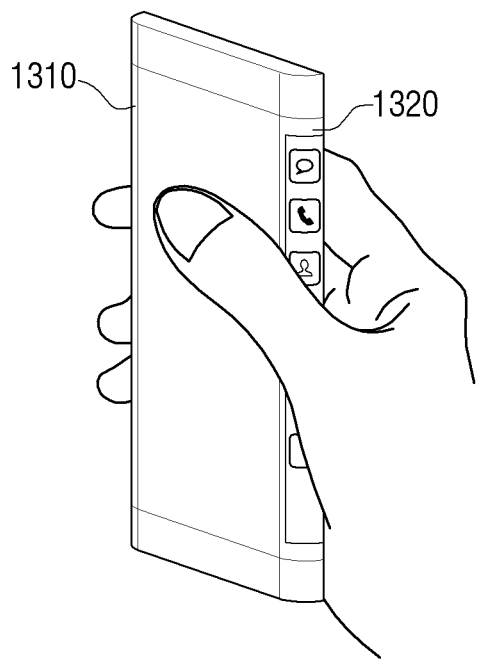

As illustrated in FIG. 13C, in response to sensing rotational motion beyond a preset angle to the left of the Z axis in the direction of gravity, the controller 200 may control the curved display 100 to remove the first UI displayed on the first sub region 1310 and display the second UI on only the second sub region 1320. The second UI may include different UI elements before and after sensing the rotational motion. At this time, if the first and second UIs are the UIs to control different applications, the second UI may include the same UI element regardless of sensing of the rotational motion. However, if the first and second UIs are the UIs to control the same applications, the second UI may include different UI elements before and after sensing of the rotational motion. That is, after sensing rotational motion, the UI element that was provided to the first UI may be provided to the second UI. When the second UI is displayed on only the second sub region 1320, the first sub region 1310 may maintain a state of not outputting information. The state of not outputting information may be a screen being outputted monochromatically (e.g., in black) or power-off state.

Further, in response to sensing rotational motion of the user terminal device 1000 while the first UI is provided only to the first sub region, the controller 200 may control the curved display 100 to remove the first UI provided to the first sub region and provide the first UI to the second sub region.

Figure 14A:
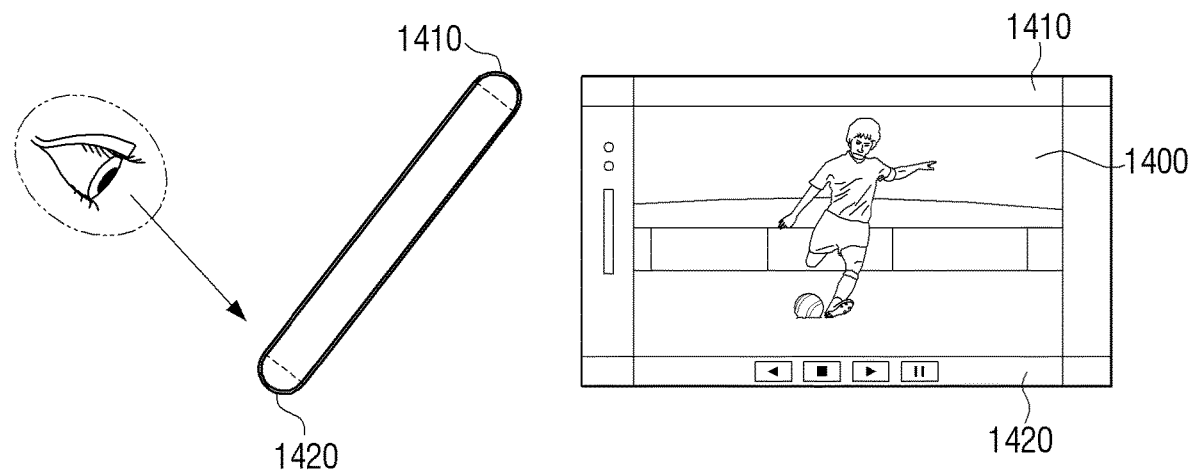

To be specific, as illustrated in FIG. 14A, in a video image application implementation, the controller 200 may control the curved display 100 to display video image content on the main screen 1400, while displaying a UI to control the video image application on the second sub region 1420. The controller 200 may control the curved display 100 to display the UI to control the video image application on the second sub region 1420, according to the tilting degree of the user terminal device 1000 and position of the user. To be specific, the controller 200 may photograph a user to determine position of the user and control the curved display 100 to display a UI to control the video image application on the second sub region 1420 closer to the gaze of the user based on the user's position. The UI to control the video image application may include a UI element to control speed of playing the video image content, a UI element to select play/stop of the video image content, or a UI element to adjust a volume of the video image content.

Figure 14B:
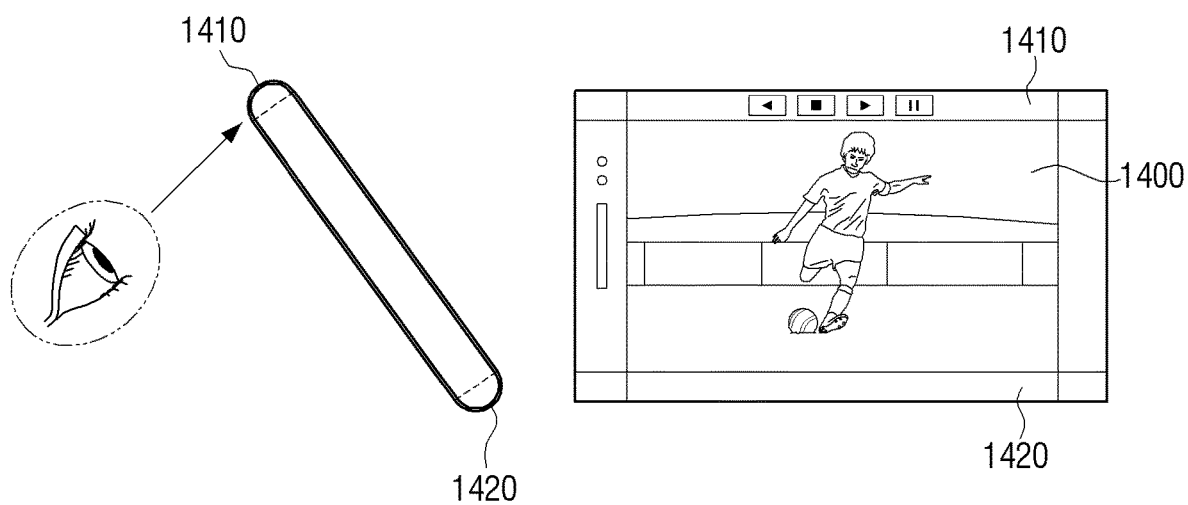

As illustrated in FIG. 14B, in response to sensing rotational motion of the video image application about X axis, the controller 200 may control the curved display 100 to remove the UI that has been displayed on the second sub region 1420 and display the UI on the first sub region 1410. The UI displayed on the first sub region 1410 may include the same UI as the UI that has been provided on the second sub region 1420.

Further, after sensing notification event, in response to sensing rotational motion of the user terminal device 1000, the controller 200 may control the curved display 100 to provide a notification UI corresponding to the notification event to one of the first sub region and the second sub region, according to the detected rotational motion.

Figure 15A:
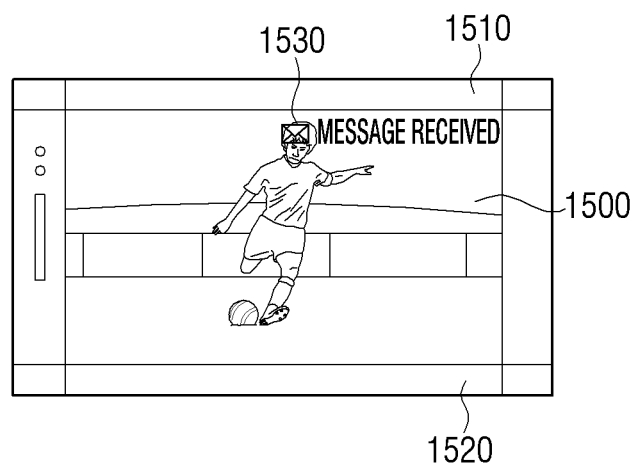

To be specific, as illustrated in FIG. 15A, during displaying of the video image content 1500 on the main region, in response to receiving a message from outside, the controller 200 may control the curved display 100 to display a UI 1530 to notify reception of the message on one side of the main region. The UI 1530 to notify the reception of the message may additionally include a sender information, content of message, an icon to command execution of the message application, etc., in addition to the message that notifies the reception of the message.

Figure 15B:
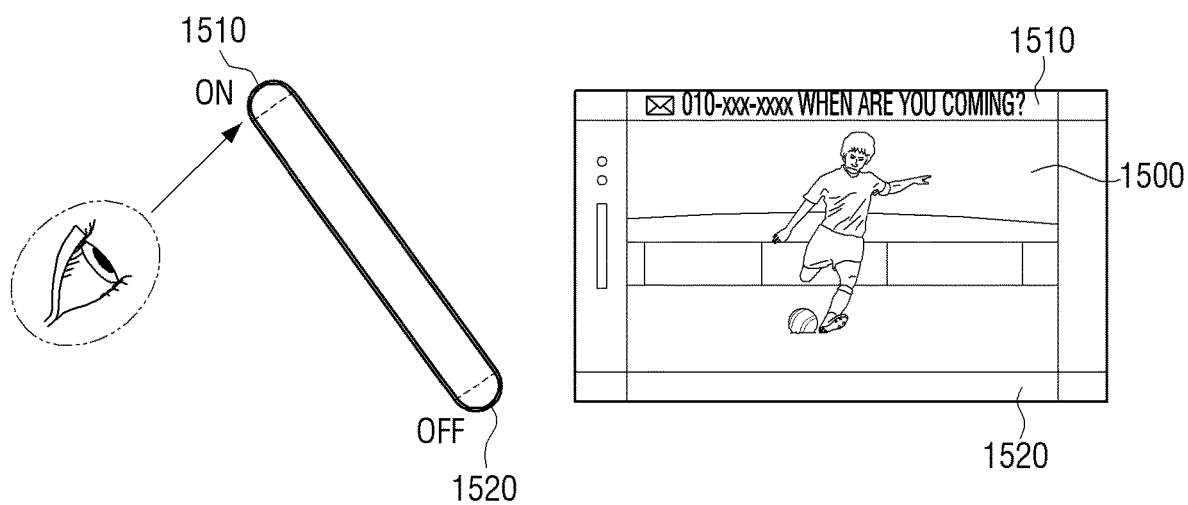

While the UI 1530 to notify the reception of message is being displayed on one side of the main region as illustrated in the left-hand side of FIG. 15B, in response to sensing rotational motion in a first direction with reference to the X axis as illustrated in the right-hand side of FIG. 15B, the controller 200 may control the curved display 100 to display a notification UI to notify the reception of message on the first sub region 1510 located at an upper side surface. The notification UI may indicate an icon representing type of message, sender information (e.g., sender's number, sender's name, etc.) or at least part of the content of the message. When the length of the content of the message is equal to or less than a preset value, the first sub region 1510 may display the entire content of the message, while, when the length of the content of the message exceeds the preset value, the first sub region 1510 may display part of the content of the message or move the content of the message to display the whole content.

Figure 15C:
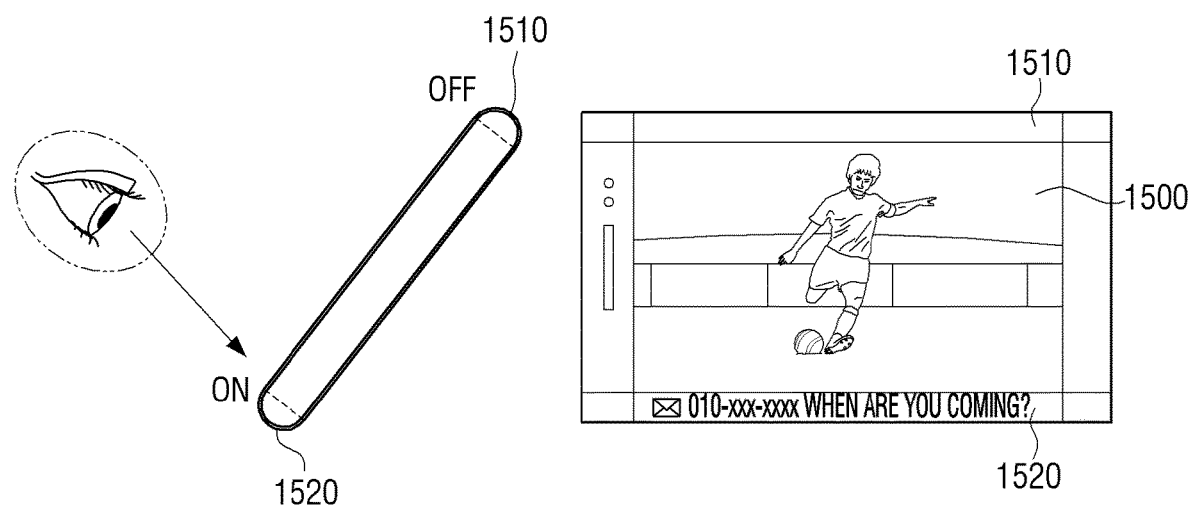

Alternatively, while a UI 1530 to notify the reception of message is being displayed on one side of the main region as illustrated in the left-hand side of FIG. 15C, in response to sensing rotational motion moving in a second direction which is opposite to the first direction with reference to the X axis, as illustrate in the right-hand side of FIG. 15C, the controller 200 may control the curved display 100 to display a notification UI to notify the reception of the message on the second sub region 1520 located on a lower side surface. The notification UI may indicate an icon representing type of message, sender information (e.g., sender's number, sender's name, etc.) or at least part of the content of the message.

Figure 15D:
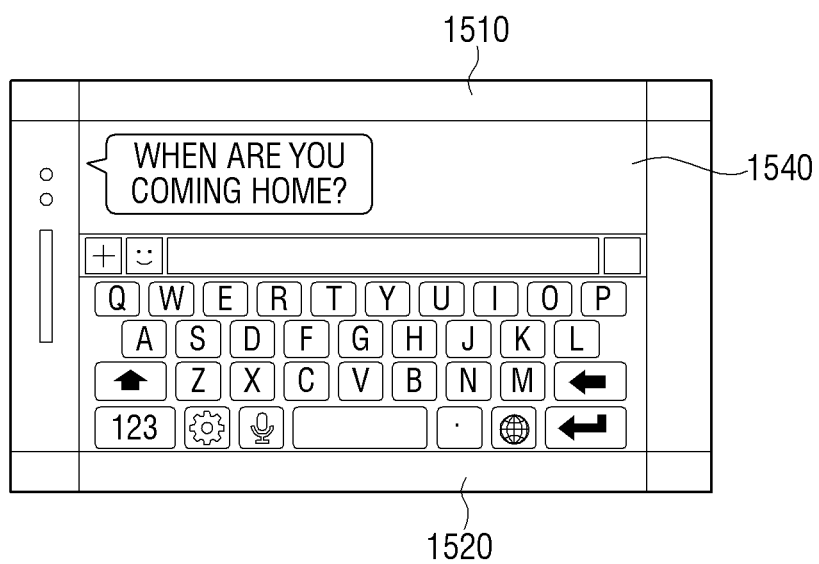

Then in response to sensing a touch input within a preset time during provisioning of the notification UI, as illustrated in FIG. 15D, the controller 200 may control the curved display 100 to provide an execution screen 1540 for message application corresponding to the notification event, on the main region. Meanwhile, in the absence of touch input within the preset time, the controller 200 may control the curved display 100 to remove the notification UI that has been displayed on the first sub region 1510 or the second sub region 1520.

Meanwhile, although it is described above that the user terminal device 1000 rotates about X axis or Z axis, embodiments are not limited thereto. Accordingly, rotation about Y axis can also be included in the present technical inventive concept.

Figure 16A:
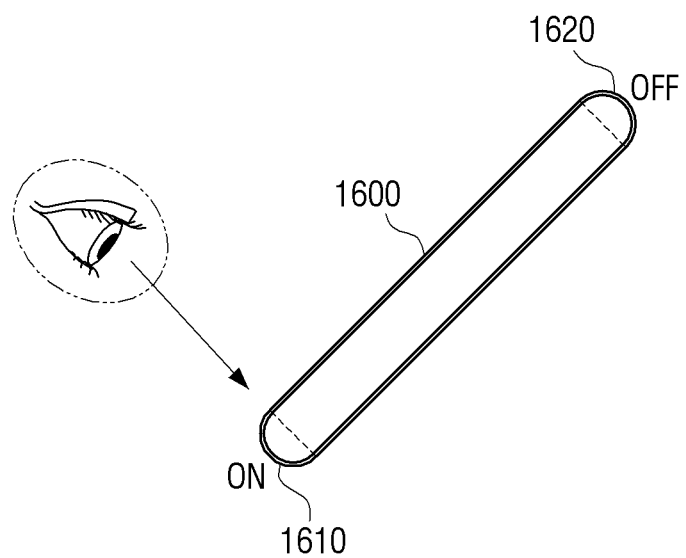
Figure 16B:
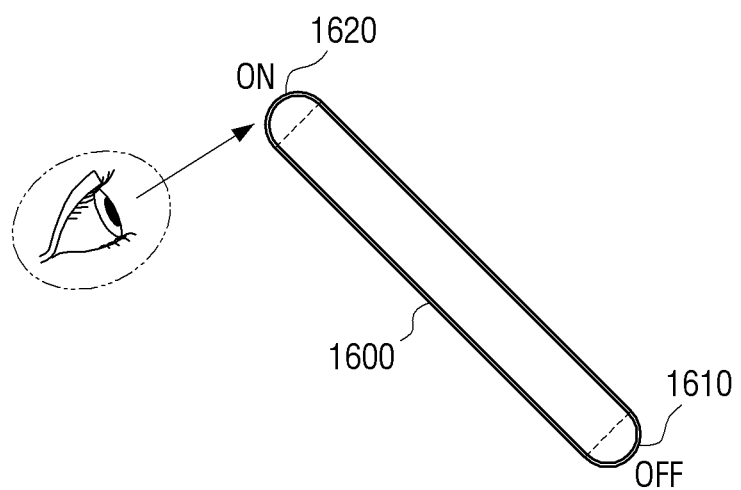

According to another embodiment, the photographer 380 may photograph a user in which case the controller 200 may analyze the image of the user as photographed through the photographer 380 to follow the gaze of the user. The controller 200 may also determine a sub region to display the UI, among a plurality of sub regions, according to the followed user's gaze and the tilting degree of the user terminal device 1000. To be specific, when the user moves or rotates the user terminal device 1000, the controller 200 may follow the user's gaze in accordance with the motion or the rotation of the user terminal device 1000 to determine a sub region that is closest to the user's gaze. The controller 200 may then control the curved display 100 to display the UI on the sub region that is closest to the user's gaze, among the plurality of sub regions. For example, referring to FIG. 16A, the first sub region 1610 closest to the user's gaze is ON and the UI is displayed on the first sub region 1610. Then as the user terminal device 1000 is rotated about the X axis, the controller 200 may re-determine the sub region that is closest to the user's gaze. As illustrated in FIG. 16B, the user terminal device 1000 is rotated about the X axis so that the sub region closest to the user's gaze is changed from the first sub region 1610 to the second sub region 1620. In this case, the controller 200 may control the curved display 100 to display the UI on the second sub region 1620, which has been previously displayed on the first sub region 1610. When the sub region is ON, this means that the information is output, while when the sub region is OFF, this means that the information is not output.

In yet another embodiment, the controller 200 may control the curved display 100 to display UI on one of the plurality of sub regions, using only the tilting degree of the user terminal device 1000. For example, when the roll angle is within first range (e.g., 0 to 180 degrees) with reference to the direction of gravity, the controller 200 may ON the first sub region to display the UI, while not outputting information on the second sub region. Further, when the roll angle is within a second range (e.g., 180 to 360 degrees) with reference to the direction of gravity, the controller 200 may ON the second sub region to display the UI, while not outputting information on the first sub region.

According to yet another embodiment, the controller 200 may detect the user terminal device 1000 in gripped state and determine a sub region to display the UI among a plurality of sub regions, according to how the user terminal device 1000 is gripped.

To be specific, the detector 400 may detect an area of touch and a distribution of grip pressure of a touch detecting portion included in the sub region. The detector 400 may output information about the area of touch and grip pressure distribution from the touch detecting portion included in the sub region to the controller 200. Using the area of touch and grip pressure distribution as received from the detector 400, the controller 200 may determine a hand with which a user is gripping the user terminal device 1000. That is, when sensing one touch area in the sub region on the left side to the front surface and sensing four touch areas in the sub region on the right side, the controller 200 may determine that the user is gripping the user terminal device 1000 with his left hand. Further, when sensing one touch area in the sub region on the right side to the front surface and sensing four touch areas on the sub region on the left side, the controller 200 may determine that the user is gripping the user terminal device 1000 with his right hand.

Figure 17A:
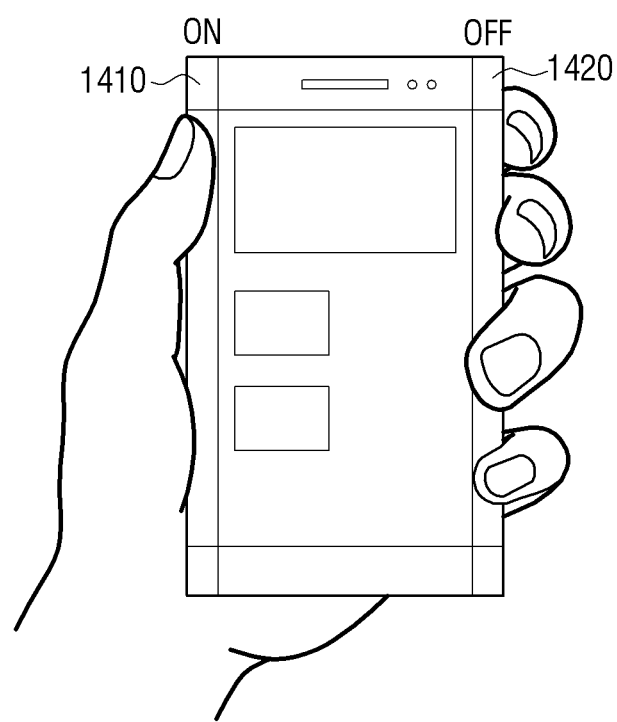
Figure 17B:
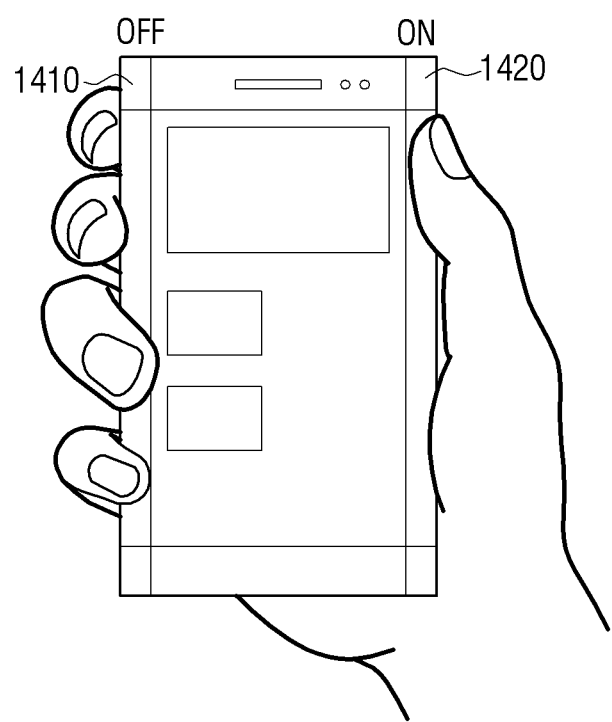

When determining that the user is gripping the user terminal device 1000 with his left hand, as illustrated in FIG. 17A, the controller 200 may activate the sub region 1710 positioned on a left side surface to display UI, while not outputting information on the sub region 1720 positioned on a right side surface. When determining that the user is gripping the user terminal device 1000 with his right hand, as illustrated in FIG. 17B, the controller 200 may activate the sub region 1720 positioned on the right side surface to display UI, while not outputting information on the sub region 1710 positioned on the left side surface.

As described above, user is able to control the user terminal device 1000 more conveniently and intuitively through the sub regions, by displaying UI on one of the plurality of sub regions depending on rotational motion, tilting degree, or gripping state of the user terminal device 1000.

According to yet another embodiment, the controller 200 may control the curved display 100 so that, among a plurality of sub regions, a first type UI is displayed on a first sub region positioned on a first side surface, and a second type UI is displayed on a second sub region positioned on a second side surface. For example, the controller 200 may control the curved display 100 to display a UI associated with a previously-performed task on the sub region 1510 on the left side surface, and display user's frequently-used task on the sub region 1520 on the right side surface. For another example, the controller 200 may control the curved display 100 to display a UI with low level of security on the sub region on the left side surface, while displaying a task with high level of security on the sub region 1520 on the right side surface. For yet another example, when the user terminal device 1000 is concurrently executing the first and second applications, the controller 200 may control the curved display 100 to display a UI associated with the first application on the sub region 1510 on the left side surface, while displaying a UI associated with the second application on the sub region 1520 on the right side surface. For yet another example, the controller 200 may control the curved display 100 to display a UI including a first depth menu item on the sub region 1510 on the left side surface, while displaying a UI including a second depth menu item, which is subordinate depth to the first depth, on the sub region 1520 on the right side surface.

Further, depending on a type of application provided on the main region, the controller 200 may control the curved display 100 to display a first type UI on the sub region 1510 on the right side surface, while displaying a second type UI on the sub region 1520 on the right side surface.

A control method of a user terminal device 1000 according to various embodiments will be explained below, with reference to FIGS. 18 to 56. FIGS. 18 to 28 are views provided to explain a method of controlling a user terminal device 1000 according to various embodiments, in response to user interactions made while UI is displayed with both of the two sub regions being ON. When the sub region is ON, this means that the information is output, while when the sub region is OFF, this means that the information is not output.

Figure 18:
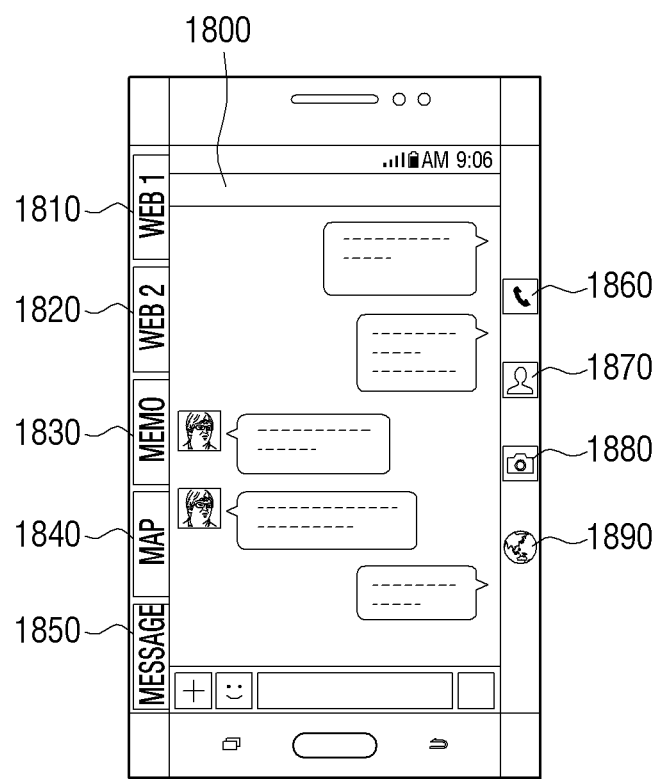

The controller 200 may control the curved display 100 to display a UI associated with a previously-performed task on a first sub region among a plurality of sub regions, while displaying a UI associated with a user's frequently-used task on a second sub region. For example, as illustrated in FIG. 18, the controller 200 may control the curved display 100 to display tabs 1810 to 1850 corresponding to recently-used applications on the sub region on the left side surface, and may control the curved display 100 to display icons 1860 to 1890 corresponding to user's frequently-used applications on the sub region on the right side surface. To be specific, as illustrated in FIG. 18, the controller 200 may control the curved display 100 to display, according to order of being used so far, a first tab 1810 corresponding to a first web screen of a web application on the sub region on the left side surface, a second tab 1820 corresponding to the second web screen of the web application, a third tab 1830 corresponding to a memo application, a fourth tab 1840 corresponding to a map application, and a fifth tab 1850 corresponding to a message application, and may control the curved display 100 to display a first icon 1860 corresponding to a phone application, which is user's frequently used application, on the sub region on the right side surface, a second icon 1870 corresponding to a contact information of the phone application, a third icon 1880 corresponding to a camera application, and a fourth icon 1890 corresponding to the web application.

However, displaying taps corresponding to recently-used applications on the sub region on the left side surface and displaying icons corresponding to user's frequently-used applications on the sub region on the right side surface, as described above, is merely an example, and the controller 200 may display on the sub region on the left side surface UIs associated with the previously-performed tasks such as a history-related UI element of the application, a UI element regarding visited sites, or a UI element regarding recently-contacted contact, and may control the curved display 100 to display, on the sub region on the right side surface, the UIs associated with the tasks that are likely to be used frequently by the user, such as, a UI element associated with favorites, a UI element associated with tools, or a widget UI element.

Further, while the UI is displayed on the sub regions on the left and right side surfaces, in response to sensing a drag interaction that drags one of the plurality of UI elements included in the UI to the main region, the controller 200 may perform a function corresponding to the UI element for which the drag interaction is detected.

Figure 19:
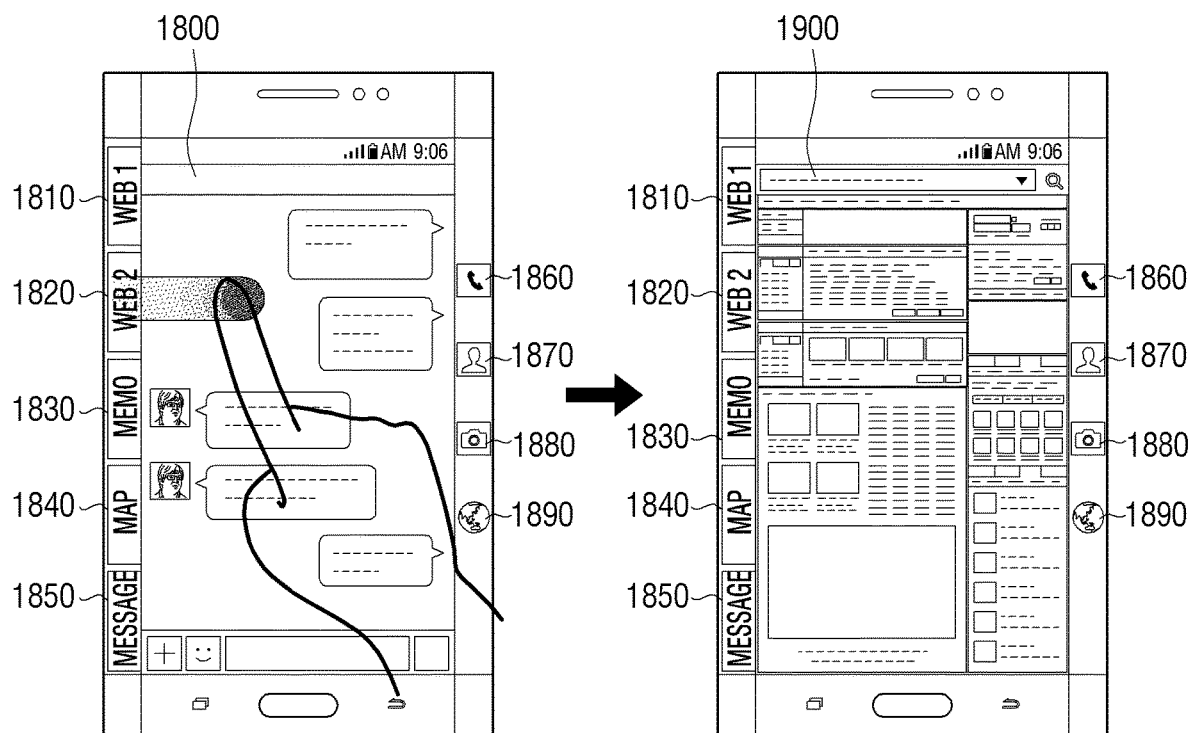

For example, as illustrated on the left-hand side of FIG. 19, while a chatting application execution screen 1800 is displayed on the main region, in response to sensing a drag interaction that touches on the second tab 1820 displayed on the sub region on the left side surface and drags to the rightward direction which is the direction of the main region, as illustrated in the right-hand side of FIG. 19, the controller 200 may control the curved display 100 to display the web screen 1900 corresponding to the second tab 1820 on the main region.

Figure 20:
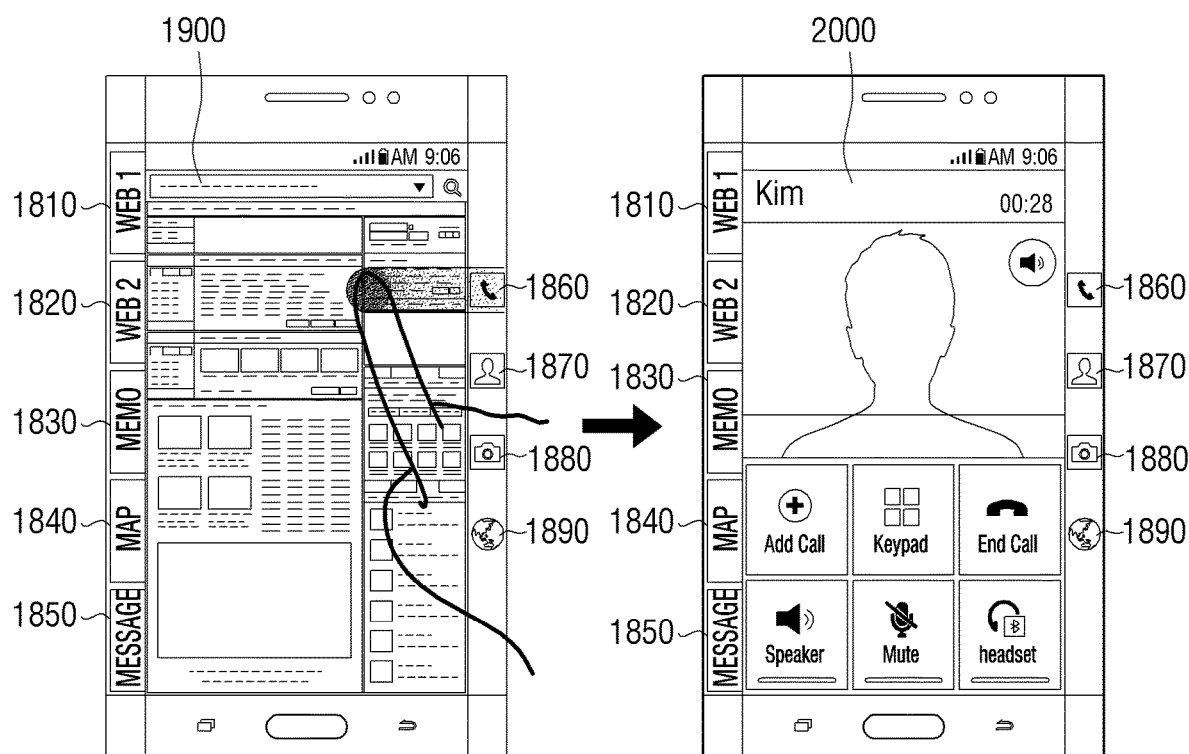

For another example, as illustrated in the left-hand side of FIG. 20, while the web screen 1900 is displayed on the main region, in response to sensing a drag interaction which touches on the first icon 1860 corresponding to the phone application displayed on the sub region on the right side surface and drags to the direction of the main region, as illustrated in FIG. 20, the controller 200 may control the curved display 100 to display the phone application execution screen 2000 on the main region.

Meanwhile, although it is described above with reference to FIGS. 19 and 20 that the drag interaction is made as a user interaction to select the application displayed on the main region, this is merely an example. Accordingly, the user interaction, such as a double tab interaction that the tab is touched in succession, or a long tab interaction that the tab is touched for a preset time, may be implemented.

Further, while a UI is displayed on two sub regions, in response to sensing a specific user interaction for one of the plurality of UI elements included in the UI, the controller 200 may control the curved display 100 to provide a preview screen for a job corresponding to the UI element for which the user interaction is detected.

Figure 21:
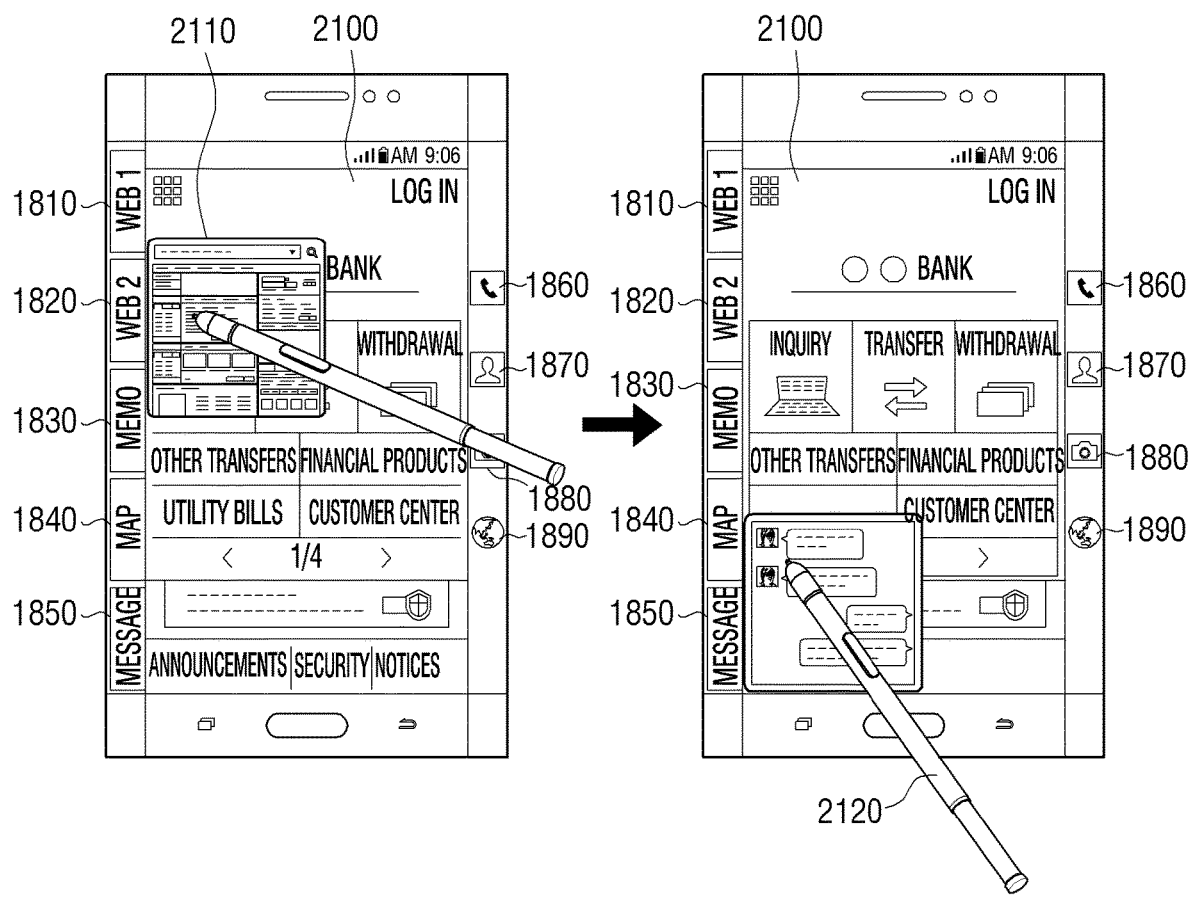

That is, while a bank application execution screen 2100 is displayed on the main region, in response to sensing a hovering interaction by a stylus pen that approaches the second tab 1820, as illustrated in the left-hand side of FIG. 21, the controller 200 may control the curved display 100 to display the preview screen 2110 of the second web screen corresponding to the second tab 1820 near the second tab 1820, in which the preview screen 2110 is the second web screen in reduced scale. The preview screen 2110 is a reduced representation of the second web screen corresponding to the second tab 1820, which may be enlarged and displayed on the main region in response to selecting thereof.

Additionally, while the second web screen corresponding to the second tab 1820 is displayed, in response to sensing a hovering interaction by the stylus pen, which moves to a proximity to the fifth tab 1850, as illustrated in the right-hand side of FIG. 21, the controller 200 may control the curved display 100 to reduce a message application chatting screen corresponding to the fifth tab 1850 and display a preview screen 2120 near the fifth tab 1820. The preview screen 2120 is a reduced representation of the chaffing screen corresponding to the second tab 1820, which may be enlarged and displayed on the main region in response to selecting thereof.

Figure 22:
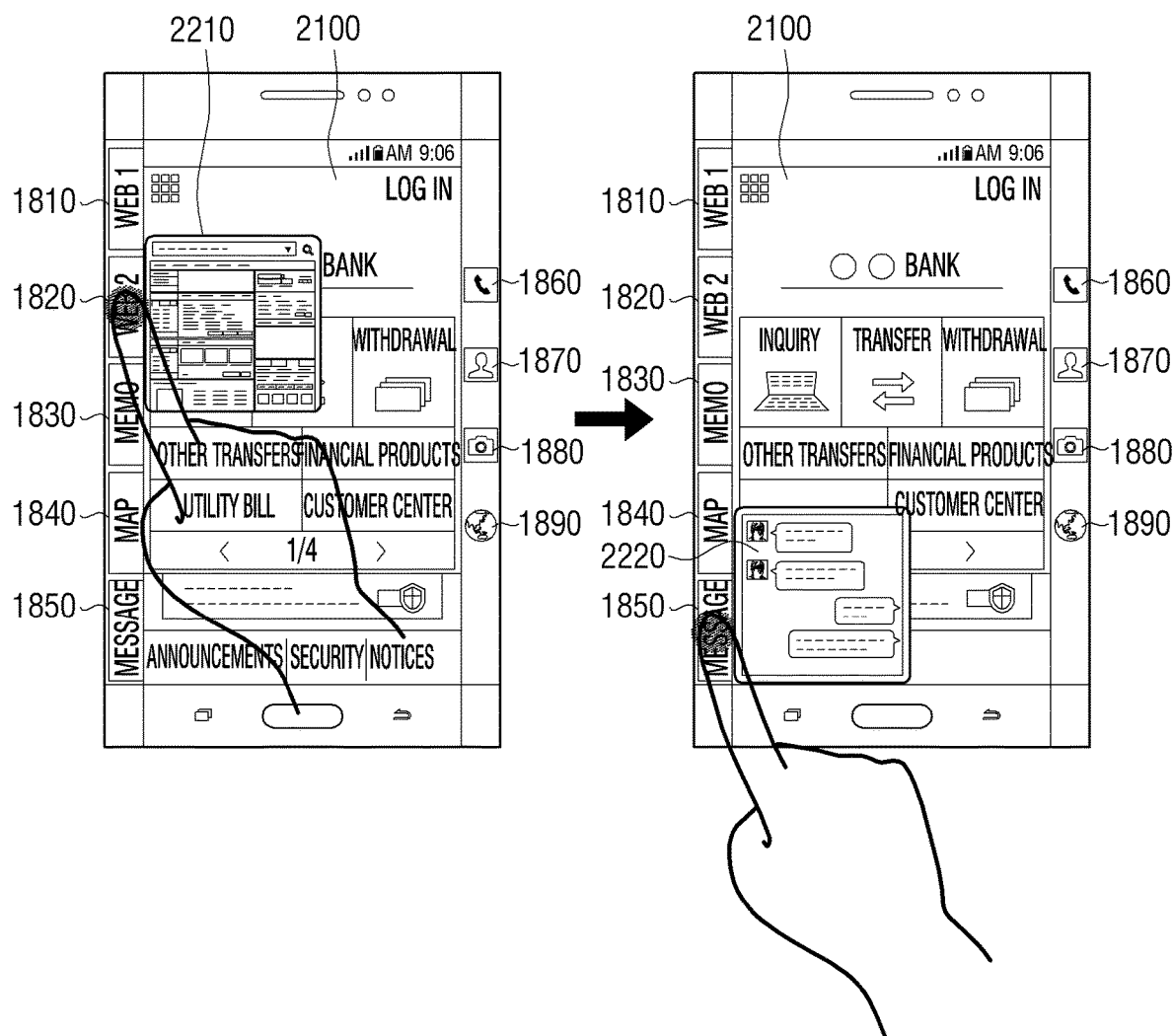

For yet another example, while the bank application execution screen 2100 is displayed on the main region and the UI is displayed on the sub regions of the left and right side surfaces, in response to sensing a touch interaction touching on the second tab 1820, as illustrated in the left-hand side of FIG. 22, the controller 200 may control the curved display 100 to reduce the second web screen corresponding to the second tab 1820 and display a preview screen 2210 near the second tab 1820. The preview screen 2210 is a reduced representation of the second web screen corresponding to the second tab 1820, which may be enlarged and displayed on the main region in response to selecting thereof (e.g., in response to a double tab interaction on the preview screen 2210).

While the second web screen corresponding to the second tab 1820 is displayed, in response to sensing a touch interaction touching on the fifth tab 1850, as illustrated in the right-hand side of FIG. 21, the controller 200 may control the curved display 100 to reduce a chaffing screen of an application corresponding to the fifth tab 1850 and display a preview screen 2220 near the fifth tab 1850.

As illustrated in FIGS. 21 and 22, the user may preview a task associated with the UI element displayed on the sub region, using a hovering interaction or a touch interaction with a stylus pen.

Further, while preview screen is displayed on the main region, in response to sensing a specific interaction, the controller 200 may fix the preview screen and control the application screen displayed on the main region according to a user command.

Figure 23:
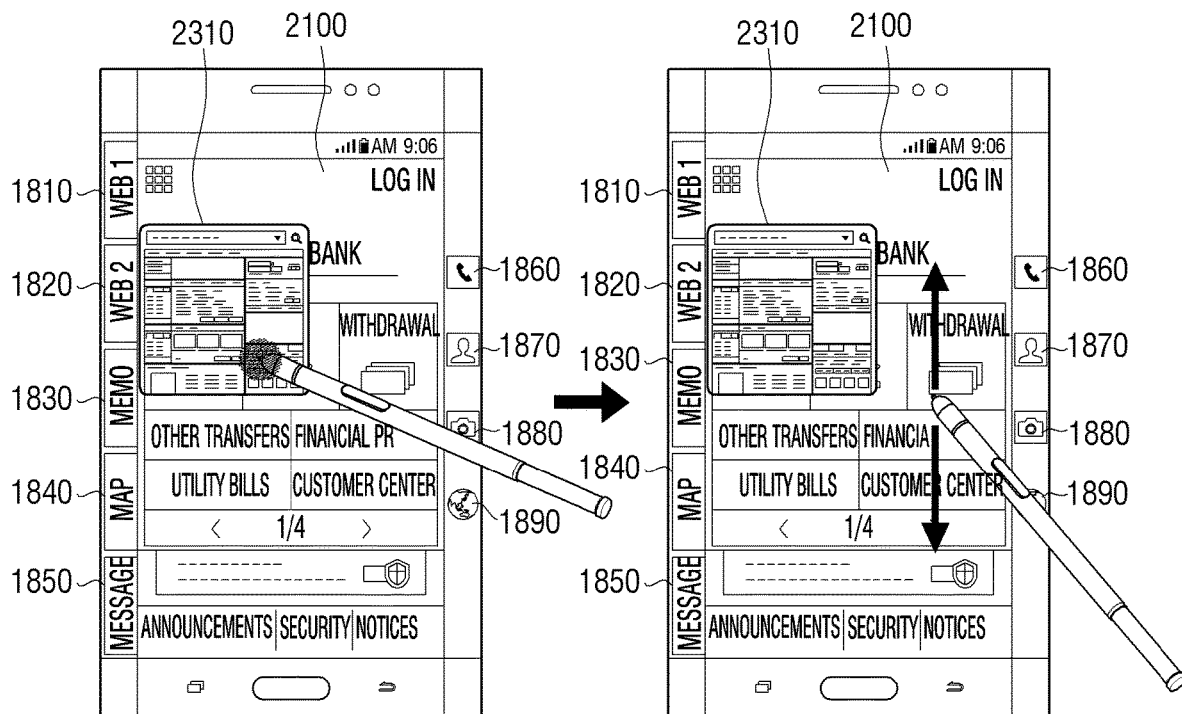

For example, as illustrated in the left-hand side of FIG. 23, while the stylus pen is hovering over the second tab 1820, in response to selecting a button included in the stylus pen by the user, the controller 200 may control the communicator 330 to receive a specific signal from the stylus pen and fix the preview screen 2310 corresponding to the second tab 1820. Then in response to sensing a drag interaction to drag the screen displayed on the main region, as illustrated in the right-hand side of FIG. 23, the controller 200 may fix the preview screen 2310 and control the curved display 100 to move the screen displayed on the main region according to the drag interaction.

Figure 24:
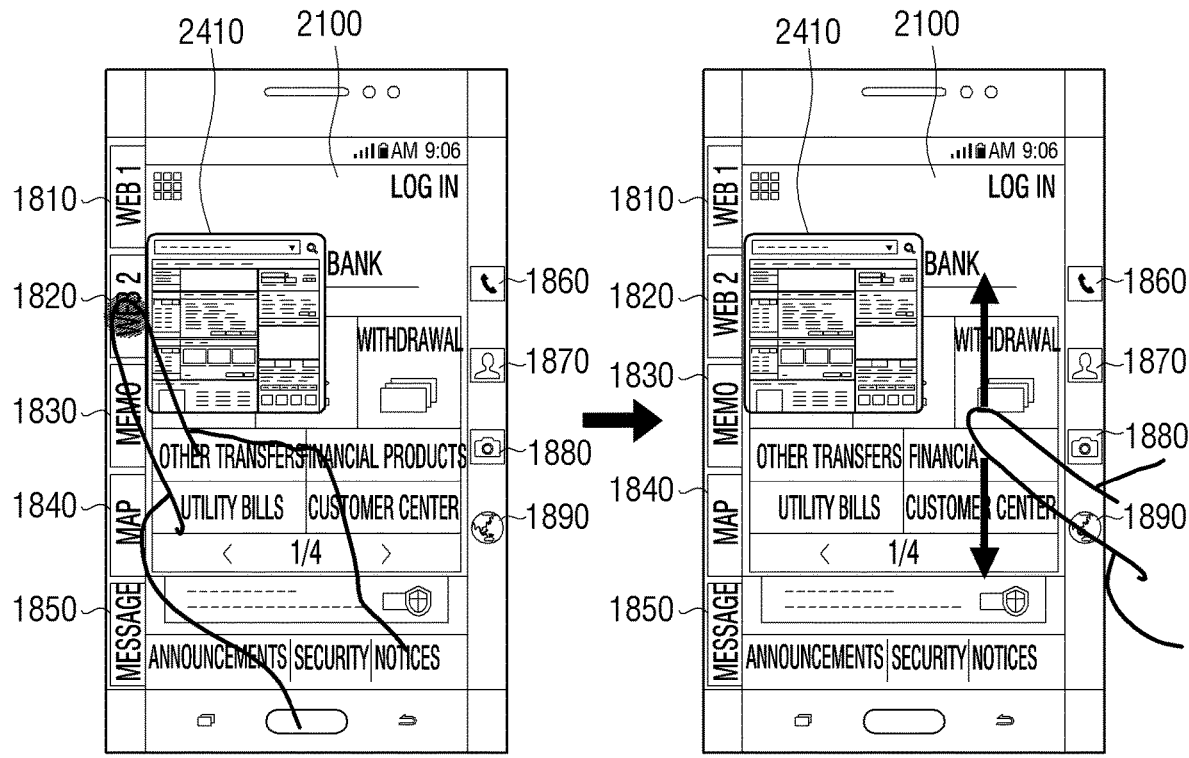

For yet another example, as illustrated in the left-hand side of FIG. 24, while the second tab 1820 is touched for a preset time, in response to sensing a long-tab interaction, the controller 200 may fix a preview screen 2410 corresponding to the second tab 1820. Then in response to sensing a drag interaction to drag the screen displayed on the main region, as illustrated in the right-hand side of FIG. 24, the controller 200 may fix the preview screen 2410 and control the curved display 100 to move the screen displayed on the main region according to the drag interaction.

Further, while the UI is displayed on the sub regions on the left and right side surfaces, in response to sensing a specific interaction, the controller 200 may remove a UI element included in the sub region for which the specific interaction is detected, from the sub region, and end the task corresponding to the UI element included in the sub region for which the specific interaction is detected.

Figure 25:
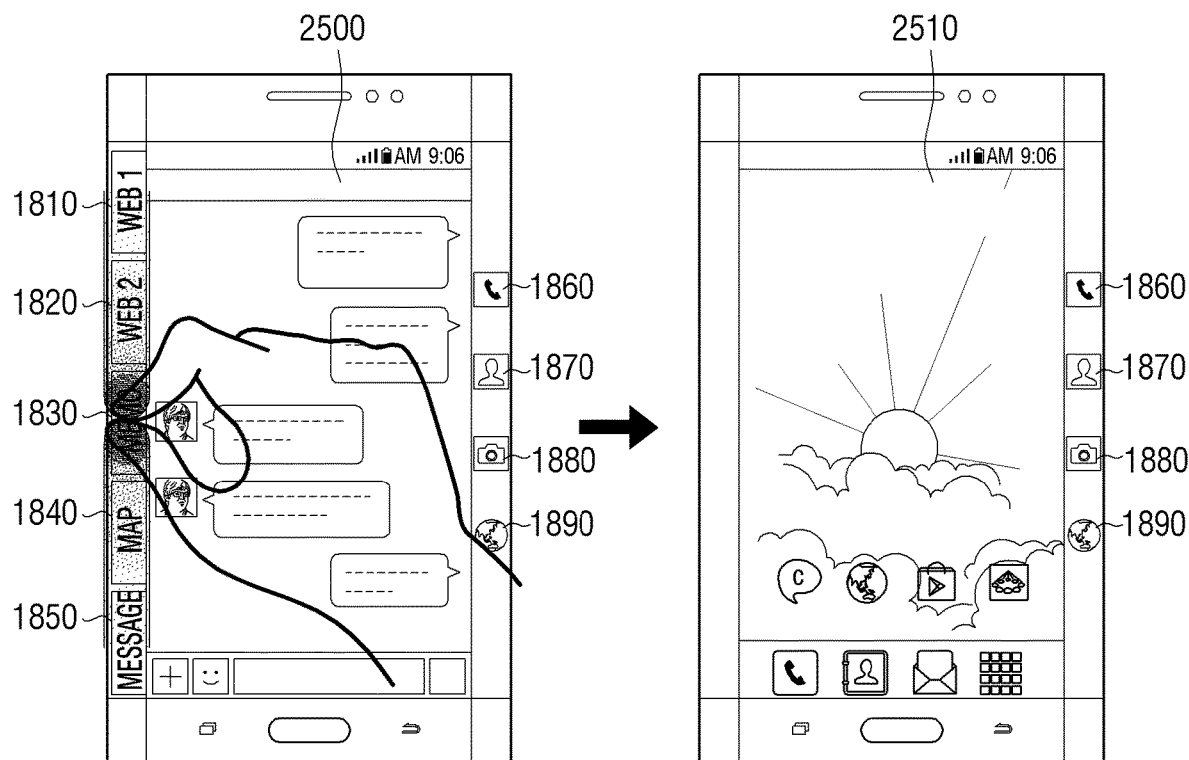

To be specific, as illustrated in the left-hand side of FIG. 25, while the UI is displayed on the sub regions on the left and right side surfaces, in response to sensing a pinch-in interaction which touches two points on the left side surface and moves the two touch points closer to each other, the controller 200 may remove all of the plurality of taps 1810 to 1850 included in the sub region on the left side surface, and end the tasks associated with the plurality of taps 1810 to 1850 included in the sub region on the left side surface. At this time, as illustrated in the right-hand side of FIG. 25, the controller 200 may control the curved display 100 to switch the displayed screen to a home screen 2510.

Further, while the UI is displayed on the sub regions on the left and right side surfaces, in response to sensing a specific interaction for two or more UI elements among a plurality of UI elements, the controller 200 may control the curved display 100 to simultaneously display the work screens corresponding to the two or more UI elements on the main region.

Figure 26:
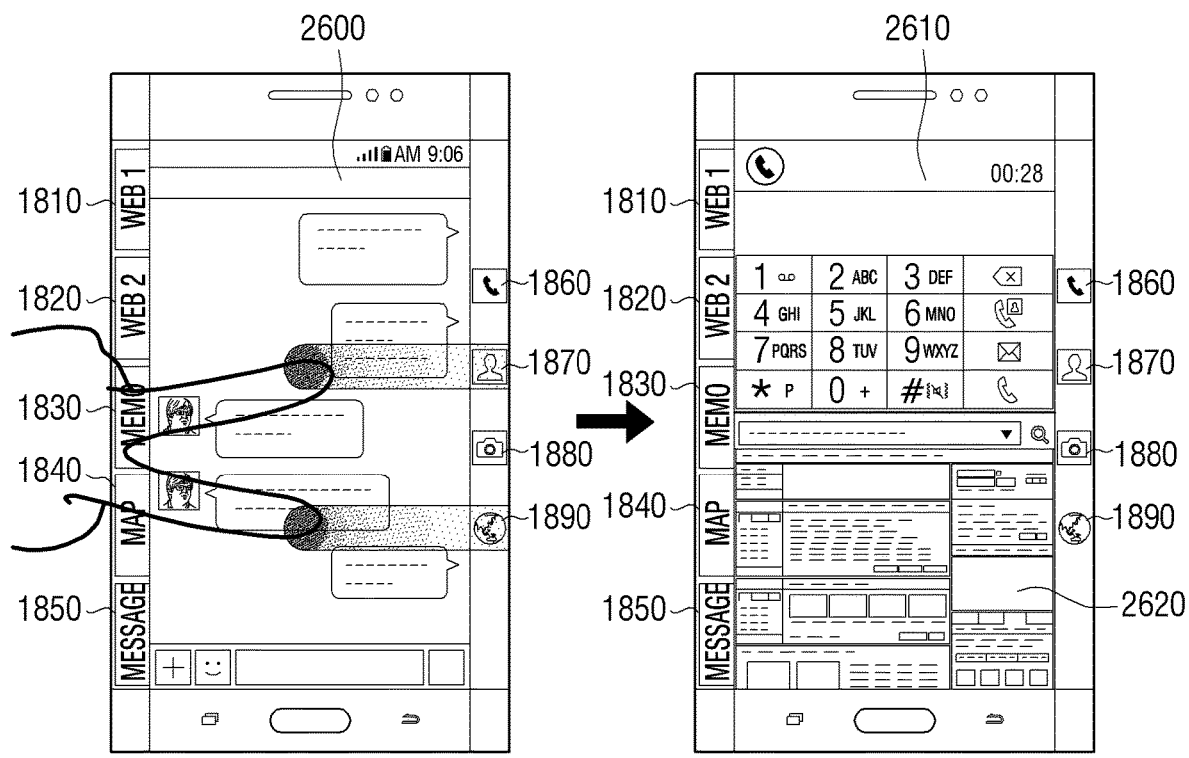

To be specific, as illustrated in the left-hand side of FIG. 26, while the chatting screen 2600 is displayed on the main region, and UI is displayed on the sub regions on the left and right side surfaces, in response to sensing a drag interaction that simultaneously touches the first and fourth icons 1860, 1890 and drags to the direction of the main region, as illustrated in the right-hand side of FIG. 26, the controller 200 may control the curved display 100 to display a phone application execution screen 2610 on an upper end of the main region, while displaying a web browsing application execution screen 2620 on a lower end of the main region.

Further, while the UI is displayed on the sub regions on the left and right side surfaces, in response to sensing a specific interaction, the controller 200 may control the curved display 100 to switch the screen on the main region into a home screen.

Figure 27:
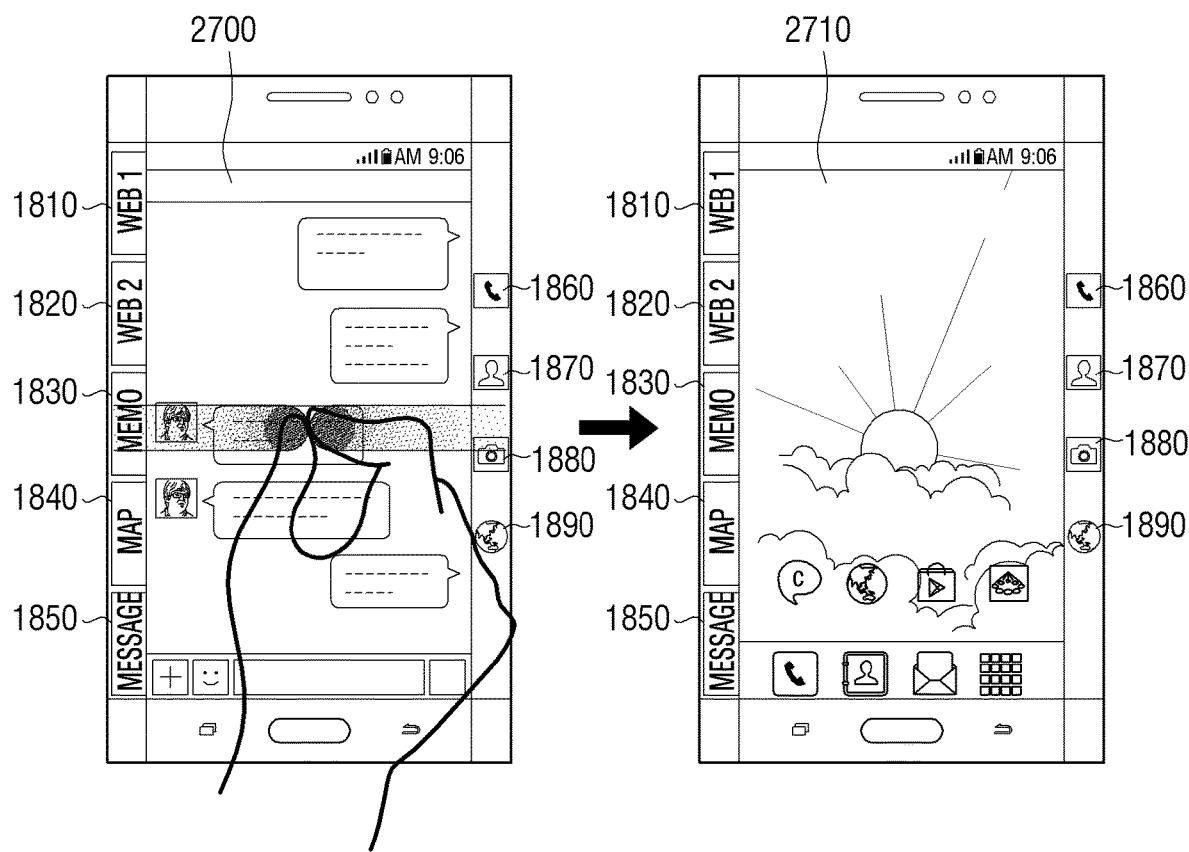

That is, as illustrated in the left-hand side of FIG. 27, while the chatting screen 2600 is displayed on the main region and the UI is displayed on the sub regions on the left and right side surfaces, in response to sensing a pinch-in interaction which simultaneously touches one point on the sub region on the left side surface and one point on the sub region on the right side surface and drags close to each other, as illustrated in the right-hand side of FIG. 27, the controller 200 may control the curved display 100 to switch the screen currently displayed on the main region into a home screen 2710.

Further, while the UI is displayed on the sub regions on the left and right side surfaces, in response to sensing a specific interaction, the controller 200 may control the curved display 100 to extend the screen displayed on the main region so that the screen is displayed over to the plurality of sub regions.

Figure 28:
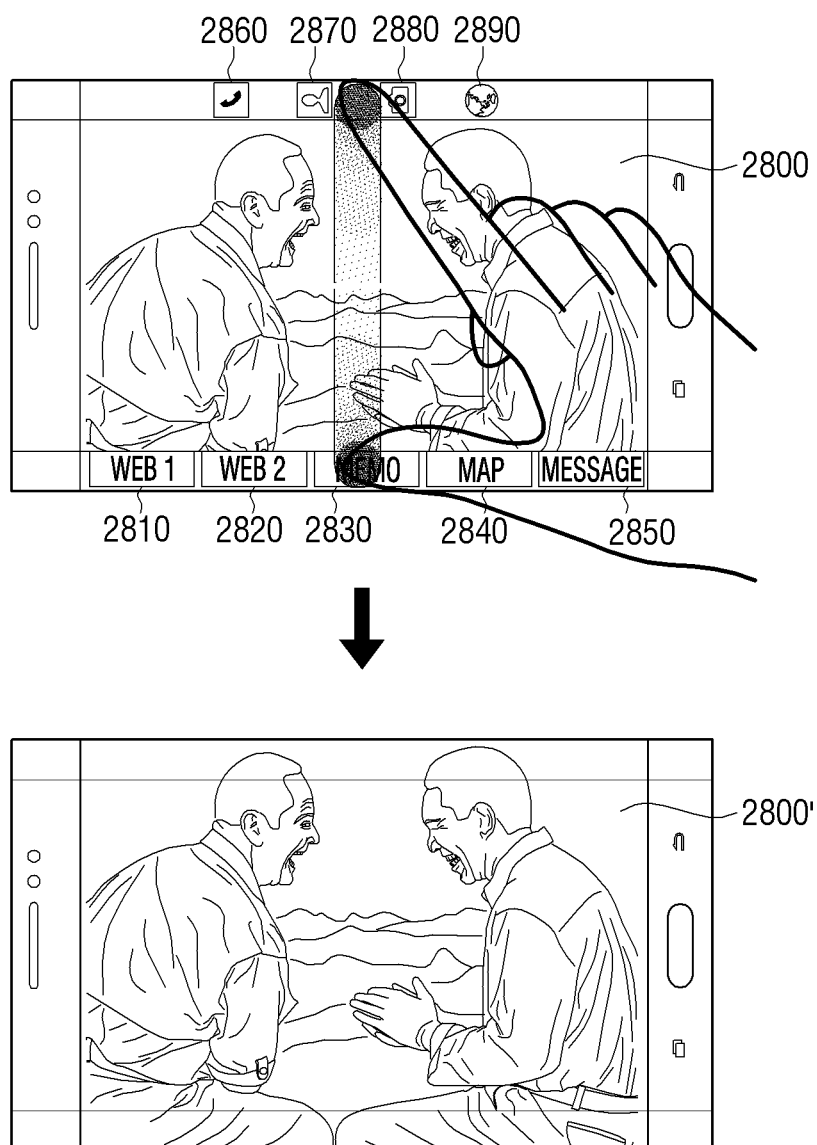

For example, as illustrated in the upper half of FIG. 28, with the user terminal device 1000 gripped in vertical orientation, while a video content 2800 is played on the main region and a plurality of UI elements 2810 to 2890 are displayed on the sub regions on the upper side surface and the right side surface, in response to sensing a pinch-in interaction which simultaneously touches on one point on the sub region on the upper side surface and one point on the sub region on the lower side surface, the controller 200 may control the curved display 100 to extend the video content 2800 displayed on the main region to display the same over to the sub regions. At this time, the controller 200 may control the curved display 100 to remove the UI included in the sub regions to thus display the extended video content 2800 on the main region.

As described above with reference to FIGS. 25 to 28, the user terminal device 1000 may provide multitasking or fast screen changes in response to user interactions.

FIGS. 29 to 37 are views provided to explain certain embodiments in which, when user terminal device 1000 is switched to a share mode in connection with one or more other user terminal devices, the curved display 100 including a plurality of sub regions is used to perform sharing operation with the one or more other user terminal devices.

First, when the user terminal device 1000 is connected to one or more other user terminal devices for communication, the controller 200 may enter the share mode to perform sharing operation with the one or more other user terminal devices. Accordingly, in response to entering the share mode to perform sharing operation with the one or more other user terminal devices, the controller 200 may control the curved display 100 to display a UI element corresponding to the one or more other user terminal devices on the first sub region among a plurality of sub regions, while displaying a UI element associated with a sharing operation on the second sub region.

Figure 29:
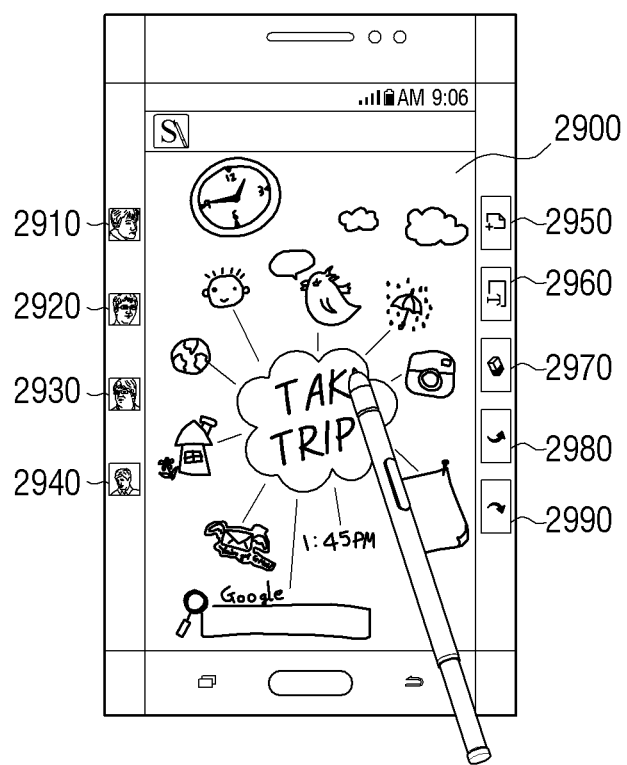

To be specific, to perform a sharing operation with the other user terminal devices (e.g., first to fourth user terminal devices) using drawing application, as illustrated in FIG. 29, the controller 200 may control the curved display 100 to display a drawing application execution screen 2900 on the main region, display icons 2910 to 2940 corresponding to the first to fourth user terminal devices on the sub region on the left side surface, and display a plurality of icons 2950 to 2990 associated with the drawing application on the sub region on the right side surface. As illustrated in FIG. 29, the icons 2910 to 2940 corresponding to the first to fourth user terminal devices may include images of a user of the other user terminal devices, but are not limited thereto. Accordingly, name, ID or contact information of the user of the other user terminal devices may be included. Further, the icons 2910 to 2940 corresponding to the first to fourth user terminal devices may have a unique indicator (e.g., color, brightness, transparency, etc.) representing the first to fourth user terminal devices.

Further, while connecting to a plurality of other user terminal devices, in response to sensing a specific interaction for one of the plurality of other user terminal devices, the controller 200 may perform a sharing operation with the other user terminal device 1000 for which the specific interaction is detected.

Figure 30:
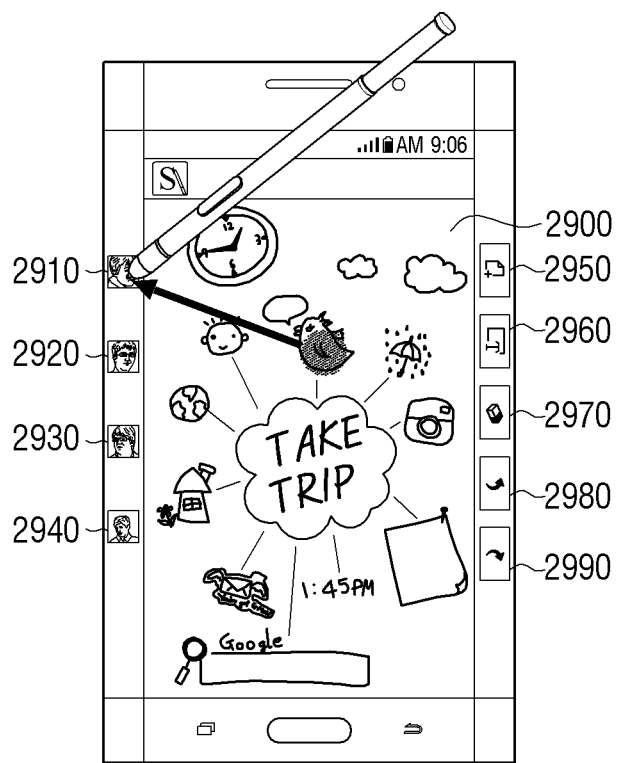

That is, as illustrated in FIG. 30, while a drawing application is executed on the main region, in response to sensing a drag interaction, which touches on one point on the drawing application and drags to an icon 2910 corresponding to a first user, the controller 200 may share the work on the drawing operation using the drawing application currently displayed on the main region, with the first user.

When the user of the user terminal device 1000 share the drawing work with the first user, editions made by the users may be indicated in different manners. For example, the edition by the user of the user terminal device 1000 may be expressed in black, while the edition by the first user may be expressed in blue. This manner of expressing may be included in an icon corresponding to each user. For example, an icon 2910 corresponding to the first user may have blue background screen.

Further, while the sharing operation is performed, in response to receiving a message from the other user terminal device 1000, the controller 200 may control the curved display 100 to display the message received from the other user terminal device 1000 on the main region.

Figure 31:
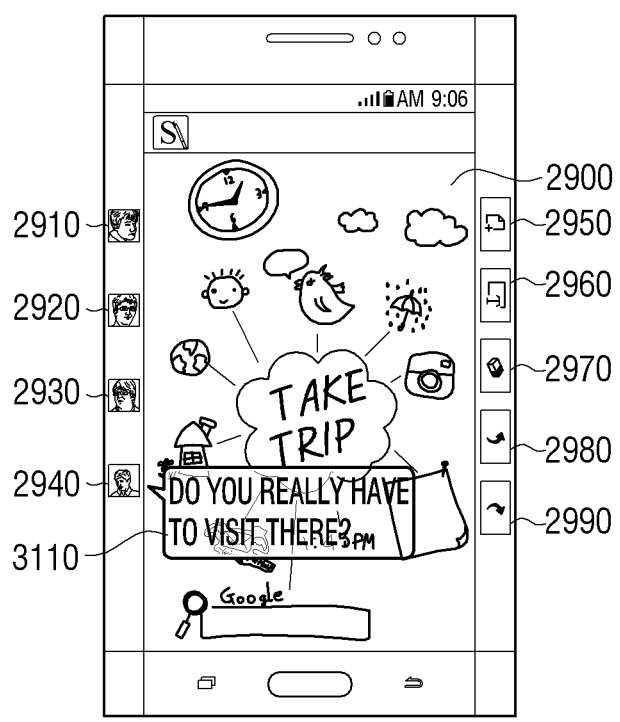

That is, during a sharing operation with the first to fourth user terminal devices with the drawing application, in response to receiving a message from the fourth user terminal device 1000, as illustrated in FIG. 31, the controller 200 may control the curved display 100 to display a message 3110 received from the fourth user terminal device 1000 in a proximity to an icon 2940 corresponding to the fourth user terminal device 1000. The message 3110 received from the fourth user terminal device 1000 may include content of the message and when the message is selected, and a chatting screen to exchange messages with the fourth user may be displayed on the main region.

Figure 32:
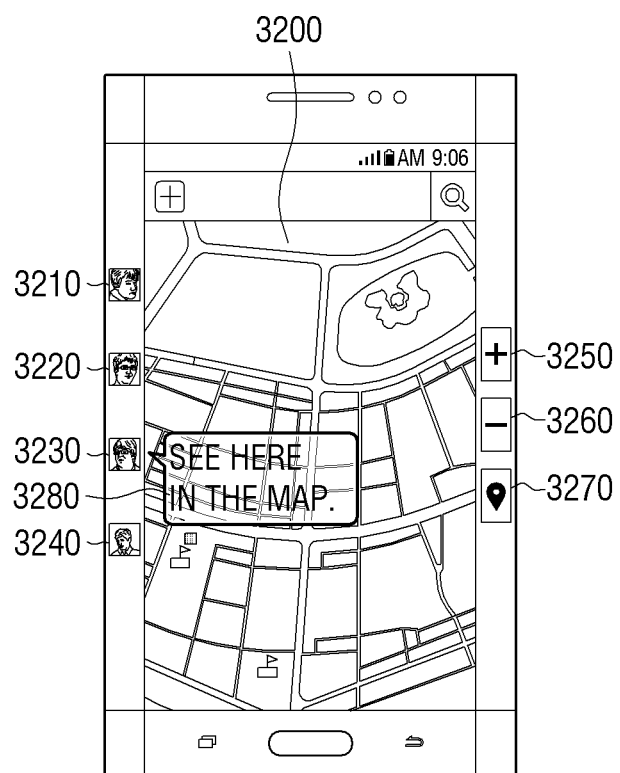

For another example, when the first to fourth user terminal devices execute the same map application in connection with each other, the controller 200 may control the curved display 100 to display a map screen 3200 on the main region, display icons 3210 to 3240 corresponding to the other users on the sub region on the left side surface, and display icons 3250 to 3270 to control the map application on the sub region on the right side surface. In response to receiving a message from the third user terminal device 1000, as illustrated in FIG. 32, the controller 200 may control the curved display 100 to display a message 3210 received from the third user terminal device 1000, in a proximity to an icon 2930 corresponding to the third user terminal device 1000.

Figure 33:
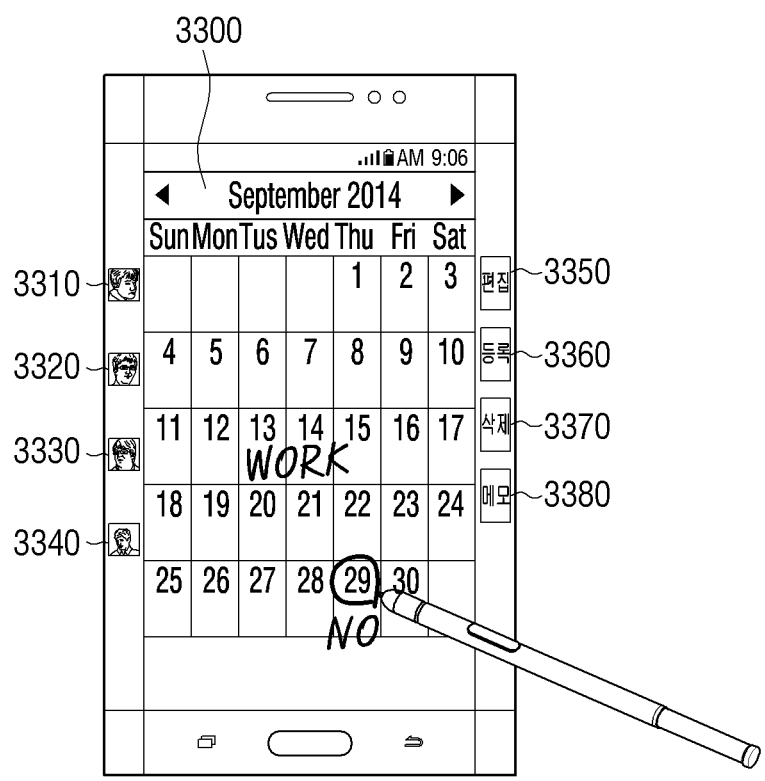

Further, the controller 200 may perform a sharing operation with the other user terminal devices using a variety of applications. To be specific, as illustrated in FIG. 33, the controller 200 may perform sharing operation with the other user terminal devices using a schedule application. First, when the schedule application is executed in the share mode, the controller 200 may control the curved display 100 to display a schedule screen 3300 on the main region, display icons 3310 to 3340 corresponding to the other users on the sub region on the left side surface, and display icons 3350 to 3380 to control the schedule application on the sub region on the right side surface.

At this time, when a user of the other user terminal device 1000 writes a note on the schedule application, the controller 200 may control the curved display 100 to receive the written note and display the same on the current screen. That is, the user may instantly set an appointment with a plurality of users, using the schedule application.

Figure 34:
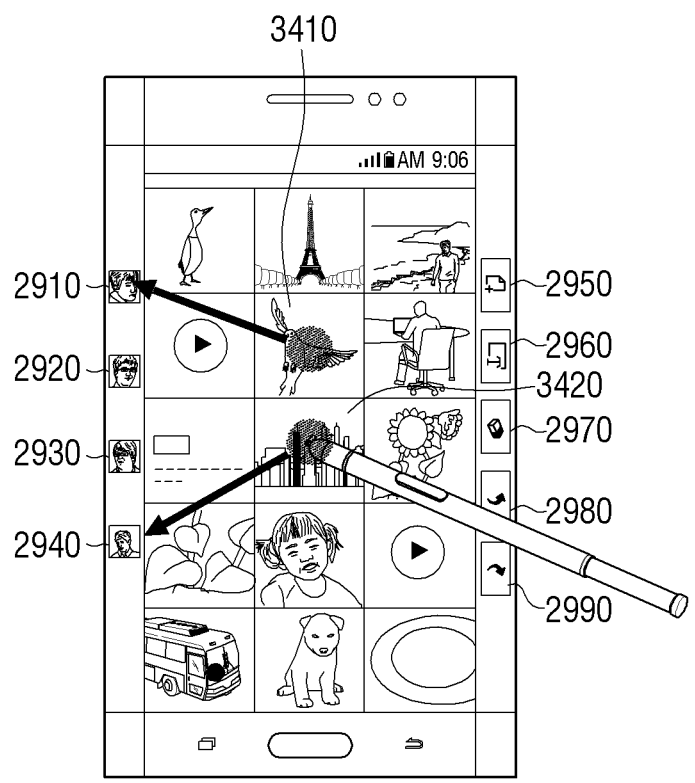

For another example, the controller 200 may control the communicator 330 to send image contents to the other connected user terminal devices, using a gallery application. To be specific, when the gallery application is executed in the share mode, the controller 200 may control the curved display 100 to display a content list screen 3400 on the main region, display icons 2910 to 2940 corresponding to the other users on the sub region on the left side surface, and display icons 2950 to 2990 to control the gallery application on the sub region on the right side surface. Further, as illustrated in FIG. 34, in response to dragging a thumbnail image 3410 of the first image content to an icon 2910 corresponding to the first user, and dragging a thumbnail image 3420 of a second image content to an icon 2940 corresponding to the fourth user, the controller 200 may control the communicator 330 to transmit the first image content to the other user terminal device 1000 corresponding to the first user and transmit the second image content to the other user terminal device 1000 corresponding to the fourth user.

Figure 35:
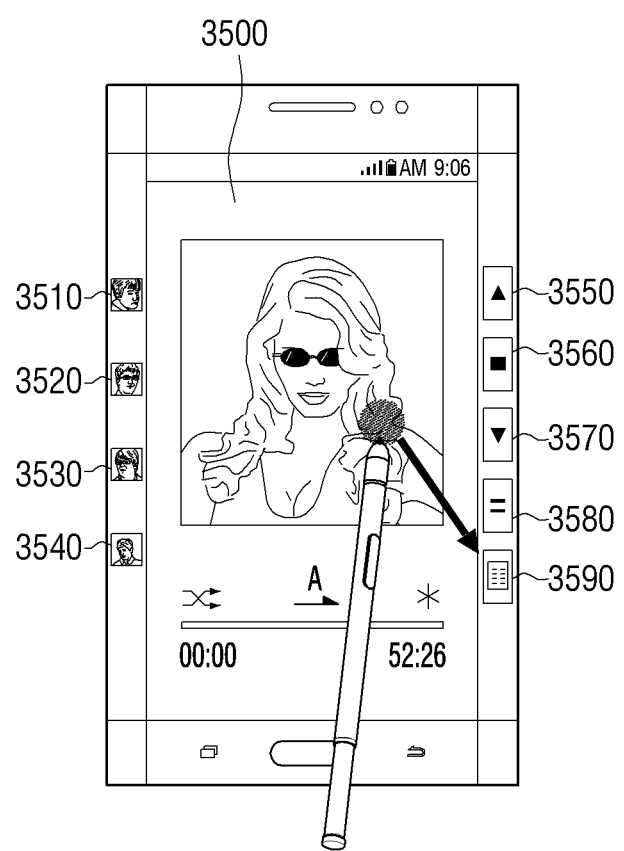
Figure 36:
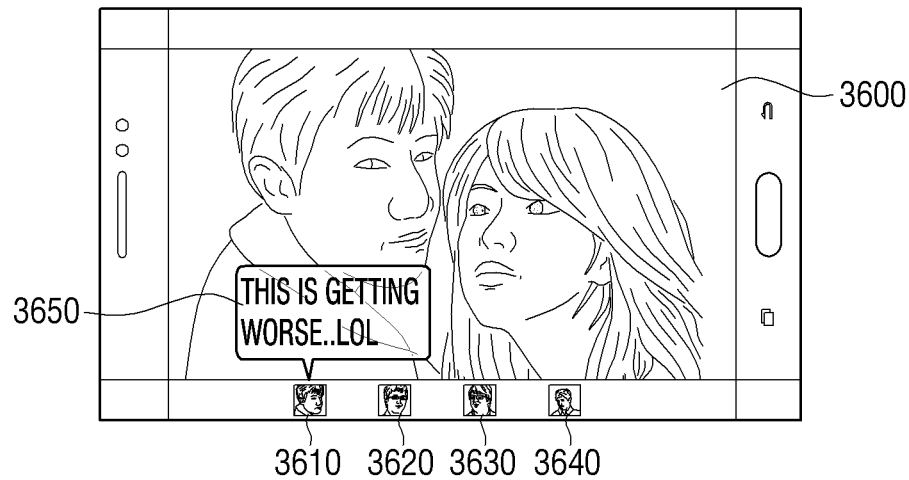

For another example, the controller 200 may generate a shared playlist for the other currently connected user terminal devices. To be specific, when a music application is executed in share mode, the controller 200 may control the curved display 100 to display a music play screen 3500 on the main region, display icons 3510 to 3540 corresponding to the other users on the sub region on the left side surface, and display icons 3550 to 3590 to control the music application on the sub region on the right side surface. Further, as illustrated in FIG. 35, while a plurality of users are executing the music application using the same playlist, in response to touching on one point 3550 on the main region and dragging to a playlist icon 3590, the controller 200 may add the music currently displayed on the main region to the playlist.

For another example, the controller 200 may allow the user to execute a video content by using a video application, while exchanging dialogues with a plurality of other users. To be specific, when the video application is executed in the share mode, the controller 200 may control the curved display 100 to display video content 3600 on the main region, and display icons 3610 to 3640 corresponding to the other users on the sub region on the lower side surface. While viewing the same video content with the plurality of other users, in response to receiving a text message from a first user, the controller 200 may control the curved display 100 to display the text message in a proximity to an icon 3610 corresponding to the first user, among the plurality of icons 3610 to 3640.

Figure 37:
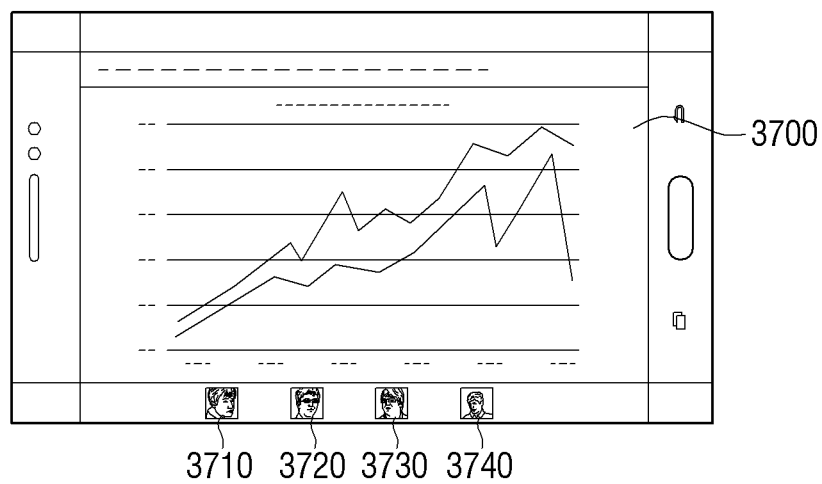

For another example, the controller 200 may share a document file with a plurality of other users during a meeting, by using a document application 3700. To be specific, when the document application is executed in the share mode, as illustrated in FIG. 37, the controller 200 may control the curved display 100 to display a document file on the main region, and display a plurality of icons 3710 to 3740 corresponding to the plurality of users on the sub region on the lower side surface.

As described in the embodiments of FIGS. 29 to 37, the user is able to perform various sharing operations with the other users, which can provide new user experience.

FIGS. 38 to 43 are views provided to explain examples of arranging icons on a plurality of sub regions according to a level of security and displaying the same, according to an embodiment.

The controller 200 may control the curved display 100 to display a UI associated with tasks sharable with the other users, on the first sub region among a plurality of sub regions, and display UIs associated with private tasks on the second sub region.

Figure 38:
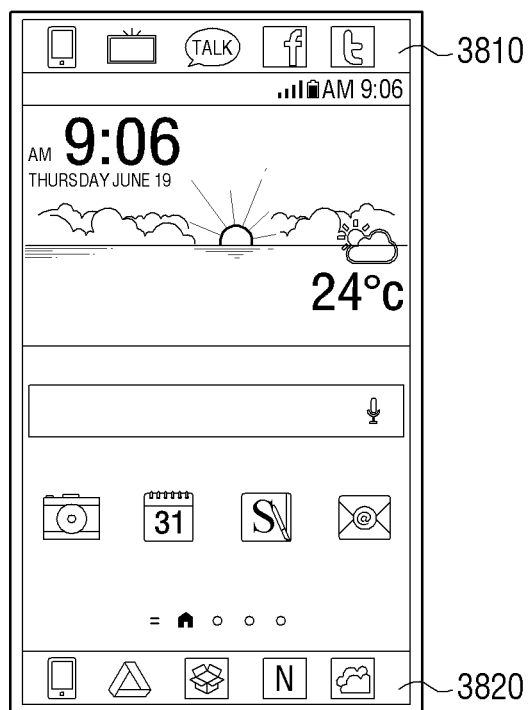

For example, as illustrated in FIG. 38, the controller 200 may control the curved display 100 to display icons corresponding to sharable peripherals or sharable applications (e.g., SNS application) on the sub region 3810 on the upper side surface, and display icons corresponding to downloadable peripherals or applications for keeping private files (e.g., cloud storage service application) on the sub region 3820 on the lower side surface.

Accordingly, after a specific content is touched, in response to dragging to one of a plurality of icons included in the sub region 3810 on the upper side surface, the controller 200 may control the communicator 330 to upload the specific content to a peripheral or an application corresponding to the dragged icon. Further, after the specific content is touched, in response to dragging to one of the plurality of icons included in the sub region 3820 on the lower side surface, the controller 200 may control the communicator 330 to upload the specific content to a peripheral or an application corresponding to the dragged icon.

Figure 39:

For another example, as illustrated in FIG. 39, the controller 200 may control the curved display 100 to display an icon corresponding to an application requiring lower level of security (e.g., photographing application, web browsing application, etc.) on the sub region 3910 on the upper side surface, while displaying an icon corresponding to an application requiring higher level of security (e.g., download application, bank transaction application, security message application, etc.) on the sub region 3920 on the lower side surface.

To be specific, in normal circumstance, the controller 200 may control the curved display 100 not to display an icon corresponding to an application requiring a high level of security, on the sub region 3920 on the lower side surface. However, when user authentication is conducted, the controller 200 may control the curved display 100 to display an icon corresponding to an application requiring a high level of security.

Figure 40:
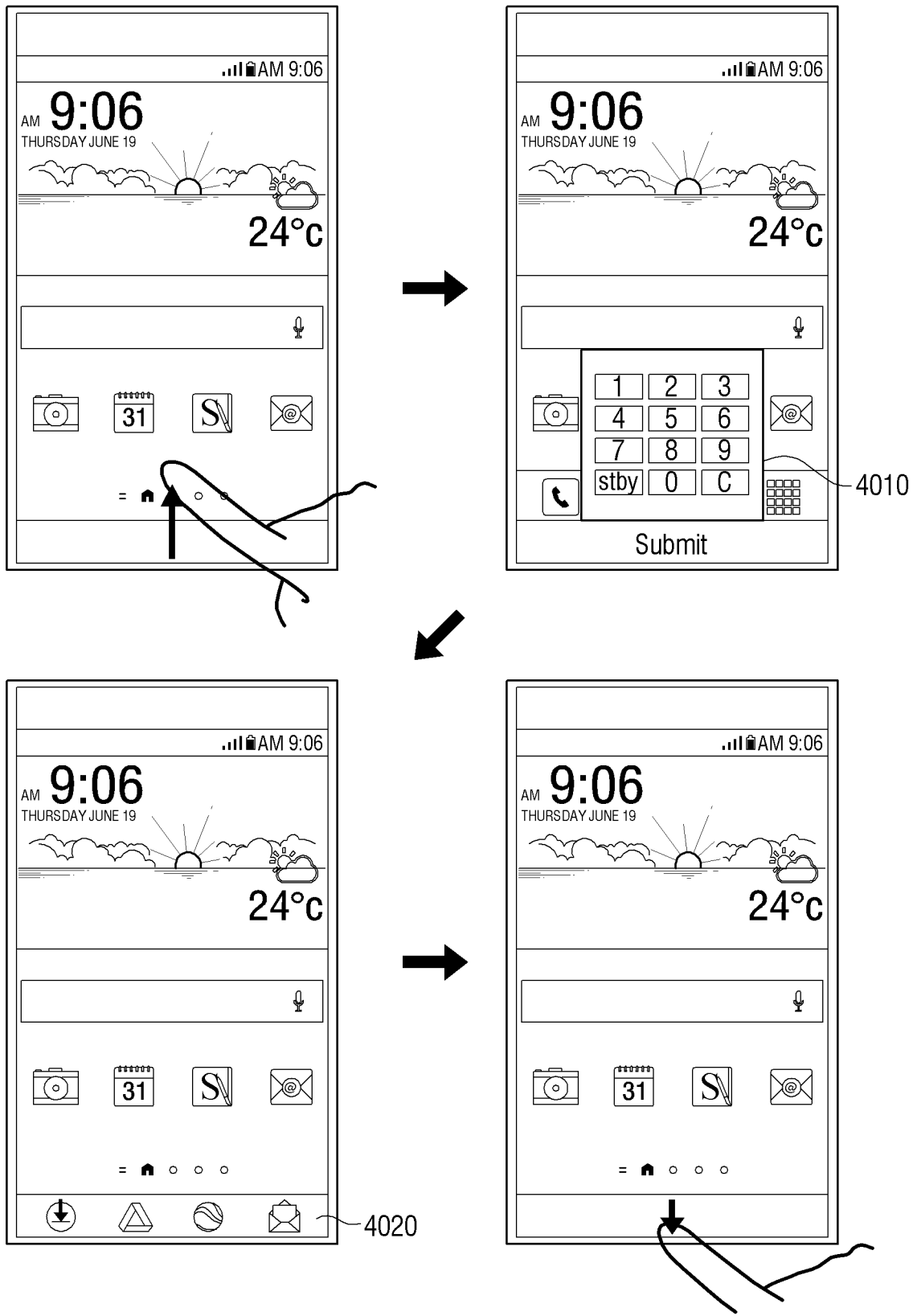

For example, as illustrated in the first screen of FIG. 40, while the home screen is displayed, in response to sensing a drag interaction, which touches on one point on the sub region on the lower side surface and drags to an upward direction, as illustrated in the second screen of FIG. 40, the controller 200 may control the curved display 100 to display a UI 4010 to input a password, on a lower end of the main screen. In response to inputting of a password to the UI 4010 configured to input a password, as illustrated in the third screen of FIG. 40, the controller 200 may control the curved display 100 to display icons corresponding to applications requiring high level of security (e.g., download application, bank transaction application, or security message application). Then in response to sensing a drag interaction which touches on one point on the lower end area of the main region and drags to a downward direction, as illustrated in the fourth screen of FIG. 40, the controller 200 may control the curved display 100 to remove icons displayed on the sub region 4020 on the lower side surface.

Meanwhile, the controller 200 may determine icons to display on the sub region on the upper side surface and icons to display on the sub region on the lower side surface, depending on the required level of security, but is not limited thereto. Accordingly, the above may be determined based on user input.

Further, in response to receiving an external message, the controller 200 may control the curved display 100 to display on different sub regions according to required levels of security of the received messages.

Figure 41:
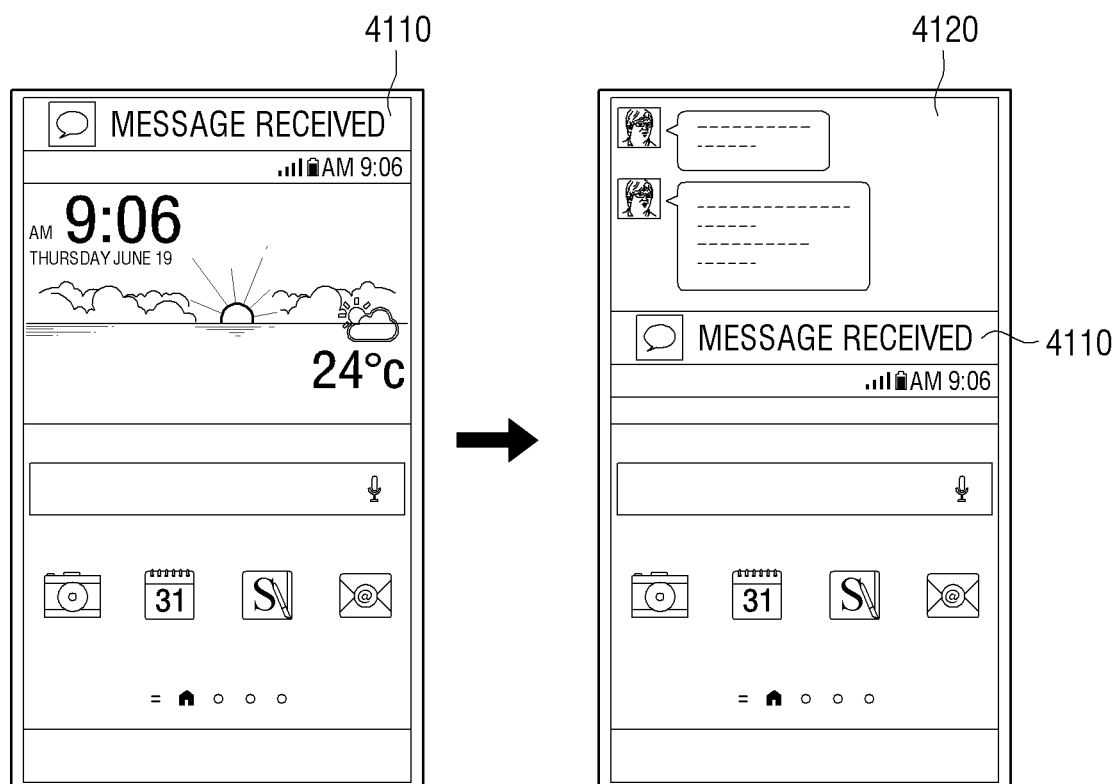

To be specific, in response to receiving a general text message requiring lower level of security from outside, as illustrated in the left-hand side of FIG. 41, the controller 200 may control the curved display 100 to display a UI 4110 to notify the reception of a message, on the sub region on the upper side surface. Then in response to sensing a drag interaction which touches on the UI 4110 notifying reception of the message and drags to a downward direction, as illustrated in the right-hand side of FIG. 41, the controller 200 may control the curved display 100 to display the content 4120 of the received message, as the UI 4110 is moved downward.

Figure 42:
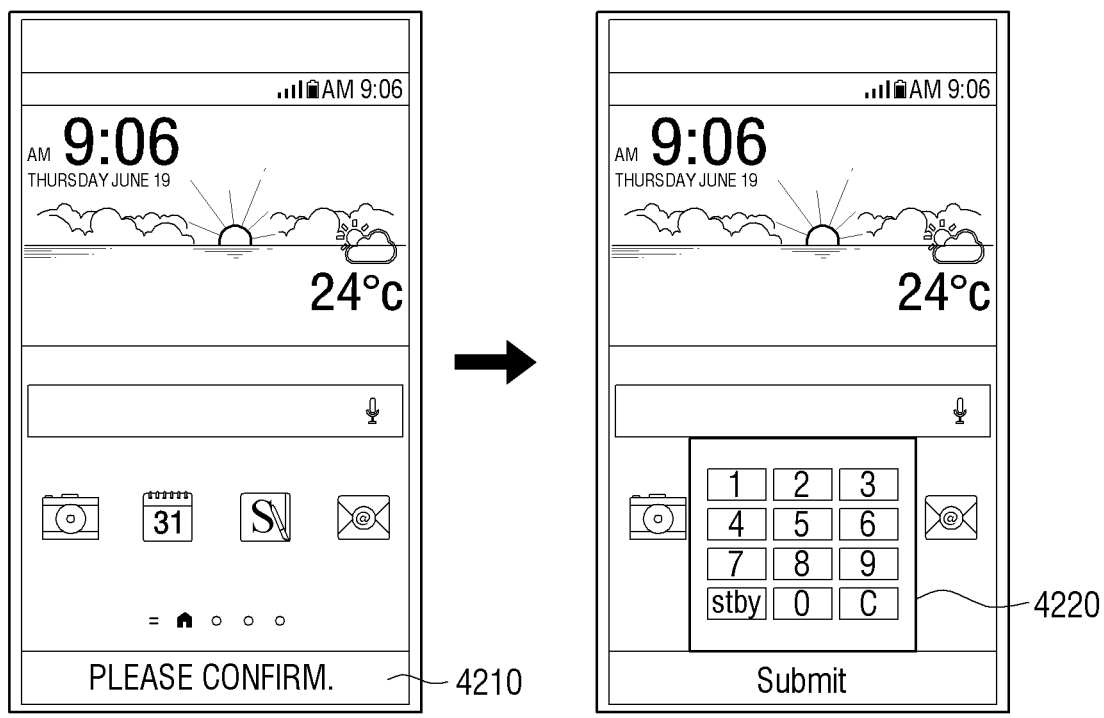

However, in response to receiving a message requiring a high level of security from outside, as illustrated in the left-hand side of FIG. 42, the controller 200 may control the curved display 100 to display a UI 4210 to notify reception of message on a sub region on the lower side surface. In response to touching on the UI 4210 notifying the reception of the message, as illustrated in the right-hand side of FIG. 42, the controller 200 may control the curved display 100 to display a password input UI 4220 to view the security message. In response to inputting a password through the password input UI 4220, the controller 200 may control the curved display 100 to display the received security message on the main region.

Figure 43:
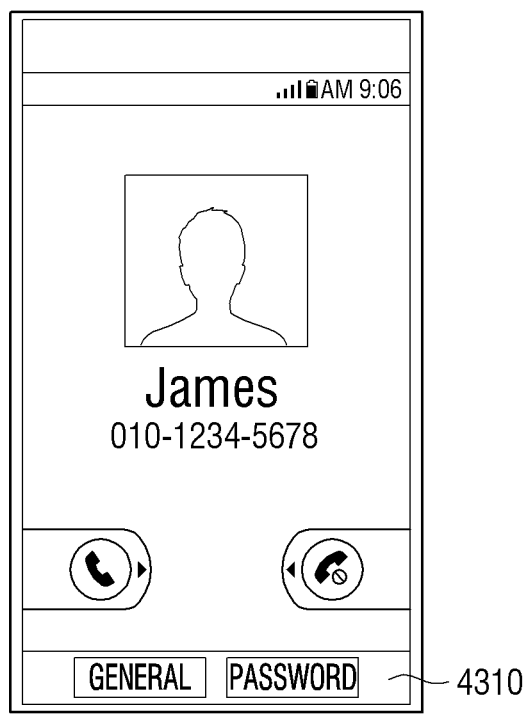

For another example, in response to receiving from outside a request for telephone call from a telephone number requiring a higher level of security, as illustrated in the left-hand side of FIG. 43, the controller 200 may control the curved display 100 to display a UI 4310, on the sub region on the lower side surface, to determine whether the call is for general mode or security mode. In response to selecting a general icon, the controller 200 may conduct a telephone call in general mode, while in response to selecting a password icon, the controller 200 may conduct a telephone call in security mode. The "telephone call in security mode" as used herein may refer to a mode in which user voices are encrypted before transmission and reception.

As illustrated in FIGS. 38 to 43, user is able to perform work while maintaining security for the jobs that require high level of security, because the work requiring lower level of security is displayed on the sub region on the upper side surface which is viewable to the other users, while the work requiring higher level of security is displayed on the sub region on the lower side surface which is not viewable to the other users.

FIGS. 44 to 47 are views provided to explain various embodiments of performing a plurality of applications, in which UIs associated with the plurality of applications are displayed on a plurality of sub regions.

When a plurality of applications are executed, the controller 200 may control the curved display 100 to display UIs associated with the plurality of applications on plurality of sub regions, respectively.

Figure 44:
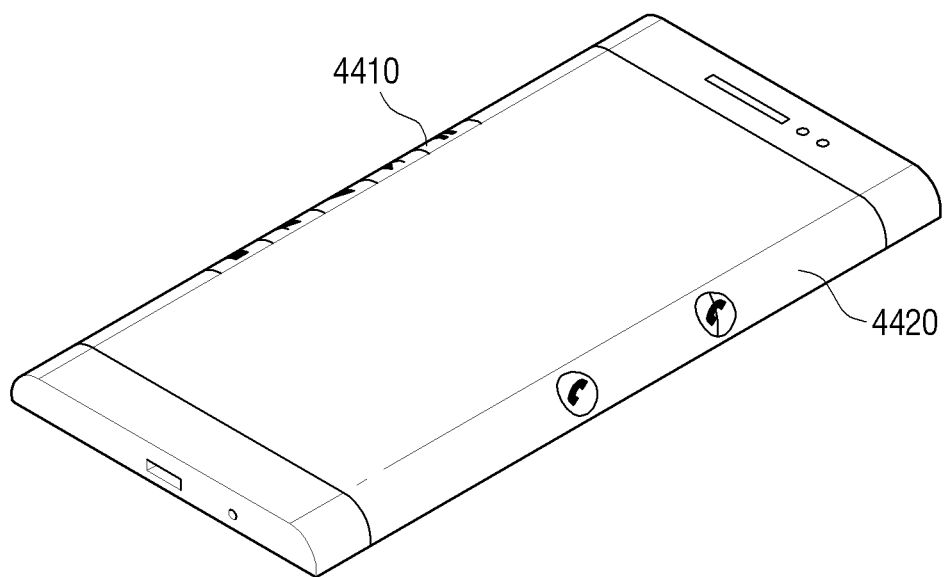

That is, while the video application is executed, in response to receiving a request for a call from outside, as illustrated in FIG. 44, the controller 200 may control the curved display 100 to display the UI associated with the video application on the sub region 4410 on the left side surface, while displaying UI associated with the call application on the sub region 4420 on the right side surface. That is, UIs to control different applications may be displayed on the plurality of sub regions, respectively.

Figure 45A:
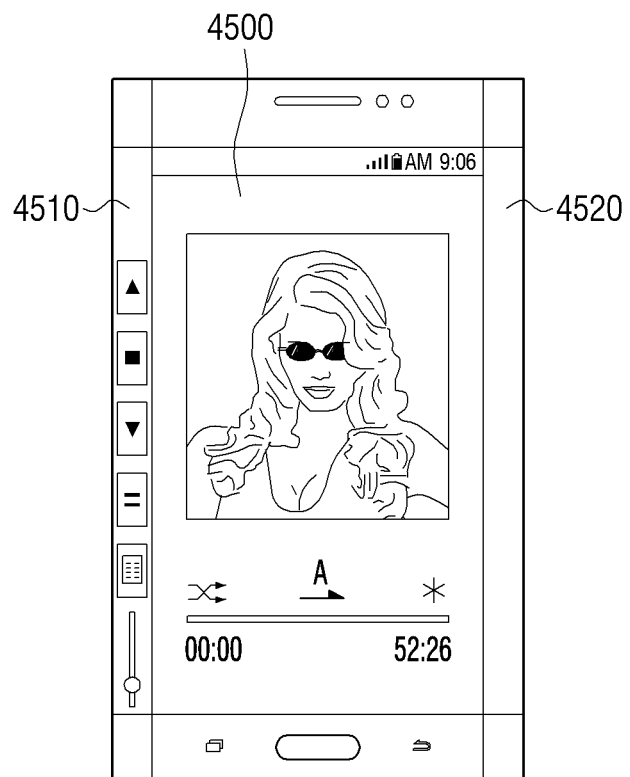

In one embodiment, when the music application is executed, as illustrated in FIG. 45A, the controller 200 may control the curved display 100 to display a music application execution screen on the main region 4500, while displaying a UI, including therein a UI element to remove the music application, on the sub region 4510 on the left side surface.

Figure 45B:
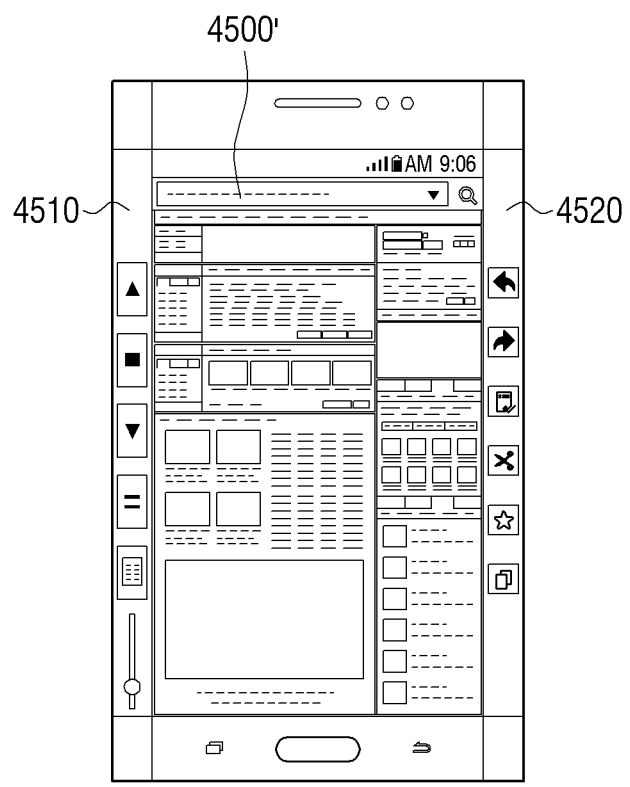

At this time, in response to executing a web application according to a user command, as illustrated in FIG. 45B, the controller 200 may control the curved display 100 to display a UI to control the music application on the sub region 4510 on the left side surface, display a UI to control the web application on the sub region 4520 on the right side surface, and display a web screen on the main region 4500'. At this time, the controller 200 may cause the music played back by the music application to be outputted through a speaker 390 or other audio output terminal.

While the main region 4500' currently does not display the music application execution screen, in response to sensing a touch interaction for one of the plurality of UI elements included in the sub region 4510 on the left side surface, the controller 200 may control the function of the music application according to the touch interaction detected for the UI element. For example, in response to sensing a touch interaction for a volume adjustment UI element among a plurality of UI elements included in the sub region 4510 on the left side surface, the controller 200 may adjust the volume of the currently-played music, in accordance with the touch interaction as detected for the volume adjustment UI element.

Figure 45C:
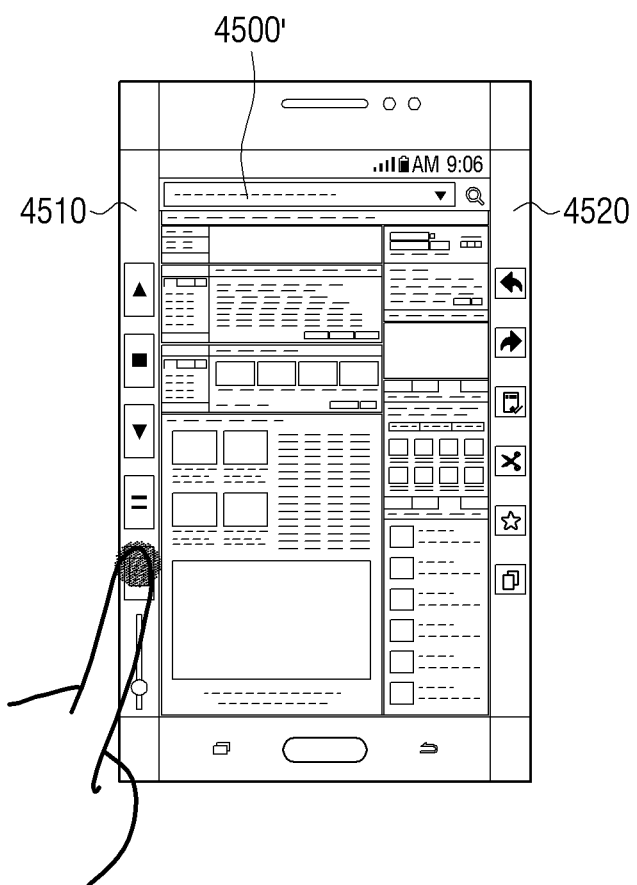
Figure 45D:
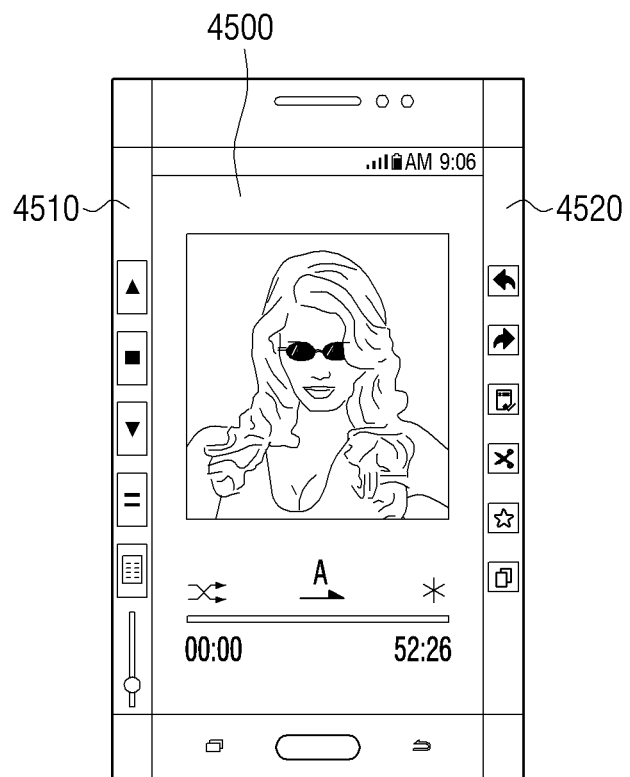

Further, as illustrated in FIG. 45C, in response to sensing a touch interaction for the UI displayed on the sub region 4510 on the left side surface, as illustrated in FIG. 45D, the controller 200 may control the curved display 100 to remove the web screen that has been displayed on the main region 4500 and display the music application execution screen.

Figure 46A:
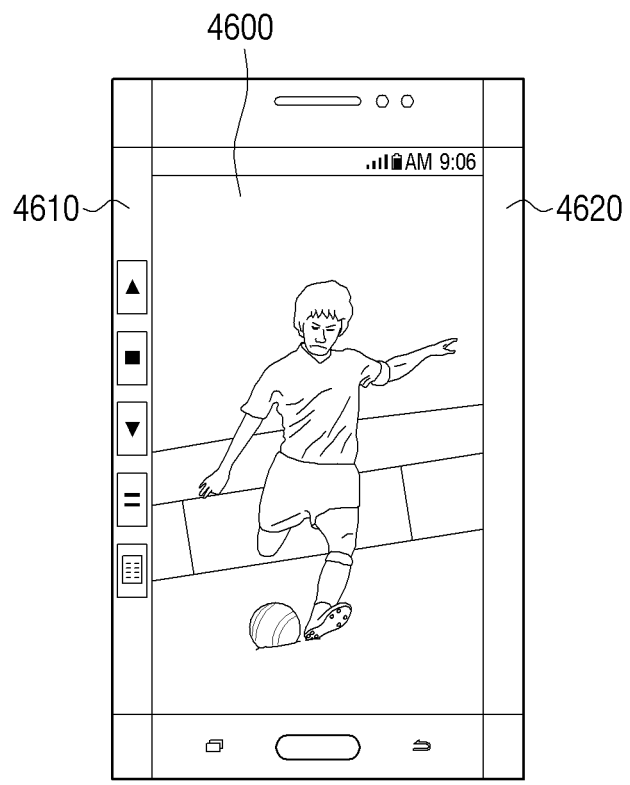

According to another embodiment, when the video application is executed, as illustrated in FIG. 46A, the controller 200 may control the curved display 100 to display the video content on the main region 4600 and display a UI including a plurality of UI elements to control the video application, on the sub region 4610 on the left side surface.

Figure 46B:
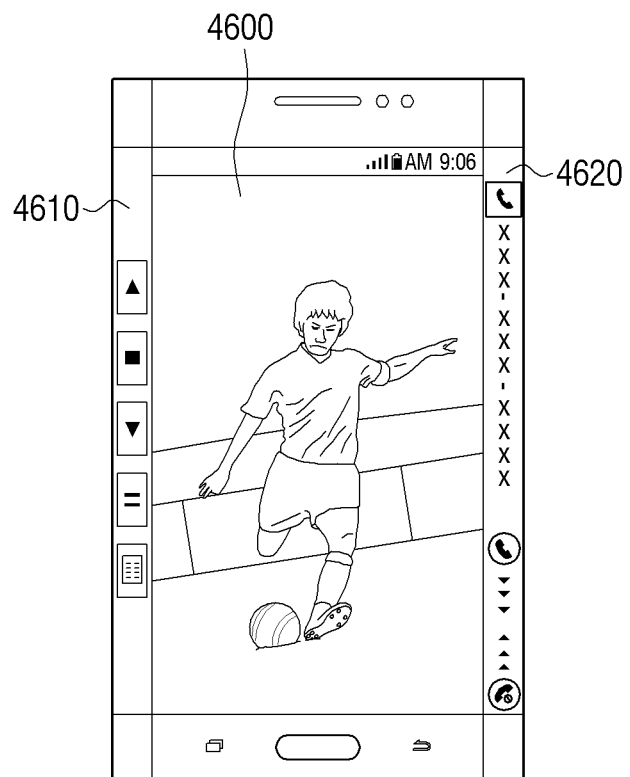

In response to receiving a request to receive a call from an external device, as illustrated in FIG. 46B, the controller 200 may control the curved display 100 to display a UI to notify of the request to receive a call, on the sub region 4620 on the right side surface. The UI displayed on the sub region 4620 on the right side surface may include sender information (e.g., telephone number, sender's name, sender ID, etc.), or a UI element to accept or reject a call.

Figure 46C:
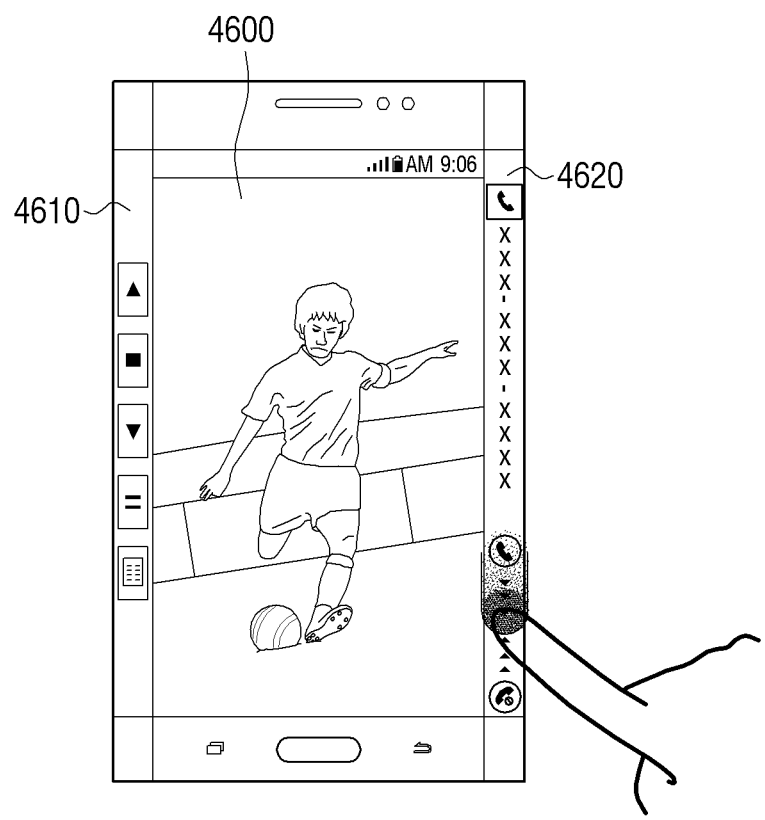
Figure 46D:
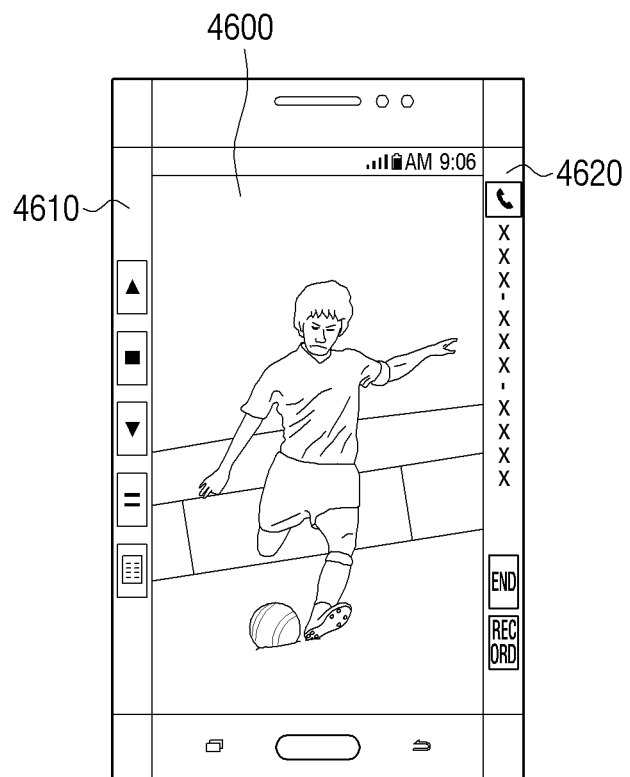

Further, as illustrated in FIG. 46C, in response to sensing a touch interaction to accept a call, through a UI displayed on the sub region 4620 on the right side surface, the controller 200 may conduct a telephone call with the external device. In this case, as illustrated in FIG. 46D, the controller 200 may control the curved display 100 to change the UI displayed on the sub region 4620 on the right side surface into a UI that ca notify or control the current call status and display the same. At this time, the controller 200 may control the speaker 390 not to output audio of the video content currently played on the main region 4600, but to output call signals.

When a plurality of execution screens corresponding to a plurality of applications are displayed on the main region of the curved display 100, the controller 200 may control the curved display 100 to display a UI corresponding to a specific application, on a sub region in a proximity to the execution screen of the specific application.

Figure 47A:
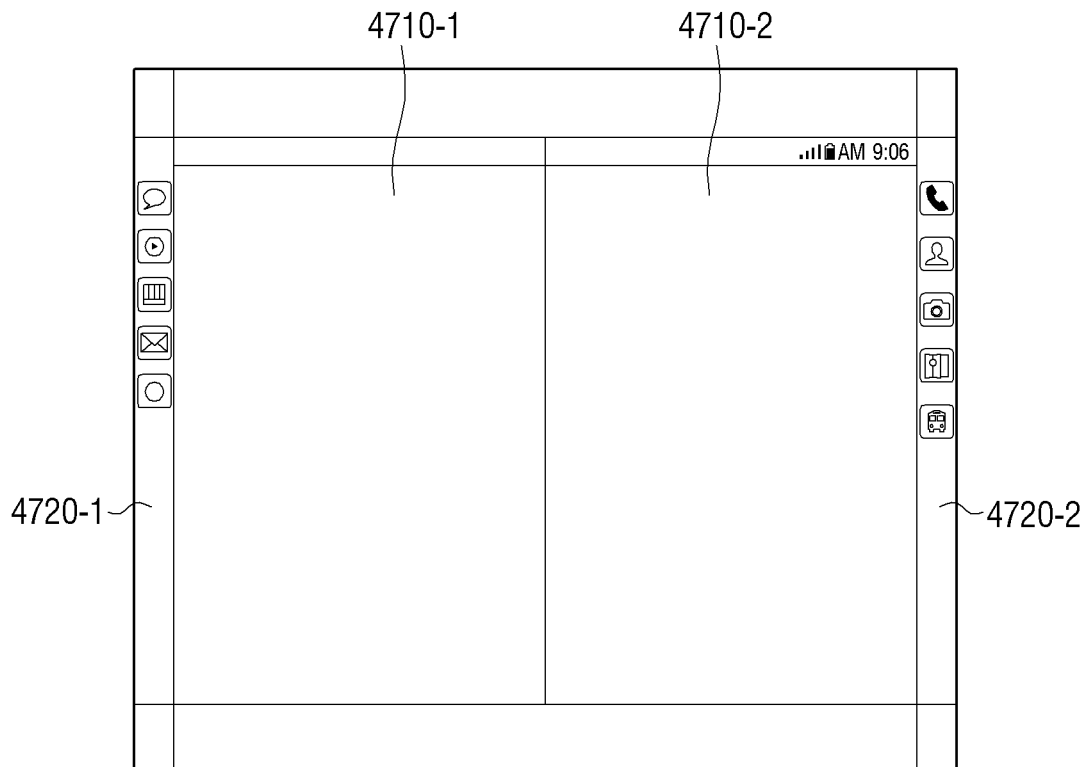

To be specific, as illustrated in FIG. 47A, when an execution screen of a first application is displayed on the left side 4710-1 of the main region and an execution screen of a second application is displayed on the right side 4710-2 of the main region, the controller 200 may control the curved display 100 to display a UI corresponding to the first application on the sub region 4720-1 on the left side surface, and display a UI corresponding to the second application on the sub region 4720-2 on the right side surface.

Figure 47B:
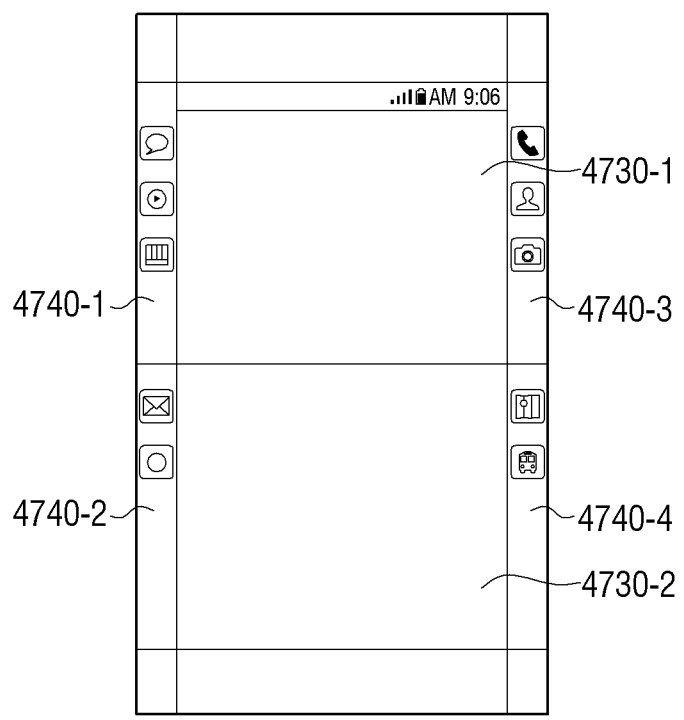

For another example, as illustrated in FIG. 47B, when an execution screen of a first application is displayed on the upper side 4730-1 of the main region and an execution screen of a second application is displayed on the lower side 4730-2 of the main region, the controller 200 may control the curved display 100 to display a UI corresponding to the first application on the upper end 4740-1 of the sub region on the left side surface and upper end 4740-3 of the sub region on the right side surface, and display a UI corresponding to the second application on the lower end 4740-2 of the sub region on the left side surface and lower end 4740-4 of the sub region on the right side surface.

Figure 47C:
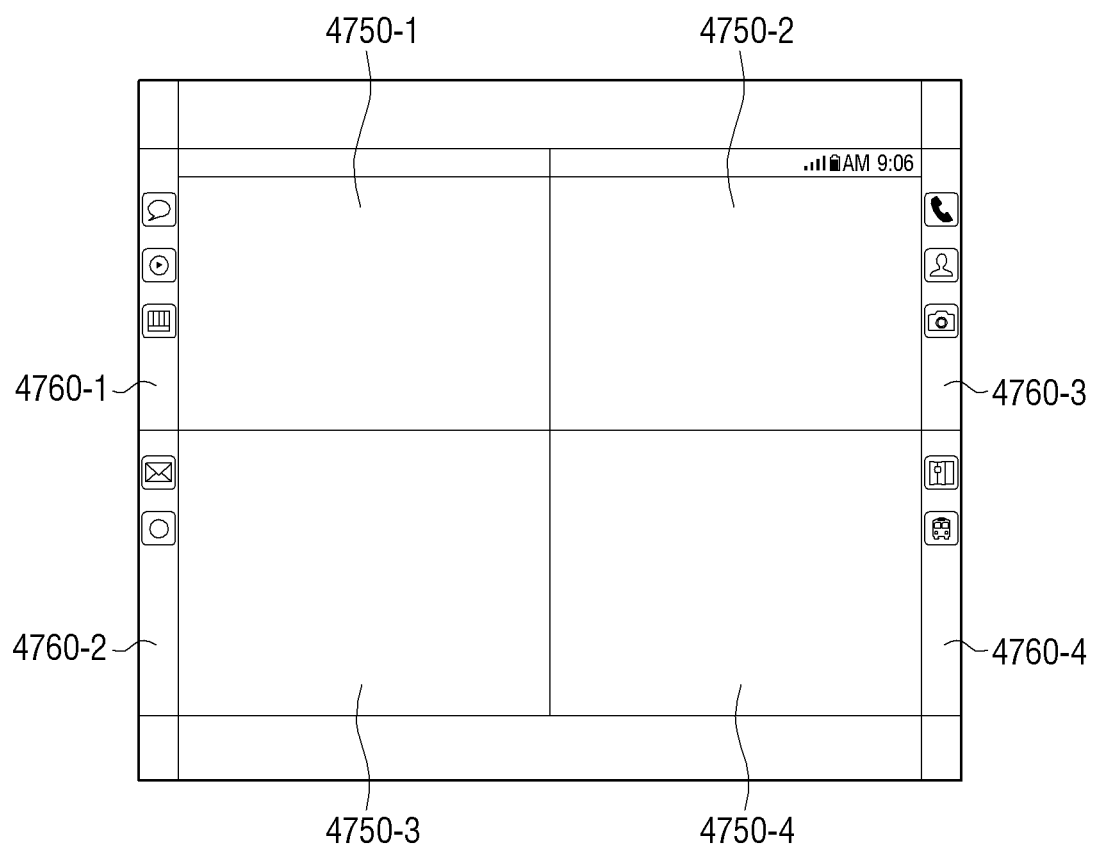

For another example, as illustrated in FIG. 47C, when the execution screen of the first application is displayed on the upper-left end 4750-1 of the main region, the execution screen of the second application is displayed on the upper-right end 4750-2 of the main region, the execution screen of the third application is displayed on the lower-left end 4750-3 of the main region, and the execution screen of the fourth application is displayed on the lower-right end 4750-4 of the main region, the controller 200 may control the curved display 100 to display a UI corresponding to the first application on the upper end 4760-1 of the sub region on the left side surface, display a UI corresponding to the second application on the upper end 4760-3 of the sub region on the right side surface, display a UI corresponding to the third application on the lower end 4760-2 of the sub region on the left side surface, and display a UI corresponding to the fourth application on the lower end 4760-4 of the sub region on the right side surface.

As described above, user is able to more conveniently and more intuitively perform multitasking, because UIs to control a plurality of applications are simultaneously displayed on a plurality of sub regions.

Figure 48:
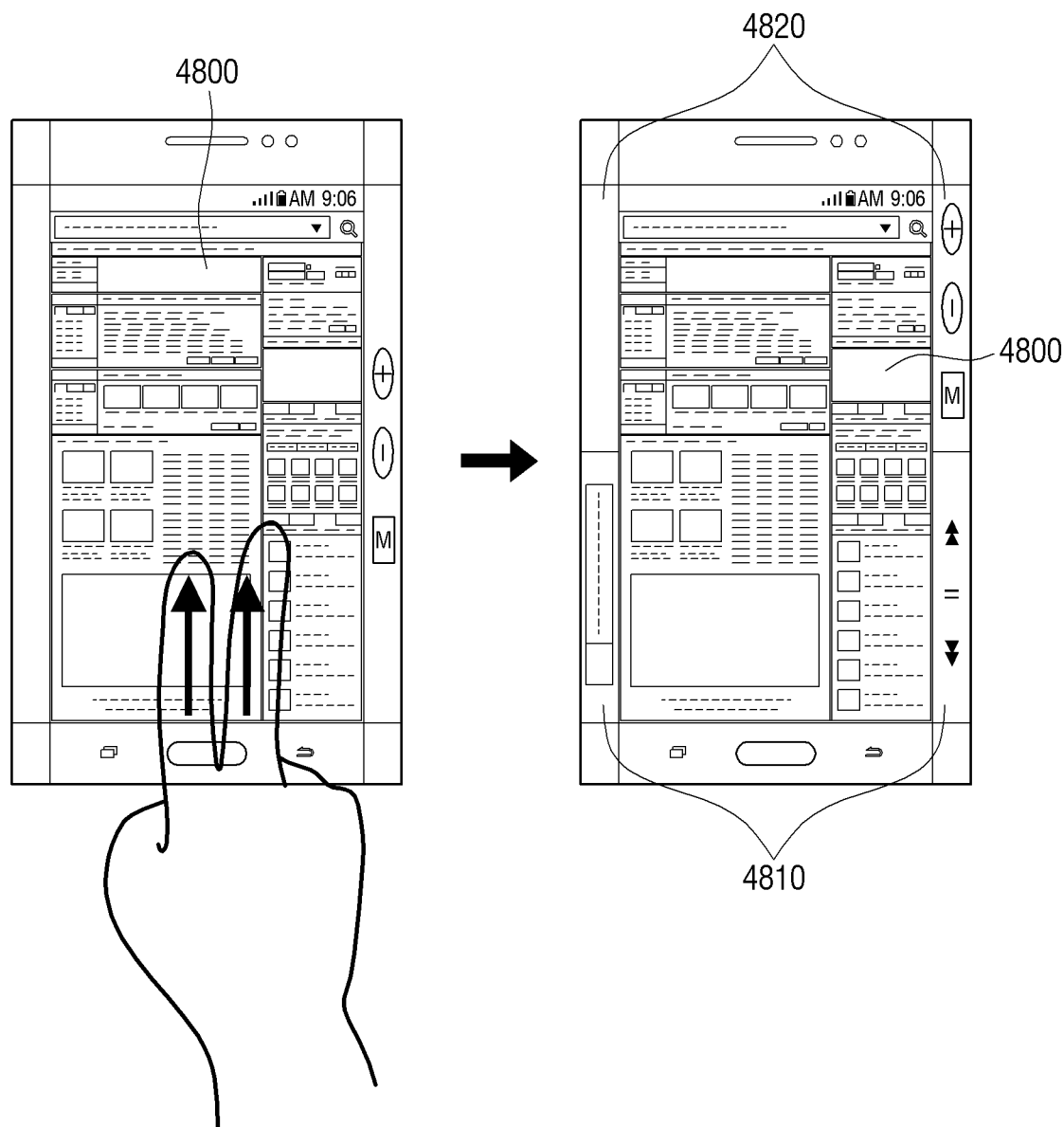
Figure 49:
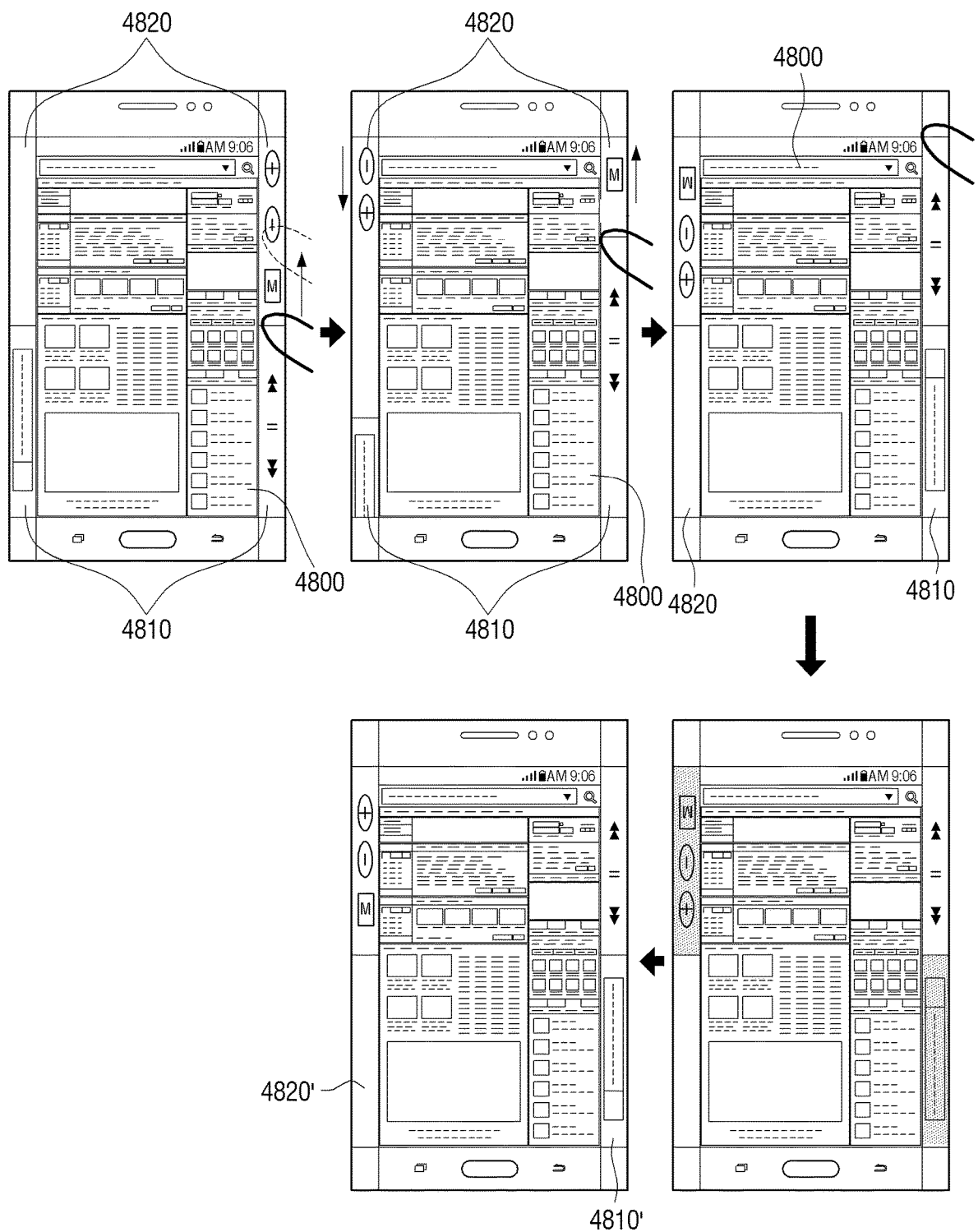
Figure 50:
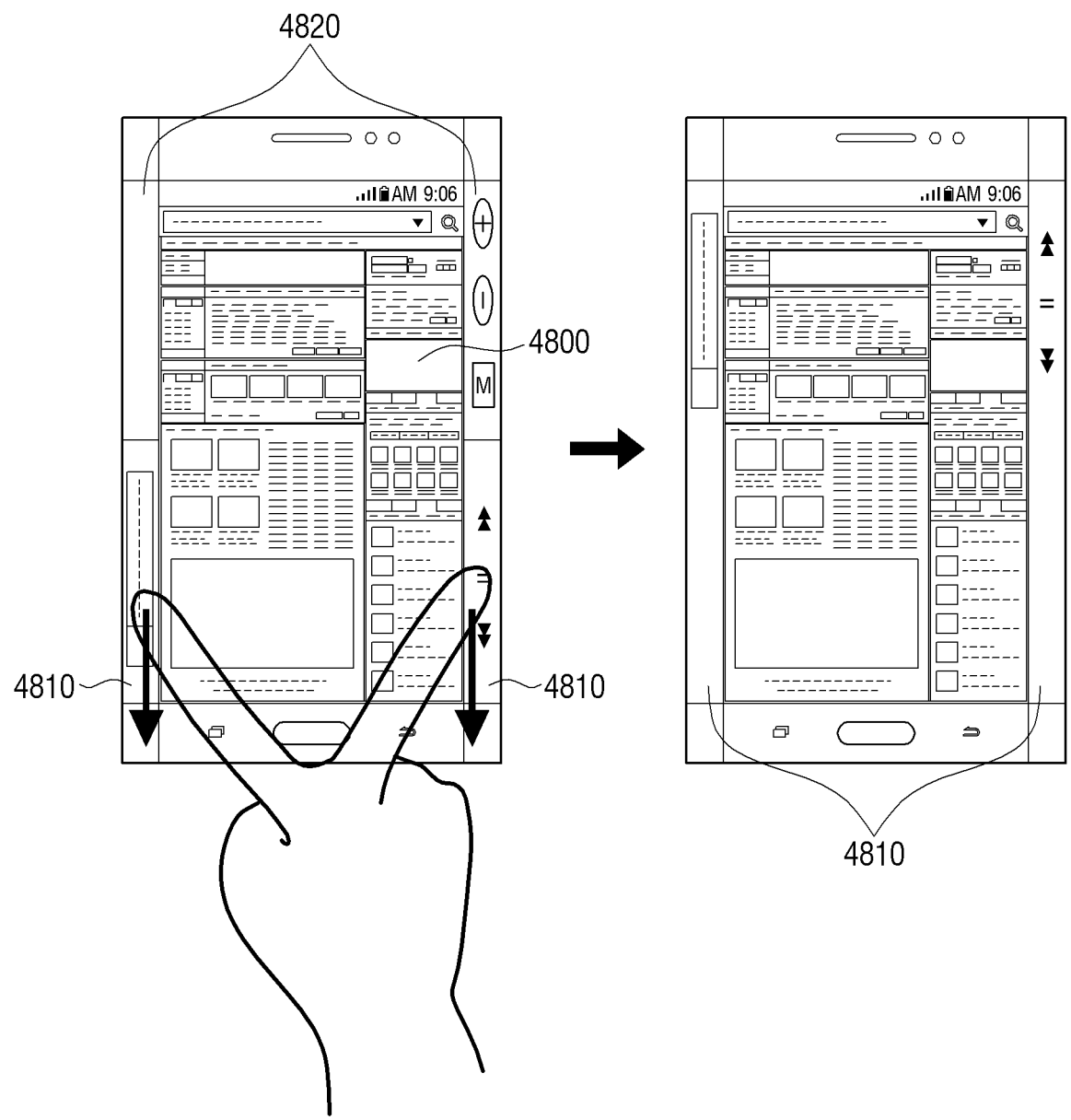

FIGS. 48 to 50 are views provided to explain an embodiment of modifying a UI displayed on a plurality of sub regions.

First, in response to sensing a preset user interaction to the main region, the controller 200 may control the curved display 100 to divide the plurality of sub regions and display UI.

That is, as illustrated in the left-hand side of FIG. 48, in response to sensing a drag interaction which touches on two points on the main region and drags to an upward direction, as illustrated in the right-hand side of FIG. 48, the controller 200 may control the curved display 100 to display a UI 4810 corresponding to the first application on a lower end of the sub region on the left side surface and on a lower end of the sub region on the right side surface, and display a UI 4820 corresponding to the second application on the upper end of the sub region on the left side surface and on the upper end of the sub region on the right side surface. The first application may be a music application that is currently executed by the user terminal device 1000, and the second application may be a web application that corresponds to the screen currently displayed on the main region.

Further, the controller 200 may move the divided UIs in response to user commands.

That is, as illustrated in the first drawing of FIG. 49, in response to sensing a drag interaction which touches on one point on the sub region on the right side surface and drags in an upward direction, as illustrated in the second drawing of FIG. 49, the controller 200 may control the curved display 100 to upwardly move the UI 4810 corresponding to the first application displayed on the lower end of the sub region on the right side surface, while downwardly moving the UI 4820 corresponding to the second application displayed on the upper end of the sub region on the left side surface.

Then when the drag interaction for the sub region on the right side surface continues to the upward direction, as illustrated in the third drawing of FIG. 49, the controller 200 may control the curved display 100 to display the UI 4810 corresponding to the first application on the sub region on the right side surface, and display the UI 4820 corresponding to the second application on the sub region on the left side surface.

Then when the drag interaction for the sub region on the right side surface is ceased, as illustrated in the fourth drawing of FIG. 49, the controller 200 may determine that a certain portion of the UI 4810 corresponding to the first application and a certain portion (i.e., shaded portion) of the UI 4820 are displayed upside down, and therefore, as illustrated in the fifth drawing of FIG. 49, may control the curved display 100 to change the orientation of the certain portion of the UI 4810 corresponding to the first application and certain portion of the UI 4820 corresponding to the second application and display the same.

Further, as illustrated in FIG. in FIG. 50, while the UI 4810 corresponding to the first application is displayed on the lower end of the sub region on the left side surface and on the lower end of the sub region on the right side surface, and the UI 4820 corresponding to the second application is displayed on the upper end of the sub region on the left side surface and on the upper end of the sub region on the right side surface, in response to sensing a drag interaction which touches on one point on the sub region on the left side surface and one point on the sub region on the right side surface and drags in an downward direction, as illustrated in the right-hand side of FIG. 50, the controller 200 may control the curved display 100 to display only the UI 4810 corresponding to the first application on the plurality of sub regions.

Figure 51:
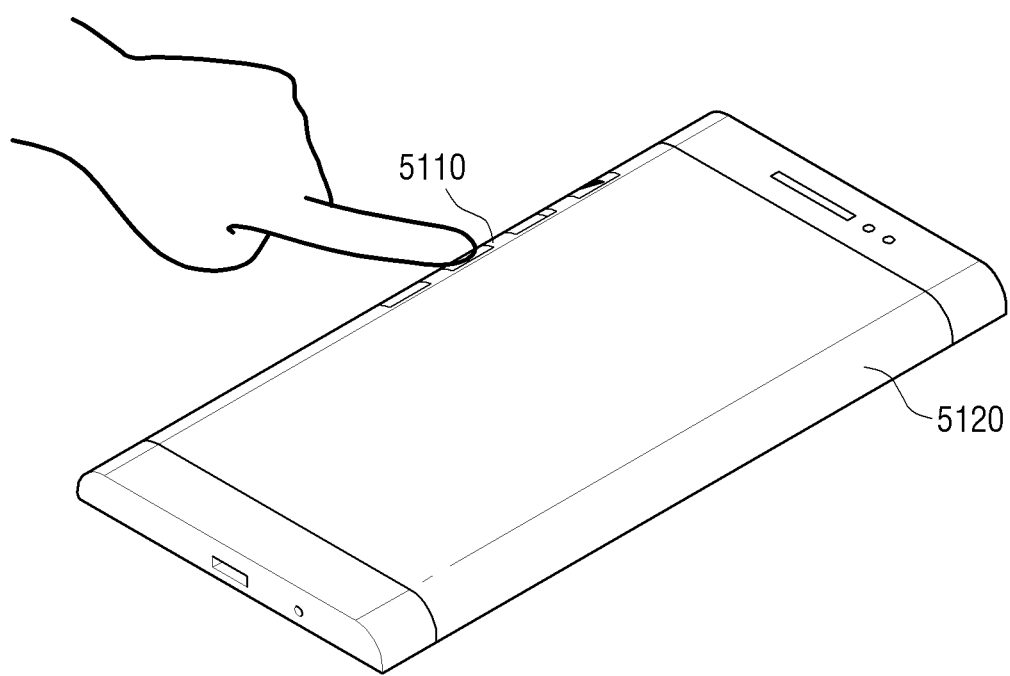
Figure 51:
Figure 51:
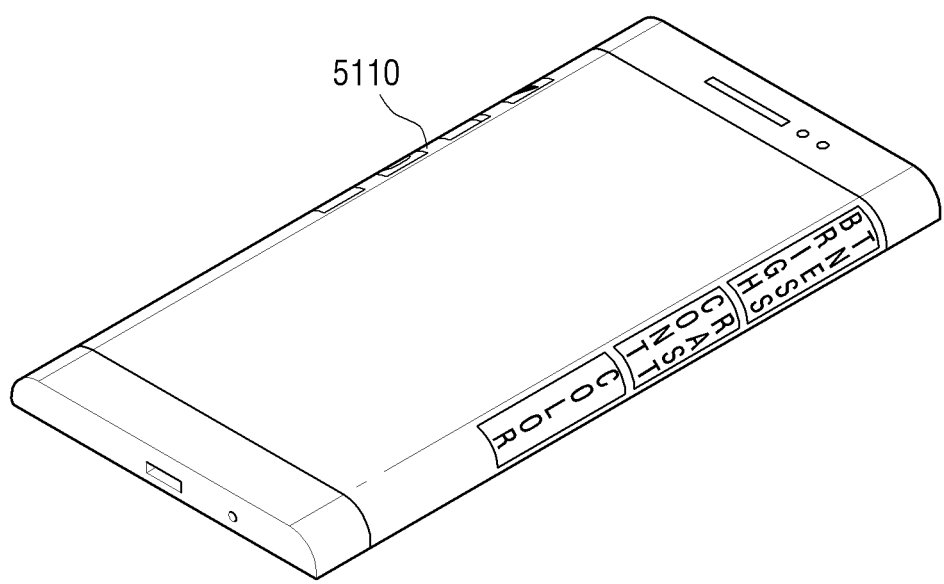

FIG. 51 is a view provided to explain an embodiment of displaying a UI element having a plurality of depths on a plurality of sub regions.

The controller 200 may control the curved display 100 to display a UI including a menu item with a first depth on a first sub region, and display a UI having a menu item with a second depth, which is subordinate depth to the first depth, on the second sub region.

That is, as illustrated in the upper half of FIG. 51, while the menu item with the first depth is displayed on the sub region 5110 on the left side surface, in response to sensing a touch interaction that touches on the first menu item, as illustrated in the lower half of FIG. 51, the controller 200 may control the curved display 100 to display the menu item of the first depth on the sub region 5110 on the left side surface and display the menu items included in the subordinate depth to the first menu item, on the sub region 5120 on the right side surface. The menu item with the first depth may include a menu item, such as video setup, audio setup, or network setup, and the menu item with the second depth may include menu items regarding subordinate depth such as, for example, brightness setup, contrast setup, or color setup.

Further, when one of the menu items with the second depth is selected, when the selected menu item does not have a menu item with subordinate depth, the controller 200 may display, on the main region, information about the selected menu item, or when the selected menu item has a menu item with subordinate depth, the controller 200 may control the curved display 100 to display, on the sub region on the left side surface, menu items included in the subordinate depth of the selected menu item.

Figure 52:
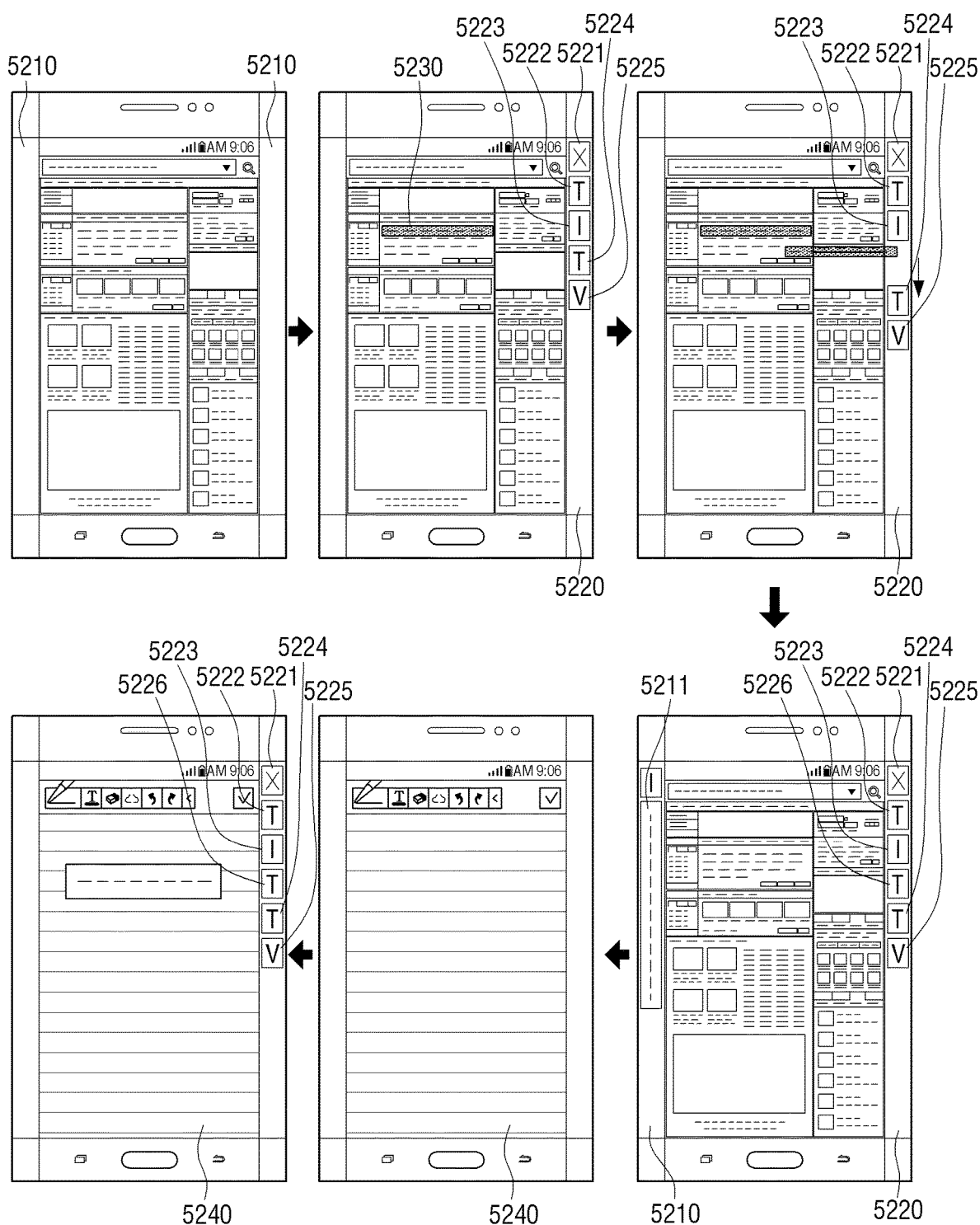
Figure 53:
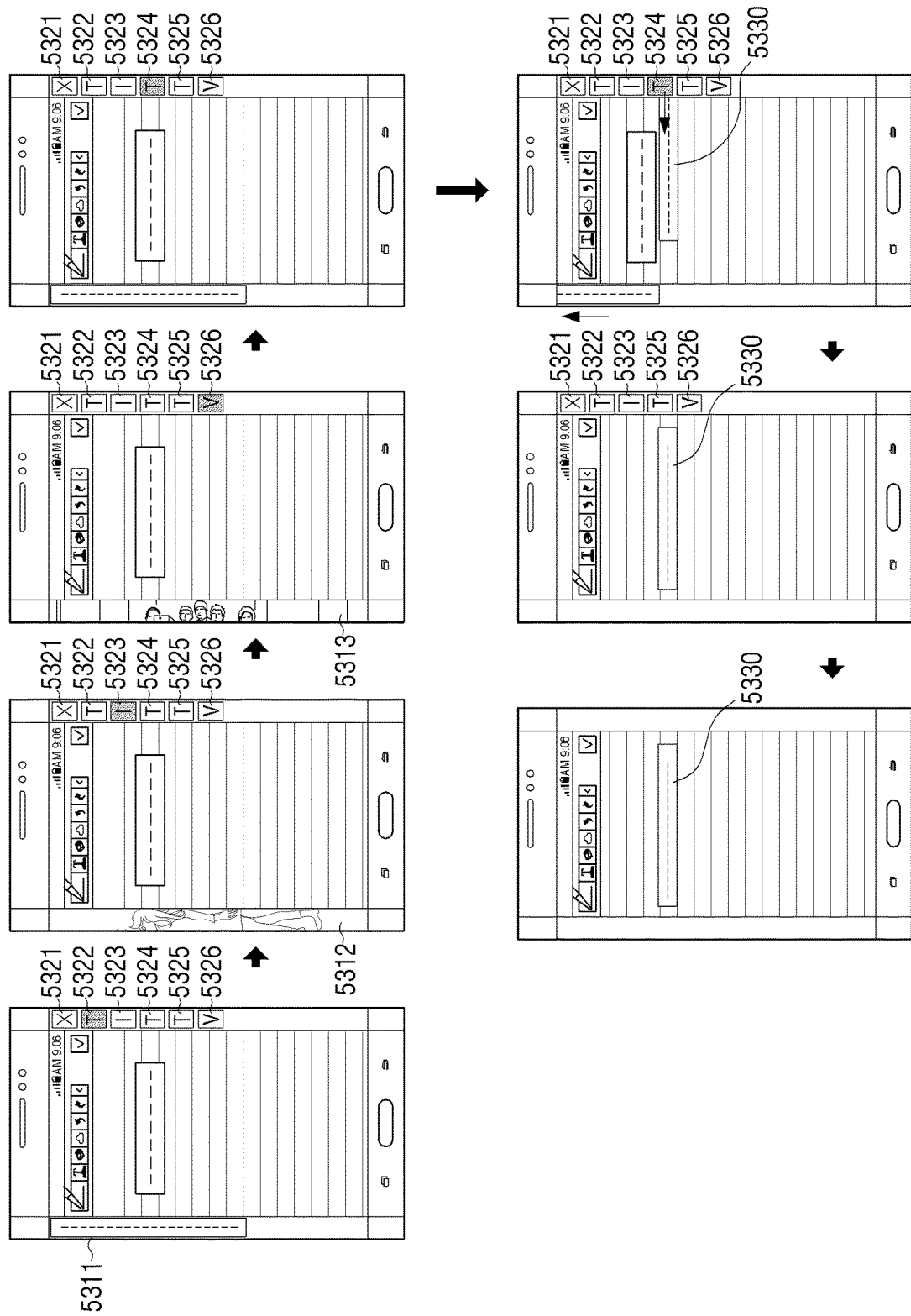

FIGS. 52 and 53 are views provided to explain an embodiment of executing a clipboard function using sub region.

First, while the web browsing screen is displayed as illustrated in the first drawing of FIG. 52, in response to sensing a user interaction to activate a clipboard function, the controller 200 may control the curved display 100 to display icons 5221 to 5225 corresponding to the content copied onto the sub region 5220 on the right side surface, as illustrated in the second drawing of FIG. 52. An item with box having 'X' therein corresponds to an icon for clipboard clearing function, an item with box having 'T' therein corresponds to an icon for text content, an item with box having 'I' therein corresponds to image content, and an item with box having 'V' therein corresponds to video content.

As illustrated in the second drawing of FIG. 52, after portion of the text content 5230 is selected from the web browsing screen, as illustrated in the third drawing of FIG. 52, in response to sensing a drag interaction which drags to the sub region 5220 on the right side surface, as illustrated in the fourth drawing of FIG. 52, the controller 200 may control the curved display 100 to add the icon 5226 corresponding to the text content which is the content that is added to the dragged region of the sub region 5220 on the right side surface. The added icon 5226 may be differently expressed with based on at least color, transparency and brightness. At this time, the controller 200 may control the curved display 100 to display preview content 5221 of the icon 5226 added to the sub region 5210 on the left side surface.

As illustrated in the fifth drawing of FIG. 52, in response to user command, the controller 200 may control the curved display 100 to display a memo application 5240, and in response to sensing a user interaction to activate the clipboard function, as illustrated in the sixth drawing of FIG. 52, the controller 200 may control the curved display 100 to display a plurality of icons 5221 to 5226 corresponding to the content that is copied onto the sub region 5220 on the right side surface.

As illustrated in the first drawing of FIG. 53, after a function of pasting to a certain region on the main region is activated, in response to sensing a user interaction to select a second icon 5322, the controller 200 may control the curved display 100 to distinctively display the selected second icon 5322, and to display the preview content 5311 of the second icon 5322 on the sub region 5210 on the right side surface. Further, as illustrated in the second drawing of FIG. 53, in response to sensing a user interaction to select a third icon 5323, the controller 200 may control the curved display 100 to distinctively display the selected third icon 5323, and to display the preview content 5312 of the third icon 5323 on the sub region 5210 on the right side surface. Further, as illustrated in the third drawing of FIG. 53, in response to sensing a user interaction to select a sixth icon 5326, the controller 200 may control the curved display 100 to distinctively display the selected sixth icon 5326, and to display the preview content 5313 of the sixth icon 5326 on the sub region 5210 on the right side surface. Further, as illustrated in the fourth drawing of FIG. 53, in response to sensing a user interaction to select a fourth icon 5324, the controller 200 may control the curved display 100 to distinctively display the selected fourth icon 5324, and to display the preview content 5314 of the fourth icon 5324 on the sub region 5210 on the right side surface.

Further, as illustrated in the fifth drawing of FIG. 53, in response to sensing a drag interaction which drags the fourth icon 5324 to the main region, as illustrated in the sixth drawing of FIG. 53, the controller 200 may paste the text 5330 corresponding to the sixth icon 5326 (fourth icon 5324) to the main region. Further, in response to sensing user interaction to select the first icon 5321, as illustrated in the seventh drawing of FIG. 53, the controller 200 may control the curved display 100 to display the icons 5321 to 5326 displayed on the sub region on the left side surface, from which some icons 5322 to 5326 are removed.

As explained above with reference to FIGS. 52 and 53, user is able to edit various contents with increased ease, using the clipboard function and a plurality of sub regions.

Figure 54:
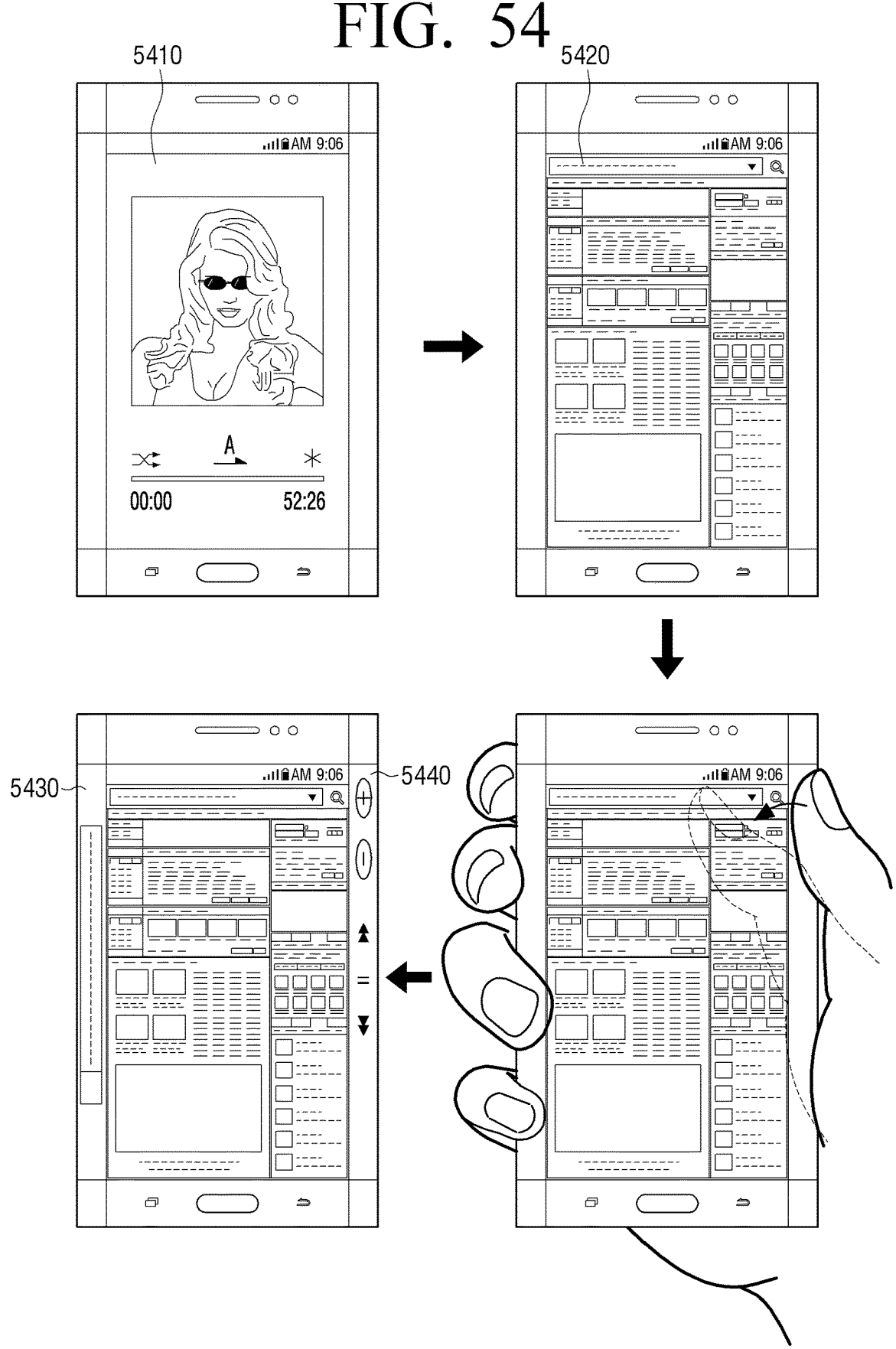
Figure 55:
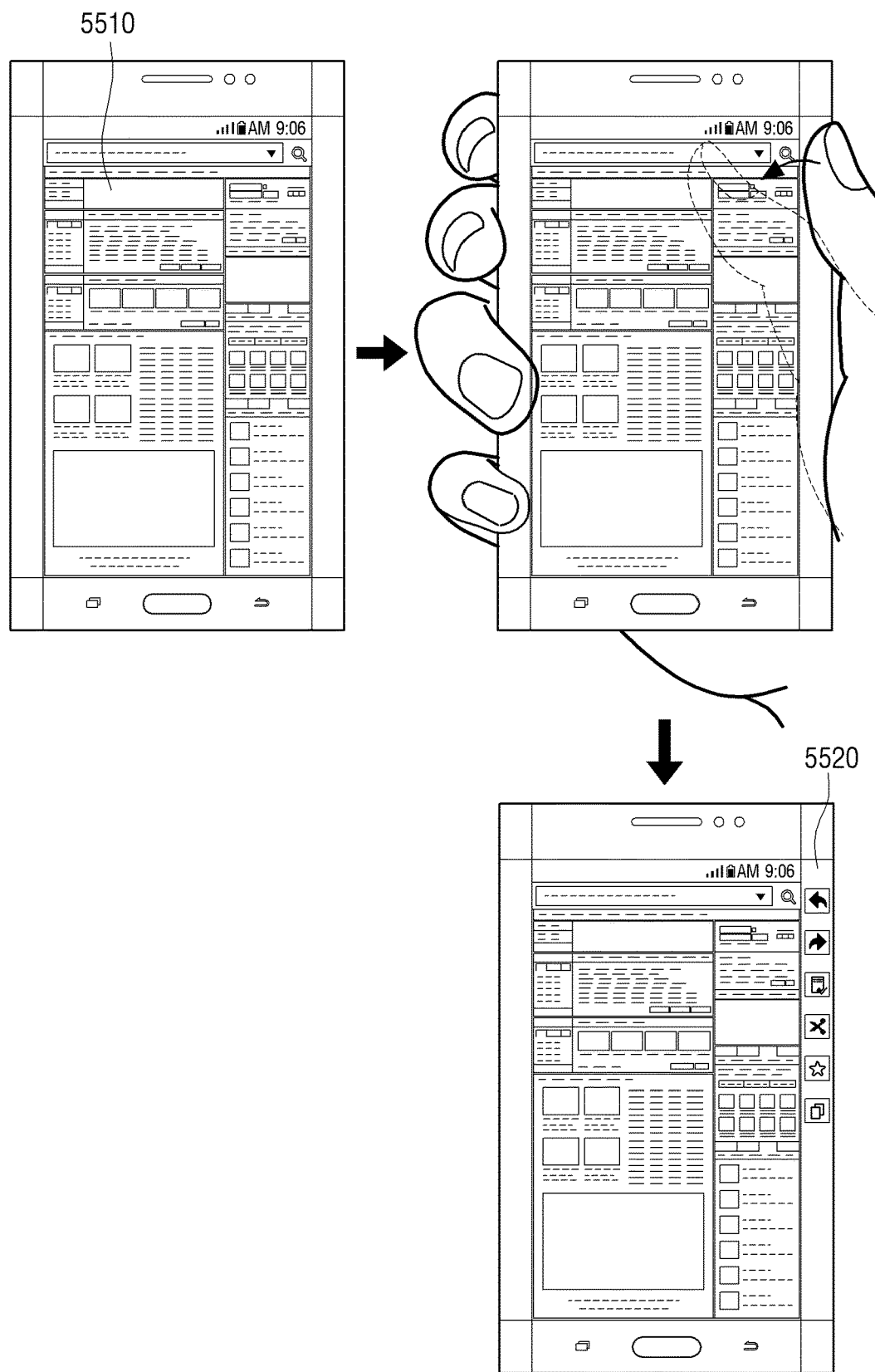

FIGS. 54 and 55 are views provided to explain an embodiment of calling for a specific function, using a plurality of sub regions.

First, as illustrated in the first drawing of FIG. 54, according to a user command, the controller 200 may execute the music application and control the curved display 100 to display the music application execution screen 5410 to play the music. Then, as illustrated in the second drawing of FIG. 54, according to a user command, the controller 200 may execute the web browsing application and control the curved display 100 to display the web browsing application execution screen 5420 on the main region. At this time, the controller 200 may execute both the web browsing application and the music application at the same time.

Then, as illustrated in the third drawing of FIG. 54, in response to sensing a swipe interaction by a user who grabs the user terminal device 1000 with his right hand, touches on one point on the sub region on the left side surface with a thumb and swipes to the direction of the main region, as illustrated in the fourth drawing of FIG. 54, the controller 200 may control the curved display 100 to display the UI corresponding to the music application, which is currently executed on the background, on the sub region 5430 on the left side surface and on the sub region 5440 on the right side surface. At this time, the UI indicating information about the currently playing music may be displayed on the sub region 5430 on the left side surface, and the controller 200 may control the curved display 100 to display the UI, including a plurality of UI elements to control the music application, on the sub region 5420 on the right side surface.

For another example, as illustrated in the first drawing of FIG. 55, while the web browsing screen 5510 is displayed, as illustrated in the second drawing of FIG. 55, in response to sensing a swipe interaction by a user who grabs the user terminal device 1000 with his right hand, touches on one point on the sub region on the left side surface with his thumb and swipes to the direction of the main region, as illustrated in the third drawing of FIG. 55, the controller 200 may control the curved display 100 to display the UI, including icons to control the web application of the user terminal device 1000, on the sub region 5520 on the left side surface.

Accordingly, a user is able to control applications executed on the background or basic functions with increased convenience, using the swipe interaction as described with reference to FIGS. 54 and 55.

Figure 56:
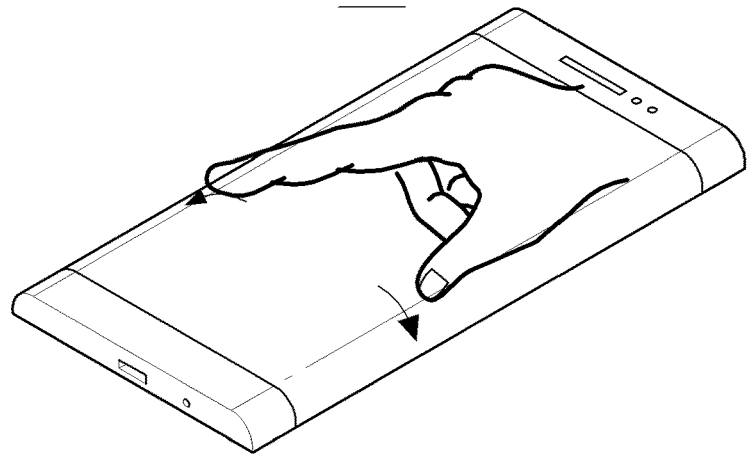
Figure 56:
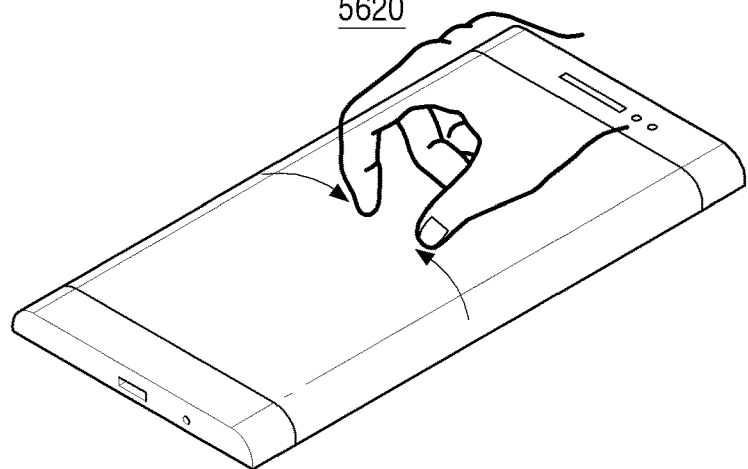
Figure 56:
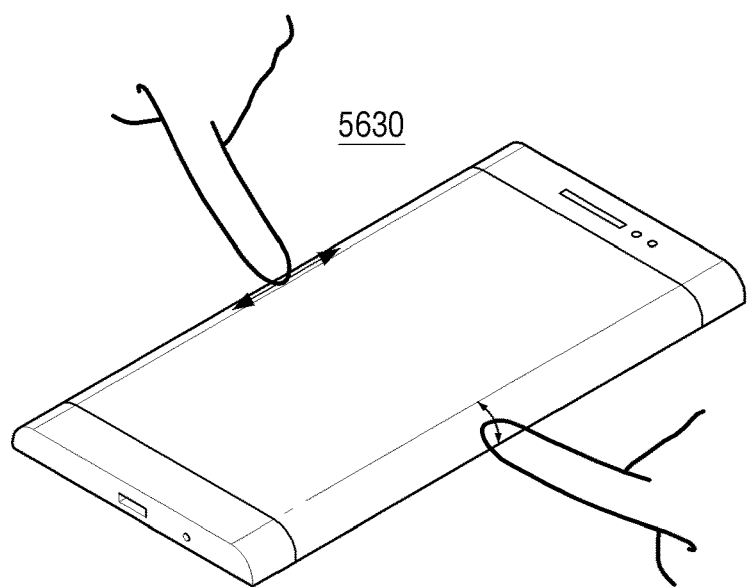

FIG. 56 is a view provided to explain an embodiment of controlling a main region, using a plurality of sub regions.

First, as illustrated in the first drawing 5610 of FIG. 56, in response to sensing a pinch-out interaction which touches on one point on the sub region on the left side surface and on one point on the sub region on the right side surface, and moves the two touched points farther away from each other, the controller 200 may control the curved display 100 to zoom-in the screen on the main region. Further, as illustrated in the second drawing 5620 of FIG. 56, in response to sensing a pinch-in interaction which touches on one point on the sub region on the left side surface and on one point on the sub region on the right side surface, and moves the two touched points closer toward each other, the controller 200 may control the curved display 100 to zoom-out the screen on the main region. Further, as illustrated in the third drawing 5630 of FIG. 56, in response to sensing a drag interaction which touches on one point on the sub region on the left side surface or on one point on the sub region on the right side surface, and drags, the controller 200 may control the curved display 100 to pan the screen on the main region.

The control method of the user terminal device 1000 according to embodiments will be explained below with reference to FIGS. 57 and 58.

Figure 57:
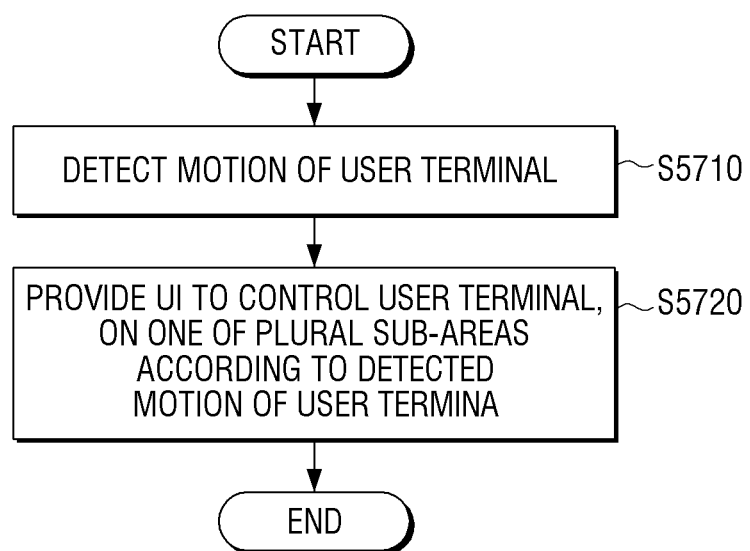

FIG. 57 is a flowchart provided to explain an embodiment of displaying a UI on one of a plurality of sub regions according to motion of the user terminal device 1000.

First, at step 5710, the user terminal device 1000 detects motion of the user terminal device 1000. That is, the user terminal device 1000 may detect rotational motion of the user terminal device 1000, using various sensors including acceleration sensor or gyro sensor.

At step 5720, on one of the plurality of sub regions, the user terminal device 1000 displays a UI to control the user terminal device 1000 according to the detected motion of the user terminal device 1000. To be specific, in response to sensing that the user terminal device 1000 is rotated in a first direction, the user terminal device 1000 may display the UI on the first sub region, and in response to sensing that the user terminal device 1000 is rotated in a second direction, the user terminal device 1000 may display the UI on the second sub region.

Figure 58:
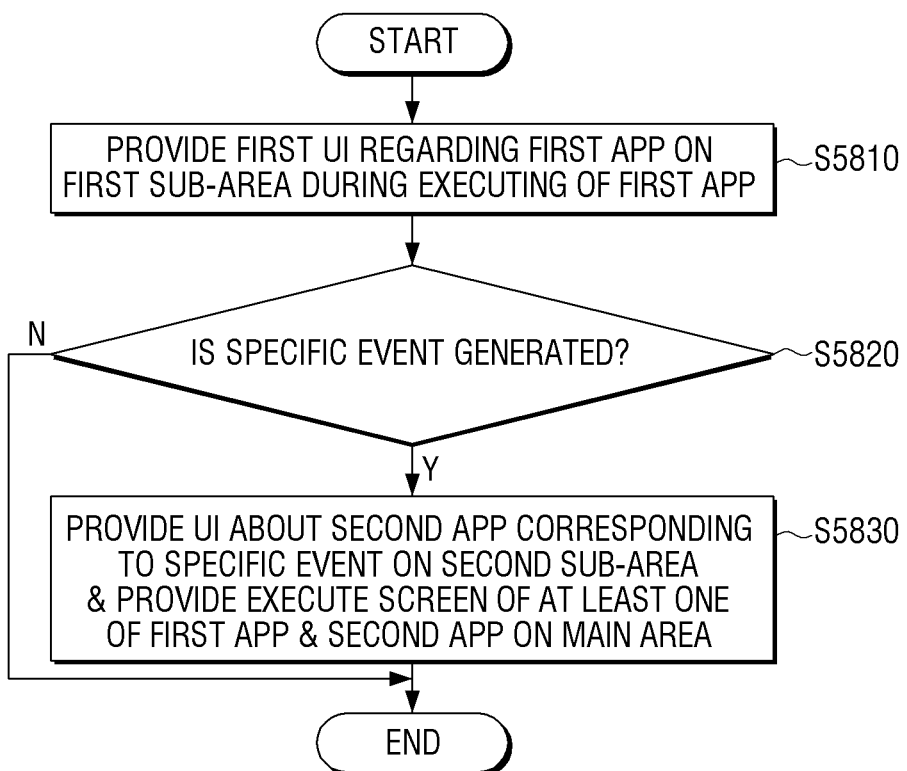

FIG. 58 is a flowchart provided to explain an embodiment of displaying different types of UIs on a plurality of sub regions of the user terminal device 1000.

First, at step 5810, while the first application is executed, the user terminal device 1000 provides the first sub region with the first UI corresponding to the first application.

Then at step 5820, the user terminal device 1000 detects for a specific event. The specific event may include an event to execute application by user input, text message reception event, SNS reception event, request to call event, or battery amount display event.

At step 5820-Y, when sensing a specific event, at step 5830, the user terminal device 1000 may provide the UI corresponding to the second application corresponding to the specific event to the second sub region, and provide an execution screen of at least one of the first and second applications to the main region.

According to various embodiments, user is provided with various user experiences using a plurality of sub regions.

Referring now to FIGS. 59 to 81D, a variety of functions of a user terminal device including a curved display with a plurality of sub regions will be explained below.

Figure 59:
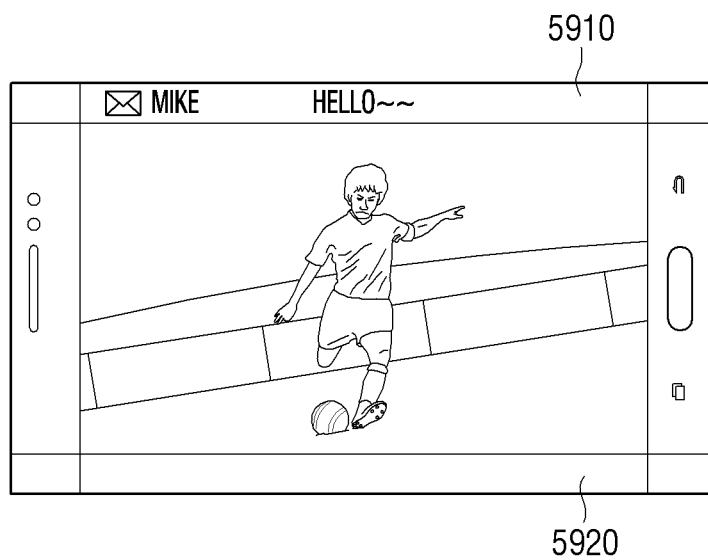
FIGS. 59 to 84B are views provided to explain various functions of a user terminal device including a curved display having a plurality of sub regions, according to various exemplary embodiments.

When the user is not grasping the user terminal device 1000, that is, when the user terminal device 1000 is lying on a floor or in default state, the controller 200 may control the curved display 100 to activate only one of a plurality of sub regions to display information. When displaying information on one sub region, the controller 200 may output the information in a horizontal arrangement. To be specific, when message is received from another device, as illustrated in FIG. 59, the curved display 100 may be controlled to display the information corresponding to the received message in horizontal arrangement. Further, the controller 200 may control the curved display 100 to display at least one of text, icon and image in a horizontal direction, depending on a type of implemented application.

Further, while the user is not grasping the user terminal device 1000, the controller 200 may control the curved display 100 to activate all of a plurality of sub regions to display information on the respective sub regions. The first sub region among a plurality of sub regions herein may correspond to a concept of a main region among a plurality of sub regions, and the second sub region may correspond to a concept of sub region among a plurality of sub regions.

Figure 60A:
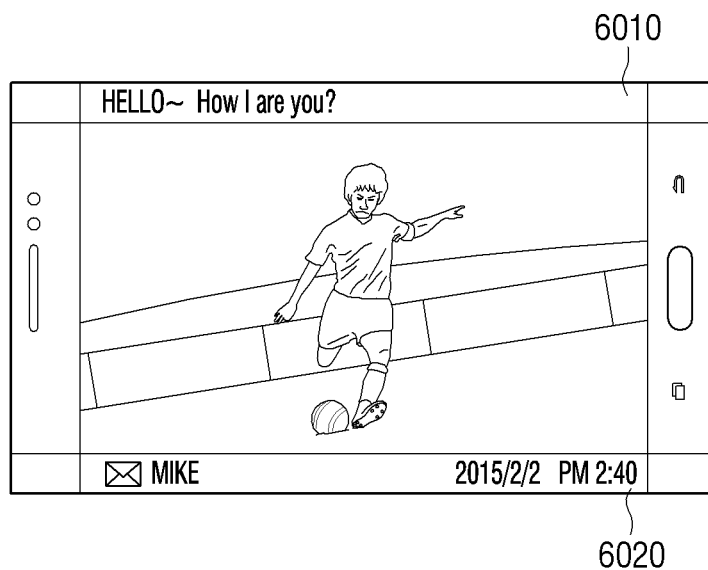

In one embodiment, while the user is not grasping the user terminal device 1000, in response to executing a message application, the controller 200 may control the curved display 100 to display the content of the message on the first sub region 6010 and display additional information such as sender information and sending time on the second sub region 6020, as illustrated in FIG. 60A. In another example, in response to executing a plurality of message applications, the controller 200 may control the curved display 100 to display the content of the message of the first message application on the first sub region, and display the content of the message of the second message application on the second sub region. In yet another example, in response to executing one message application, while there exist a plurality of message windows, the controller 200 may control the curved display 100 to display the content of the message regarding a first message window on the first sub region and display the content of the message regarding a second message window on the second sub region. In yet another example, the controller 200 may control the curved display 100 to display the sender information, sending time and content of message (the content of the message is toggled) on the first sub region and display other UI elements (e.g., icons corresponding to frequently-used applications) on the second sub region.

Figure 60B:
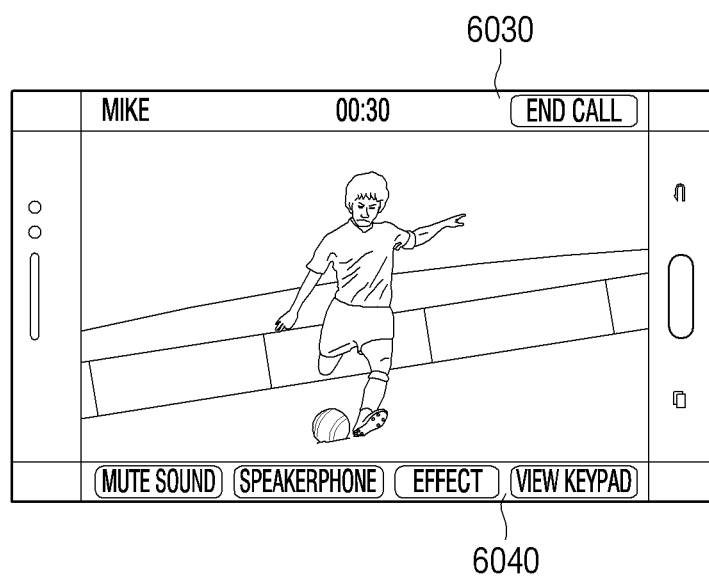

In another embodiment, while the user is not grasping the user terminal device 1000, in response to executing a phone application, the controller 200 may control the curved display 100 to display sender information, call duration and button to end call on the first sub region 6030 and display audio telephony menus (mute, speakerphone, effect, view keypad, etc.) on the second sub region 6040, as illustrated in FIG. 60B. In another example, the controller 200 may control the curved display 100 to display caller information, call duration and button to end call on the first sub region and display information about waiting call request on the second sub region. In yet another example, the controller 200 may control the curved display 100 to display caller information, call duration and button to end call on the first sub region and display other UI elements (e.g., icons corresponding to frequently-used applications) on the second sub region.

Figure 60C:
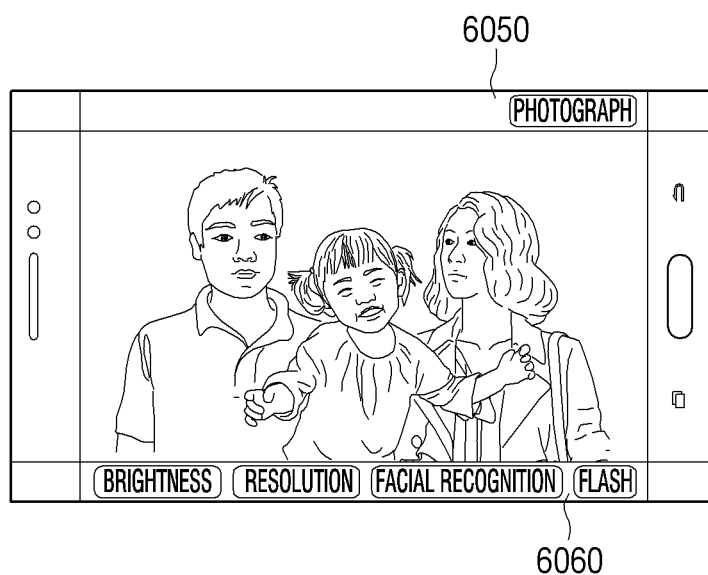

In another embodiment, while the user is not grasping the user terminal device 1000, in response to executing a camera application, the controller 200 may control the curved display 100 to display photographing button (or video shooting button) on the first sub region 6050 and display camera menus (brightness adjustment, resolution, facial recognition, flash, etc.) on the second sub region 6060, as illustrated in FIG. 60C. In another example, the controller 200 may control the curved display 100 to display the photographing button (or video shooting button) and the camera menus on the first sub region and display, on the second sub region, UI elements (progress bar, menus to adjust set values, etc.) to adjust selected menu values. In yet another example, the controller 200 may control the curved display 100 to display the photographing button (or video shooting button) and the camera menus on the first sub region and display other UI elements (e.g., icons corresponding to frequently-used applications) on the second sub region.

Figure 60D:
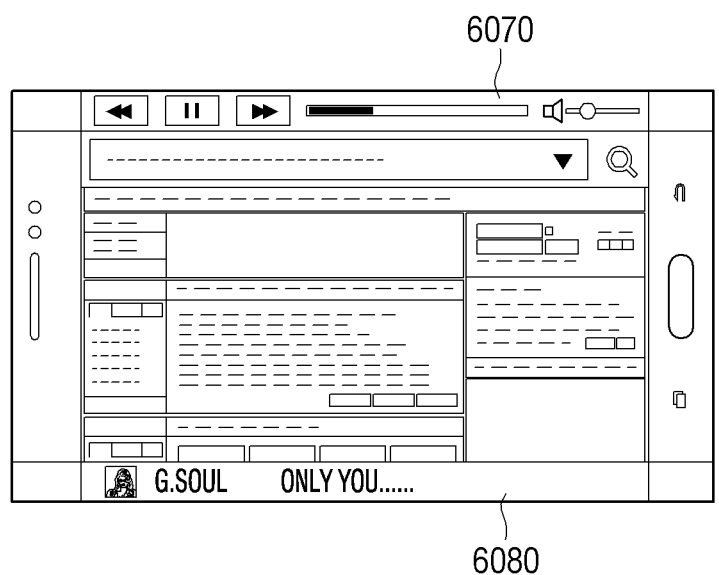

In another embodiment, while the user is not grasping the user terminal device 1000, in response to executing a music application, the controller 200 may control the curved display 100 to display music control menus (e.g., stop/play, rewind, fast forward, volume adjustment, progress bar, etc.) on the first sub region 6070 and display album jacket image, title, lyrics, etc. on the second sub region 6080, as illustrated in FIG. 60D. In another example, the controller 200 may control the curved display 100 to display music control menus (e.g., stop/play, rewind, fast forward, volume adjustment, progress bar, etc.) on the first sub region 6070 and display other UI elements (e.g., icons corresponding to frequently-used applications) on the second sub region 2080.

Figure 60E:
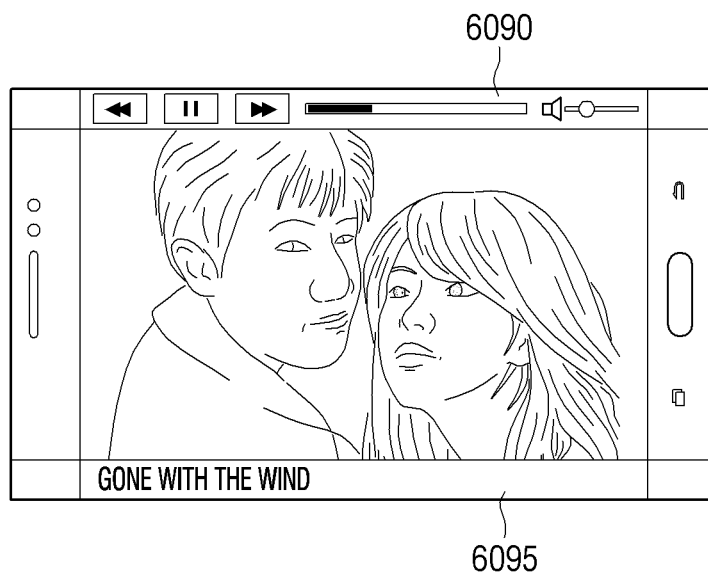

In another embodiment, while the user is not grasping the user terminal device 1000, in response to executing a video application, the controller 200 may control the curved display 100 to display video control menus (e.g., stop/play, rewind, fast forward, volume adjustment, progress bar, etc.) on the first sub region 6090 and display video images, subtitles, etc. on the second sub region 6095, as illustrated in FIG. 60E. In another example, the controller 200 may control the curved display 100 to display video control menus (e.g., stop/play, rewind, fast forward, volume adjustment, progress bar, etc.) on the first sub region 6090 and display other UI elements (e.g., icons corresponding to frequently-used applications) on the second sub region 6095.

Further, the controller 200 may control the curved display 100 to display different information on the sub regions, depending on whether the user is grasping the user terminal device 1000.

Figure 61A:
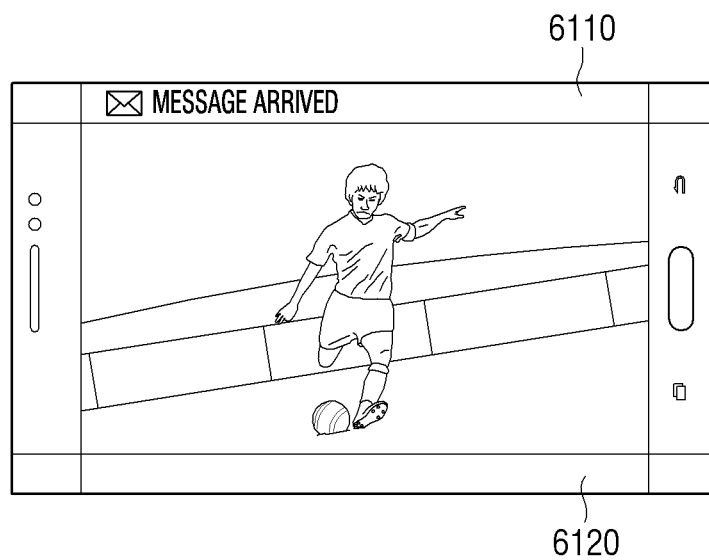
Figure 61B:
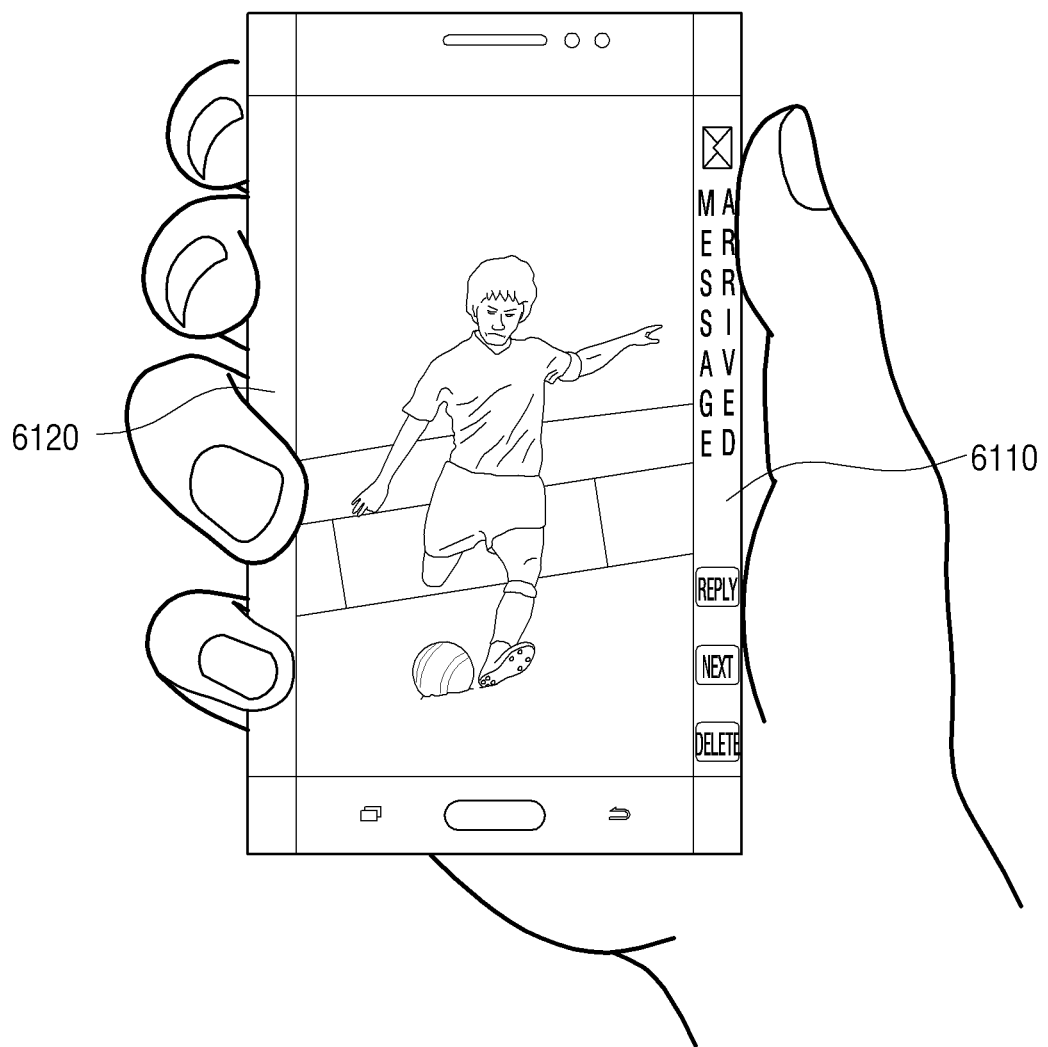

That is, while the user is not grasping the user terminal device 1000, for example, while the user terminal device 1000 is lying on a floor, in response to receiving a message from another device, the controller 200 may control the curved display 100 to display guidance message informing one or more of a plurality of sub regions 6110, 6120 of reception of a message from outside, as illustrated in FIG. 61A. Further, while the user is grasping the user terminal device 1000, in response to receiving a message from outside, the controller 200 may control the curved display 100 to display guidance message informing one or more of a plurality of sub regions 6110, 6120 of reception of a message from outside and icons to control the received message (e.g., reply icon, next icon, delete icon, etc.), as illustrated in FIG. 61B. Meanwhile, while the user is not grasping the user terminal device 1000, in response to receiving a message from another device, the controller 200 may control the curved display 100 to display the UI of FIG. 61A, and, while the UI of FIG. 61A is being displayed, in response to grasping the user terminal device 1000 by the user, the controller 200 may control the curved display 100 to change the UI illustrated in FIG. 61A into UI as illustrated in FIG. 61B and display the same.

Figure 62A:
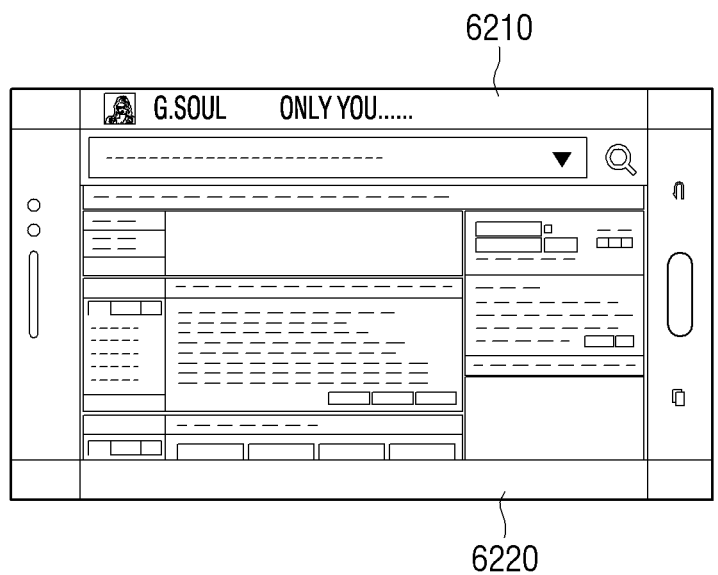
Figure 62B:
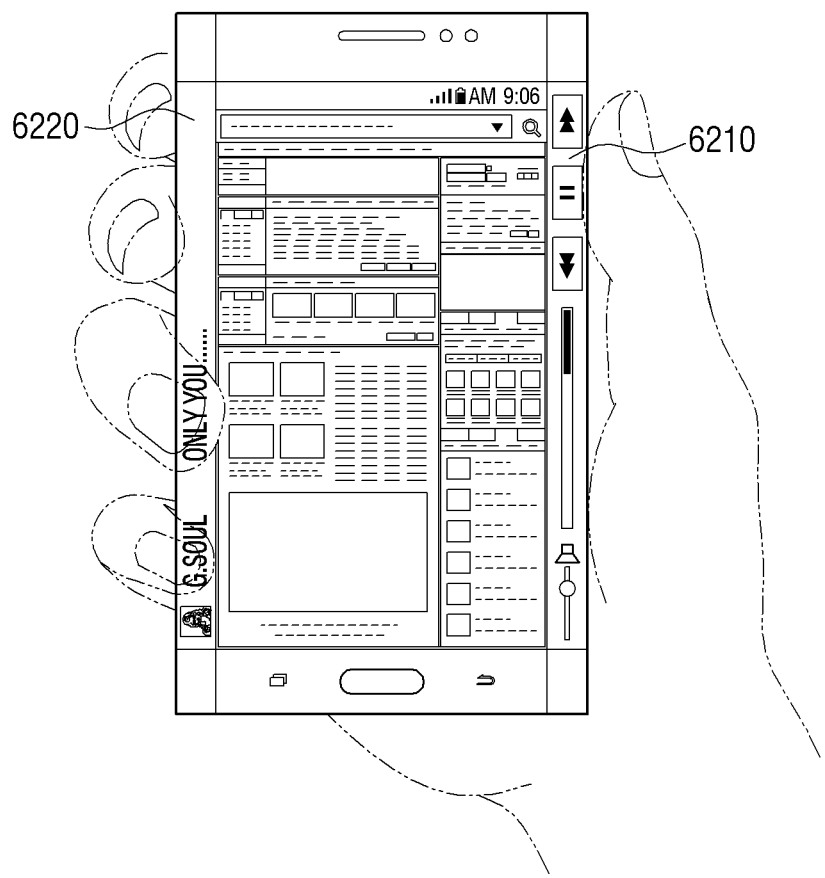

Further, while the user is not grasping the user terminal device 1000, for example, while the user terminal device 1000 is lying on a floor, in response to executing a music application, the controller 200 may control the curved display 100 to display music information, lyrics, etc. on one or more of a plurality of sub regions 6210, 6220, as illustrated in FIG. 62A. While the user is grasping the user terminal device 1000, in response to executing the music application, the controller 200 may control the curved display 100 to also display icons to control music (e.g., play/stop, rewind, fast forward, etc.) on one or more of a plurality of sub regions 6210, 6220, as illustrated in FIG. 62B. Meanwhile, while the user is not grasping the user terminal device 1000, in response to executing the music application, the controller 200 may control the curved display 100 to display the UI as illustrated in FIG. 62A, and, while the UI of FIG. 62A is being displayed, in response to grasping the user terminal device 1000 by the user, the controller 200 may control the curved display 100 to change the UI illustrated in FIG. 62A into UI as illustrated in FIG. 62B and display the same.

Further, while the user is not grasping the user terminal device 1000, e.g., while the user terminal device 1000 is laying on a floor, in response to executing a video application, the controller 200 may control the curved display 100 to display subtitles, video image title, etc. on one or more of a plurality of sub regions 6210, 6220. Further, while the user is grasping the user terminal device 1000, in response to executing the video application, the controller 200 may control the curved display 100 to also display icons (e.g., play/stop, rewind, fast forward, etc.) to control the video on one or more of a plurality of sub regions 6210, 6220.

Further, the controller 200 may control the curved display 100 to display text displayed on the sub region in a horizontal direction, regardless of whether the user terminal device 1000 is in horizontal mode or vertical mode. However, the controller 200 may change a direction of displaying images and icons, depending on whether the user terminal device 1000 is in horizontal mode or vertical mode. That is, when the user terminal device 1000 is in horizontal mode, the controller 200 may control the curved display 100 to display images and icons in horizontal direction, while, when the user terminal device 1000 is in vertical mode, the controller 200 may control the curved display 100 to display images and icons in vertical direction.

Figure 63A:
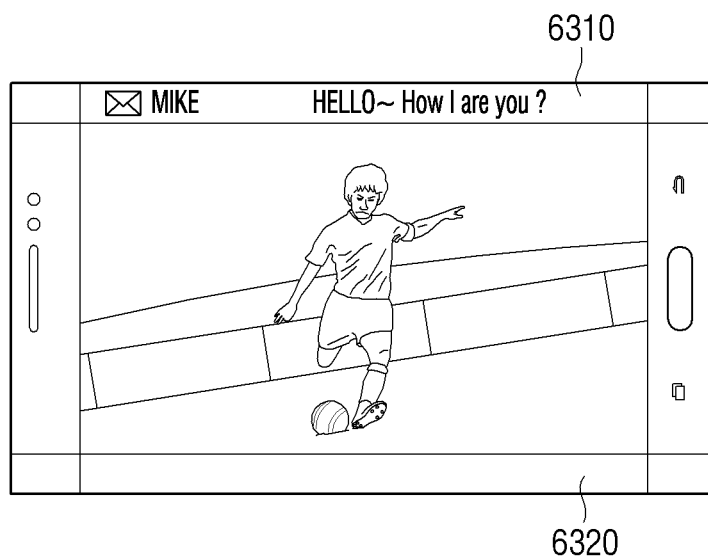
Figure 63B:
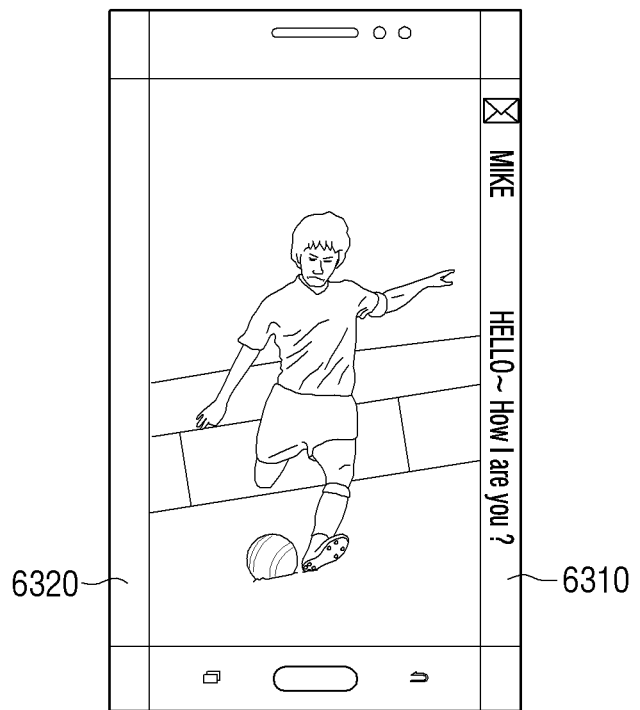

To be more specific, as illustrated in FIG. 63A, when the user terminal device 1000 is in horizontal mode, the controller 200 may control the curved display 100 to display texts and icons all in horizontal direction, but when the user terminal device 1000 is in vertical mode, the controller 200 may control the curved display 100 to display texts in horizontal direction and display icons in vertical direction.

Further, the controller 200 may determine left-hand mode or right-hand mode according to a direction of rotation, and control the curved display 100 to activate only one of a plurality of sub regions to display information on the activated sub region.

Figure 64:
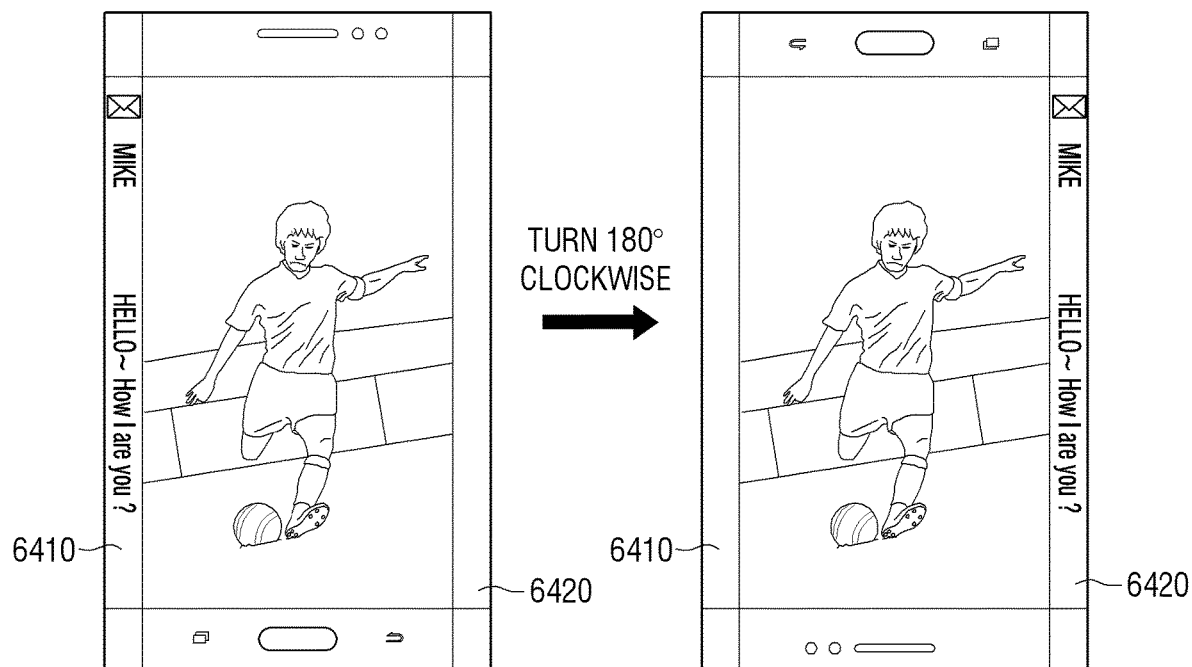

To be specific, as illustrated in the left-hand side of FIG. 64, while the information is being displayed on a left-side sub region 6410 among a plurality of sub regions 6410, 6420, in response to detecting rotation in clockwise direction (or equivalent counter-clockwise direction), the controller 200 may change into right-hand mode to thus activate right-side sub region 6410 among the plurality of sub regions 6410, 6420 to display the information, as illustrated in right-hand side of FIG. 64.

Figure 65:
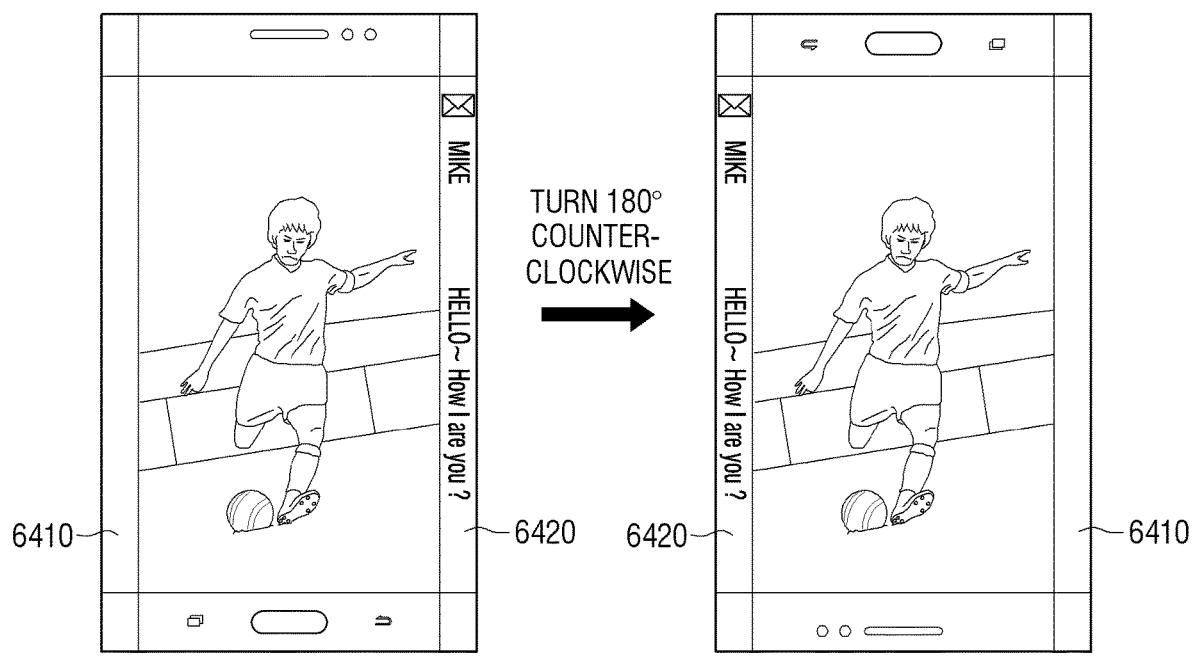

Further, as illustrated in the left-hand side of FIG. 65, while the information is being displayed on a right-side sub region 6420 among a plurality of sub regions 6410, 6420, in response to detecting rotation in counter-clockwise direction (or equivalent clockwise direction), the controller 200 may change into left-hand mode to thus activate left-side sub region 6420 among the plurality of sub regions 6410, 6420 to display the information, as illustrated in right-hand side of FIG. 65.

Further, the controller 200 may determine left-hand mode or right-hand mode based on determination on a hand with which the user is grasping the user terminal device 1000. The controller 200 may determine whether the user is grasping the user terminal device 1000 with his left hand or right hand, using touch region and touch distribution, etc.

Figure 66A:
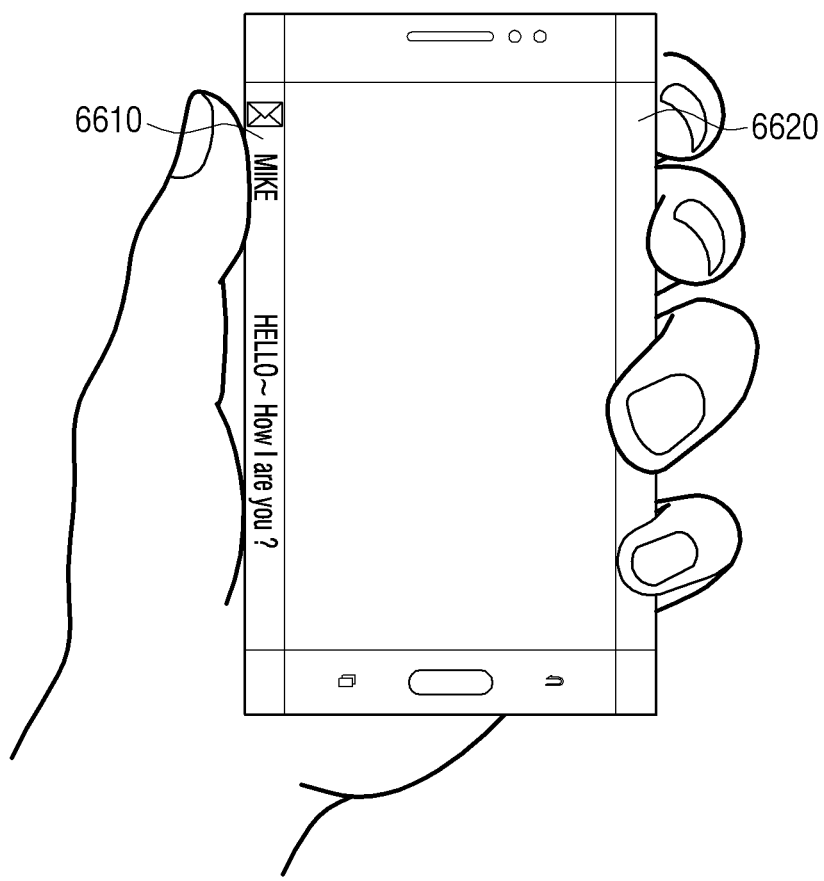
Figure 66B:
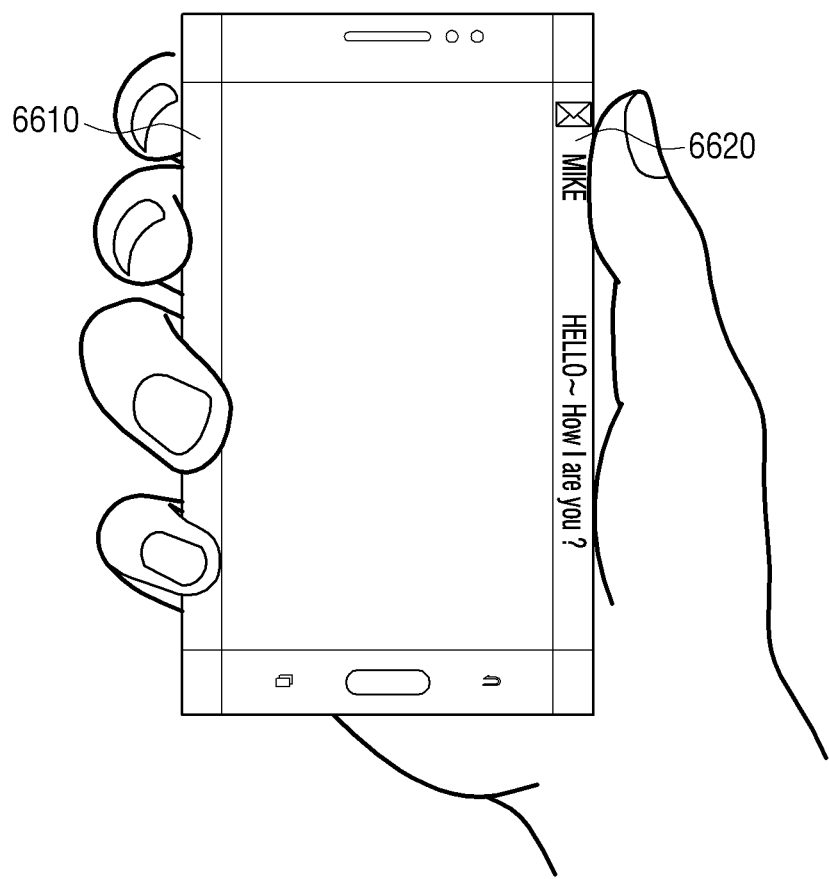

In response to determining that the user is grasping the user terminal device 1000 with his left hand, as illustrated in FIG. 66A, the controller 200 may control the curved display 100 to display UI element on the left-side sub region 6610 that is not hidden (i.e., unobscured) by the user's hand. In response to determining that the user is grasping the user terminal device 1000 with his right hand, as illustrated in FIG. 66B, the controller 200 may control the curved display 100 to display UI element on the right-side sub region 6620 that is not hidden by the user's hand.

If the application being executed is the message application, the UI element may be the content of the message, or if it is the telephone application that is being executed, the UI element may be a voice notification of telephone reception. If the application being executed is the camera application, the UI element may be camera control menus, or if it is the music application that is being executed, the UI element may be music control menus. If the video application is being executed, the UI element may be video control menus.

While the user terminal device 1000 maintains the vertical mode, in response to detecting rotational movement about Z axis of the user terminal device 1000, the controller 200 may determine a sub region to display UI element according to the rotational movement.

Figure 67A:
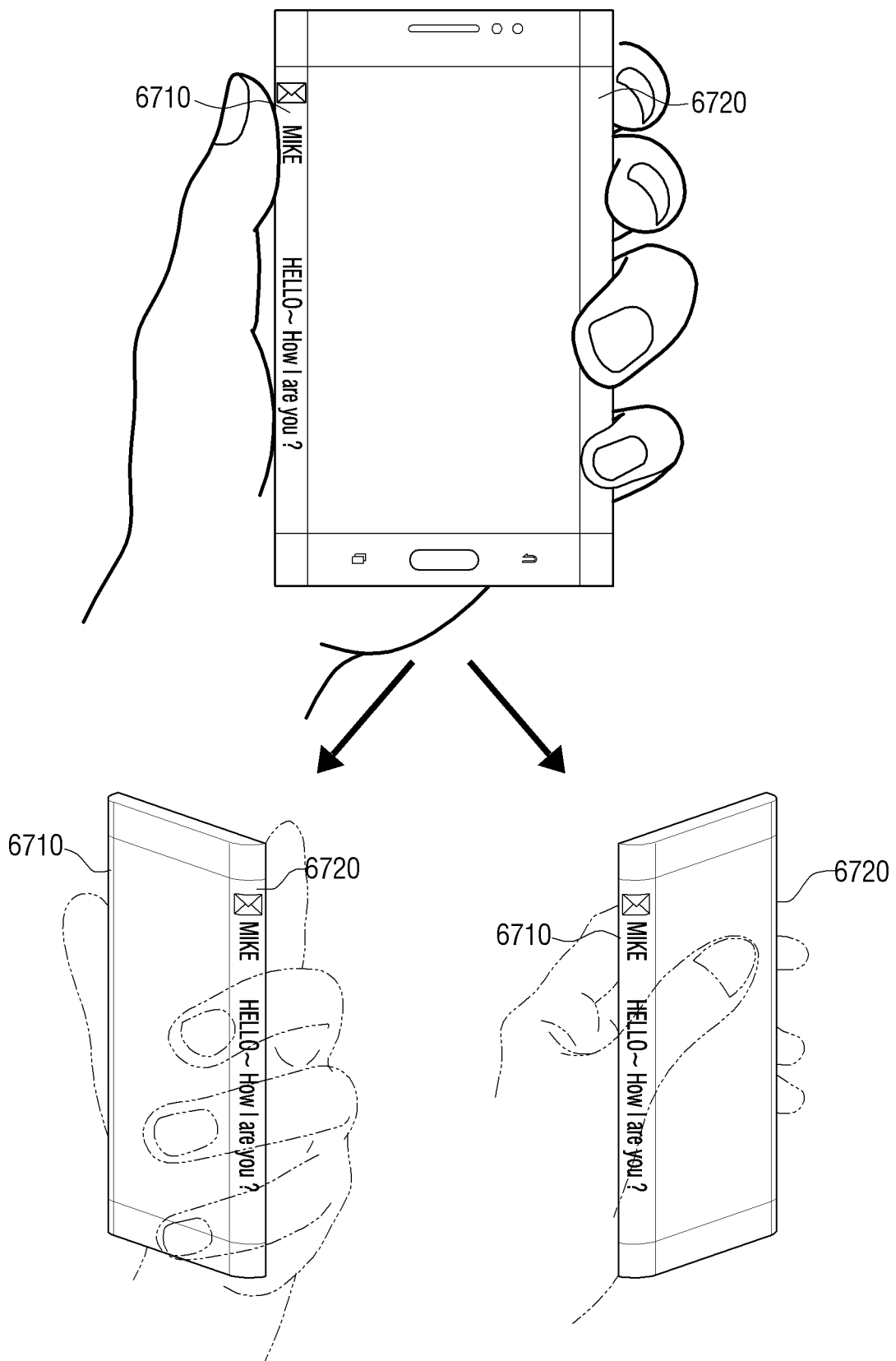

That is, while the user terminal device 1000 maintains the vertical mode, in response to grasping the user terminal device 1000 with user's left hand, the controller 200 may control the curved display 100 to display the UI element on the left-side sub region 6710, as illustrated in the upper half of FIG. 67A. And in response to detecting rotational movement about the Z axis in clockwise direction, the controller 200 may control the curved display 100 to display the UI element on the right-side sub region 6720, as illustrated in the lower half (left) of FIG. 67A. And in response to detecting rotational movement about the Z axis in counter-clockwise direction, the controller 200 may control the curved display 100 to display the UI element on the left-side sub region 6710, as illustrated in the lower half (right) of FIG. 67A.

Figure 67B:
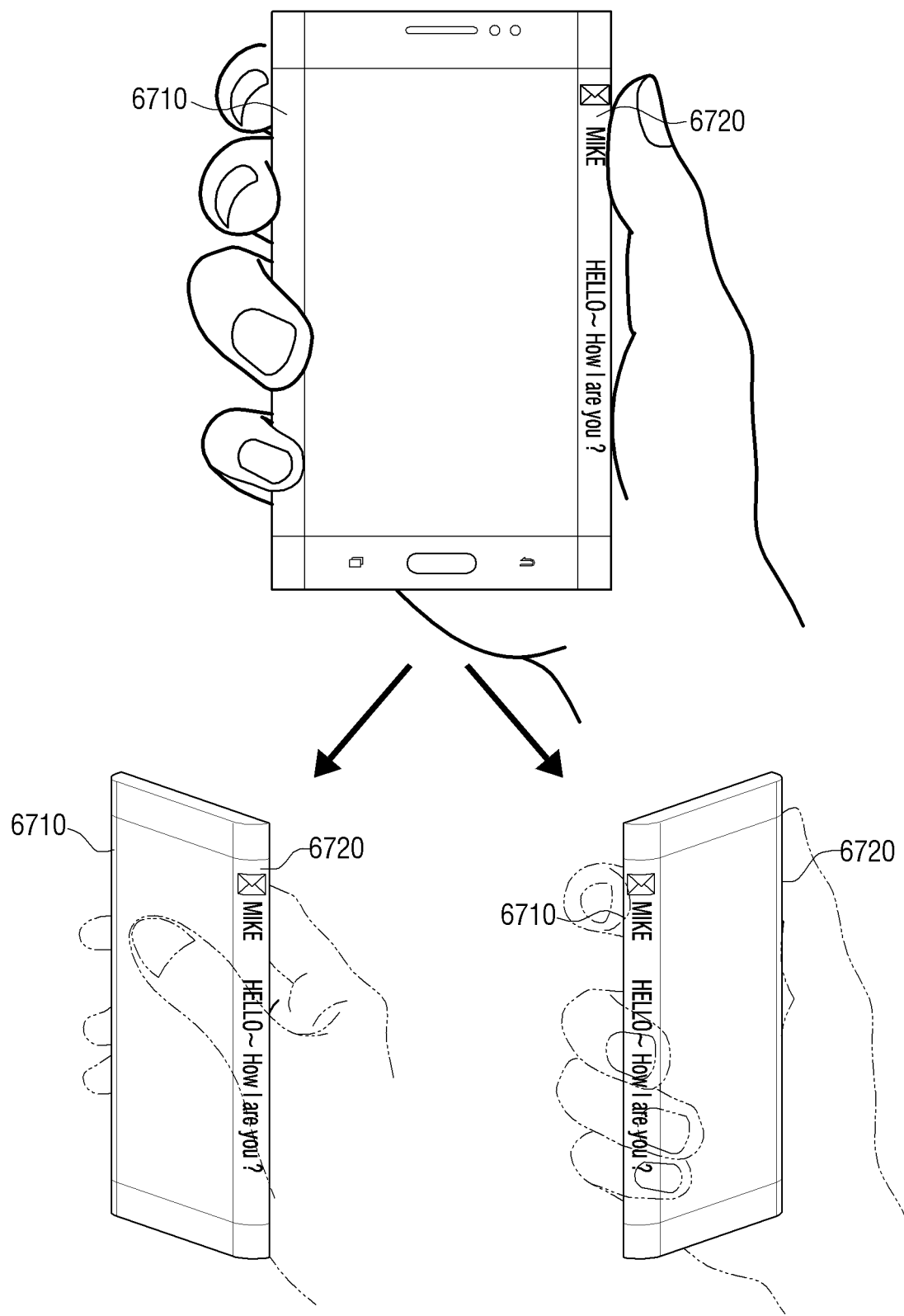

Further, while the user terminal device 1000 maintains the vertical mode, in response to grasping the user terminal device 1000 with user's right hand, the controller 200 may control the curved display 100 to display the UI element on the right-side sub region 6720, as illustrated in the upper half of FIG. 67B. And in response to detecting rotational movement about the Z axis in clockwise direction, the controller 200 may control the curved display 100 to display the UI element on the right-side sub region 6720, as illustrated in the lower half (left) of FIG. 67B. And in response to detecting rotational movement about the Z axis in counter-clockwise direction, the controller 200 may control the curved display 100 to display the UI element on the left-side sub region 6710, as illustrated in the lower half (right) of FIG. 67B.

While the user terminal device 1000 maintains the horizontal mode, in response to detecting rotational movement about X axis of the user terminal device 1000, the controller 200 may determine a sub region to display UI element according to the rotational movement.

Figure 68A:
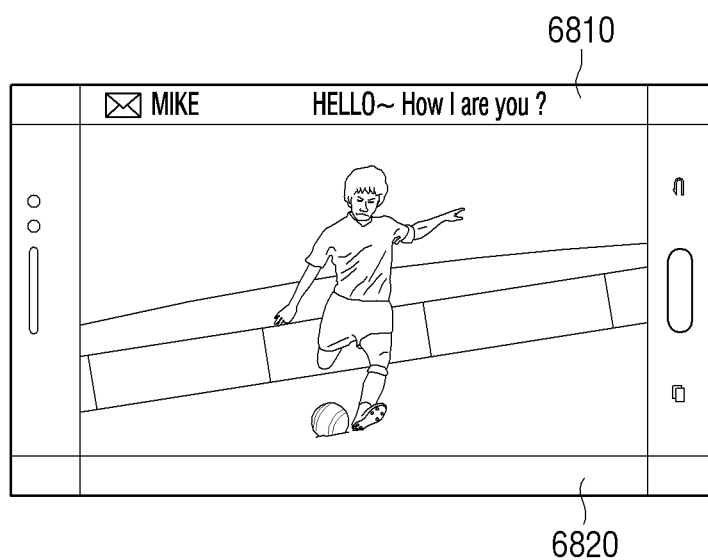
Figure 68A:
Figure 68A:
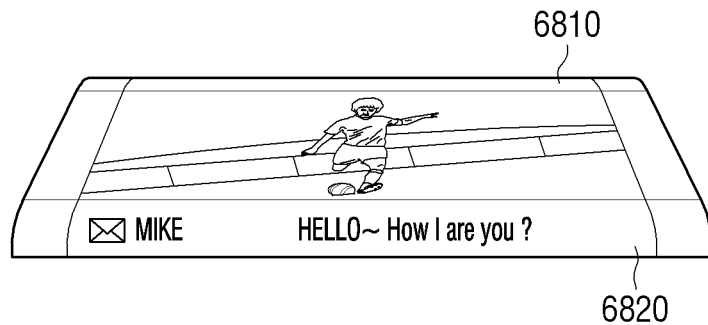
Figure 68B:
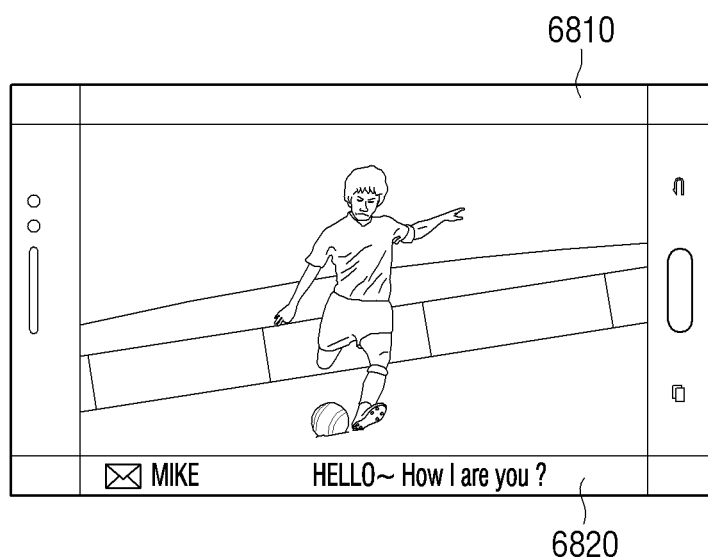
Figure 68B:
Figure 68B:
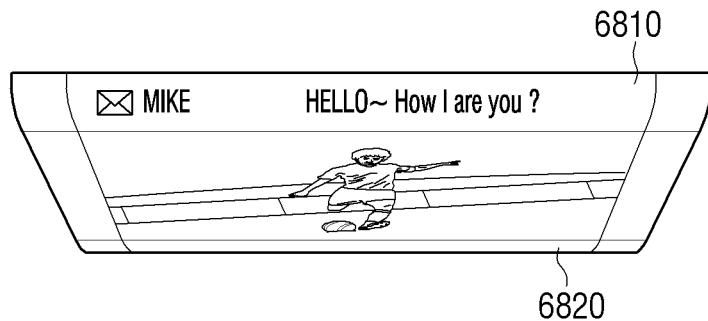

That is, while the user terminal device 1000 maintains the horizontal mode, in response to detecting rotational movement to flip backward about X axis, the controller 200 may control the curved display 100 to display the UI element on the lower-side sub region 6820, as illustrated in FIG. 68A. And while the user terminal device 1000 maintains the horizontal mode, in response to detecting rotational movement to flip forward about X axis, the controller 200 may control the curved display 100 to display the UI element on the upper-side sub region 6810, as illustrated in FIG. 68B.

As illustrated in FIGS. 67A to 68B, because sub region to display the UI element is determined based on the rotational movement, the UI elements that is closer to the user's eyes or comes into user's view, can be displayed on the sub region.

Further, the controller 200 may control the curved display 100 to display a variety of UI elements on a plurality of sub regions, according to application being executed.

Figure 69A:
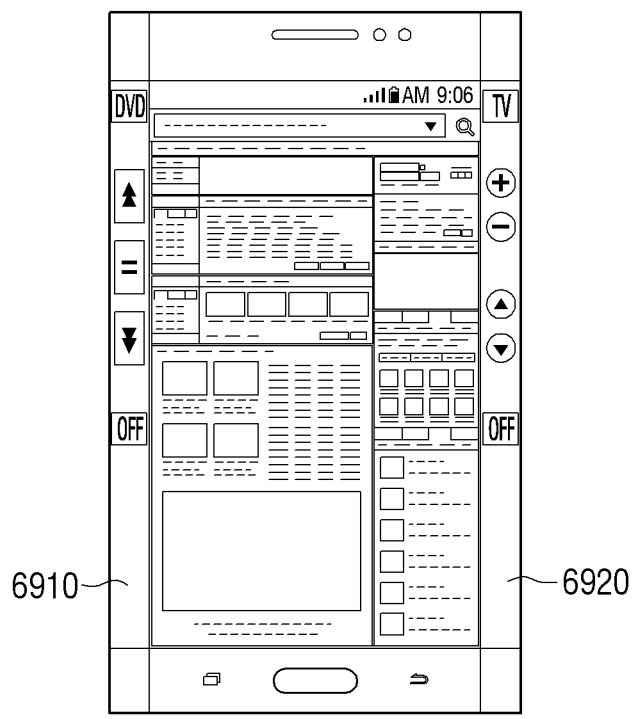

In one embodiment, in response to executing a plurality of remote control applications to control a plurality of external devices (e.g., DVD, TV), as illustrated in FIG. 69A, the controller 200 may control the curved display 100 to display UI element of a remote control application to control DVD on the first sub region 6910 and display UI element of a remote control application to control TV on the second sub region 6920. Further, the controller 200 may control the curved display 100 to display a user's frequently-used remote control application on a plurality of sub regions. For example, the controller 200 may control the curved display 100 to display the remote control application to control TV on the first sub region and display a remote control application to control lighting on the second sub region.

Figure 69B:
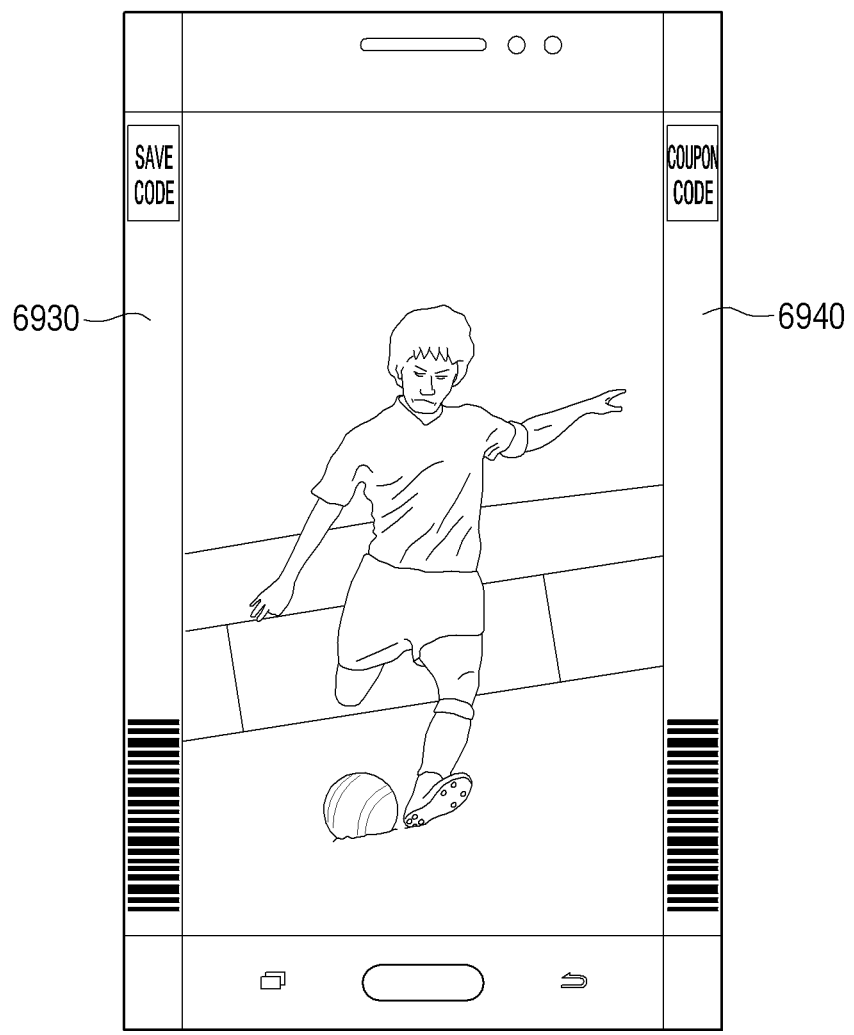

In another embodiment, in response to executing a wallet application, as illustrated in FIG. 69B, the controller 200 may control the curved display 100 to display barcode image for reward saving on the first sub region 6930 and display coupon barcode image on the second sub region 6940. Further, the controller 200 may control the curved display 100 to display information for viewing by a cashier and information for viewing by a user, on a plurality of sub regions, respectively. For example, the controller 200 may control the curved display 100 to display coupon information for viewing by the cashier on the first sub region, and display payment information for viewing by the user on the second sub region.

Figure 69C:
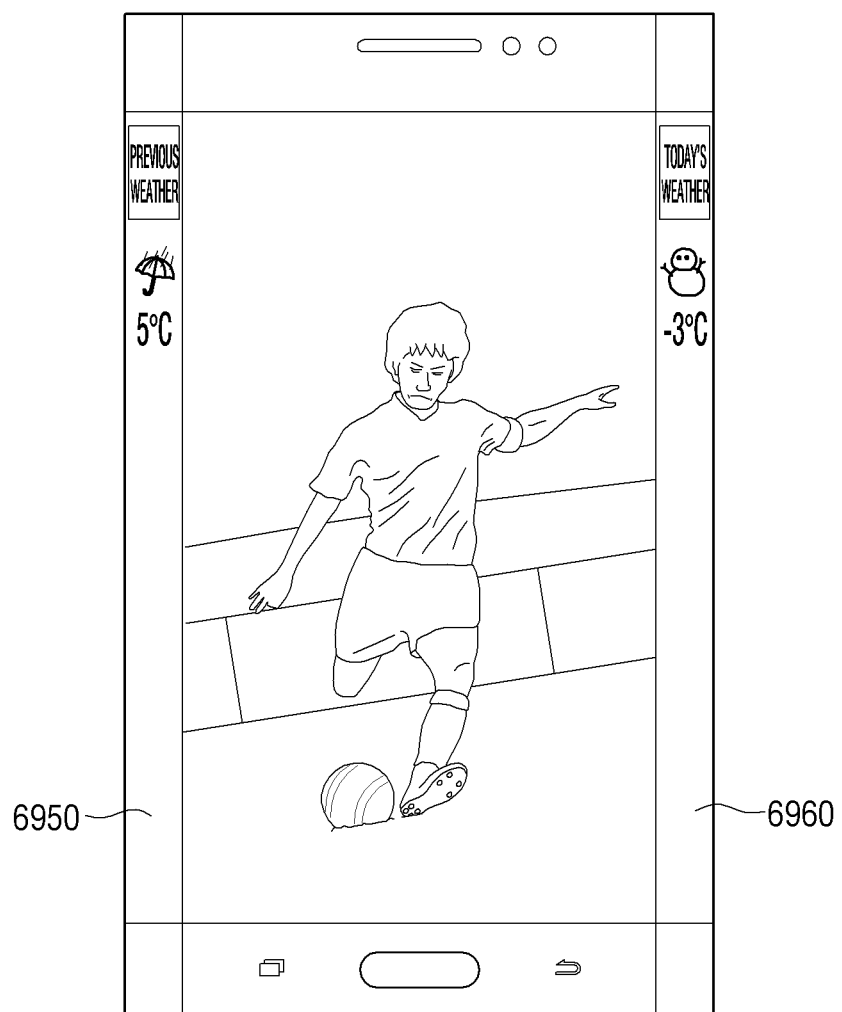

In another embodiment, in response to executing weather application, as illustrated in FIG. 69C, the controller 200 may control the curved display 100 to display weather information for previous day on the first sub region 6950, and display weather information for today on the second sub region 6960. In another example, the controller 200 may control the curved display 100 to display weather information summary for a week on the first sub region, and display detailed weather information for today on the second sub region. In yet another example, the controller 200 may control the curved display 100 to display the weather information for previous day and today on the first sub region, and display weather information for today and next day on the second sub region.

Figure 69D:
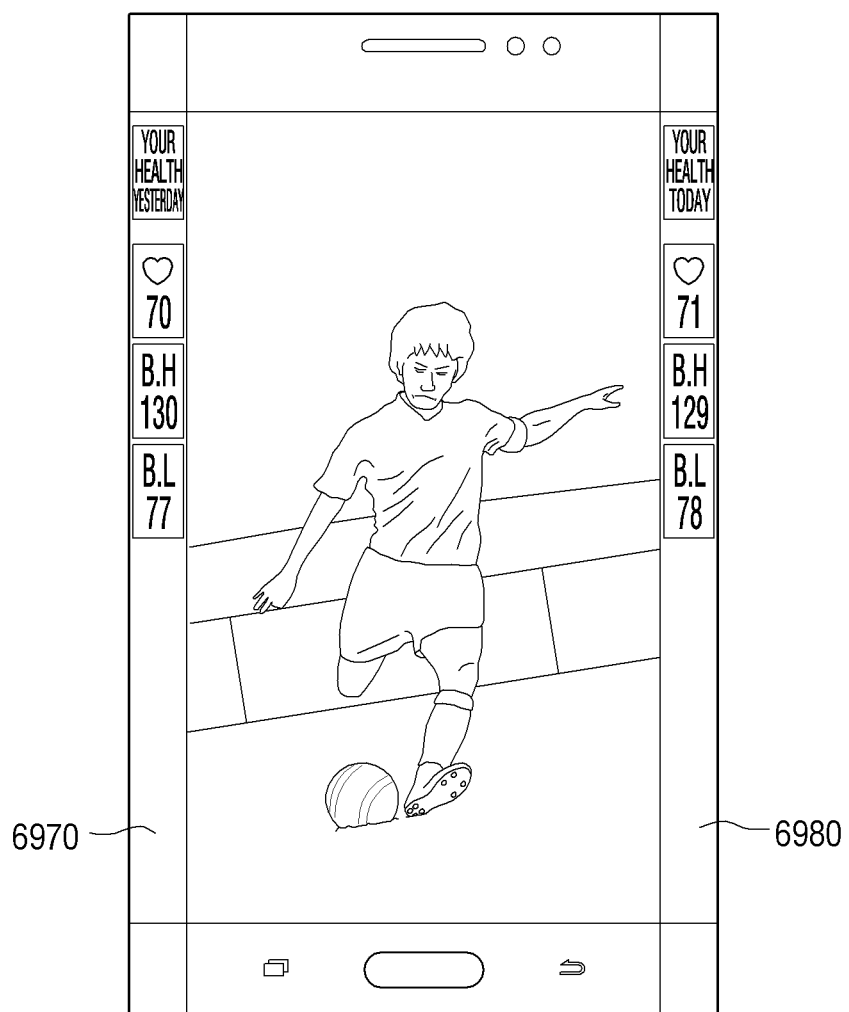

In another embodiment, in response to executing health management application, as illustrated in FIG. 69D, the controller 200 may control the curved display 100 to display health information measured previous day on the first sub region 6970, and display health information measured today on the second sub region 6980. In another example, the controller 200 may control the curved display 100 to display overall health information (e.g., information on entire course, global ranking information, etc.) on the first sub region, and display specific health information (e.g., information on current course, group ranking information, etc.) on the second sub region. In yet another example, the controller 200 may control the curved display 100 to display normal numerical range information (e.g., normal range heat beats, recommended intake, etc.) on the first sub region, and display currently-measured numerical information (e.g., currently-measured heat beats, my intake for today, etc.) on the second sub region.

Meanwhile, although embodiments are described above with reference to FIGS. 69A to 69D illustrating remote control application, wallet application, weather application and health management application, these are illustrated only for exemplary purpose. Accordingly, the technical concept of the embodiment may be applicable to a variety of applications.

For example, in response to executing a voice recognition application, the controller 200 may control the curved display 100 to display voice-recognized information (e.g., voice-recognized text information) on the first sub region, and display information on available application (e.g., connectable functions/list of applications) on the second sub region.

In another example, in response to executing a music application, the controller 200 may control the curved display 100 to display the title of the music on the first sub region, and display menus to control the music on the second sub region.

In yet another example, in response to executing an electronic book (e-book) application, the controller 200 may control the curved display 100 to display title of a book on the first sub region, and display bookmark on the second sub region. Further, the controller 200 may control the curved display 100 to display index to previous page based on the current page on the first sub region, and display index to next page on the second sub region.

In yet another example, in response to executing an auto vehicle-related application (e.g., navigation), the controller 200 may control the curved display 100 to display menus for a driver on the first sub region, and display menus for a passenger on the second sub region.

In yet another example, in response to executing a navigation application, the controller 200 may control the curved display 100 to display estimated/target information (e.g., estimated arrival time, final destination, etc.) on the first sub region, and display current status information (e.g., road condition (congestion, etc.), current location, etc.) on the second sub region.

In yet another example, in response to executing a convergence application, the controller 200 may control the curved display 100 to display superordinate concept information (e.g., list of external devices connected, list of detected beacons, etc.) on the first sub region, and display subordinate concept information (e.g., menus for selected device, messages for each beacon, etc.) on the second sub region. Further, the controller 200 may control the curved display 100 to display information about a subject doing an action (e.g., information about transmitting/receiving devices) on the first sub region, and display information about a content of the action (e.g., transmitted/received information) on the second sub region.

In yet another example, in response to executing a telephone application, the controller 200 may control the curved display 100 to display information about person currently in conversation in the first sub region, and display information about a person waiting for conversation on the second sub region.

In yet another example, in response to executing a message application, the controller 200 may control the curved display 100 to display a list of message groups for which message is received, on the first sub region, and display message for each of the message group on the second sub region.

In yet another example, in response to executing a time application, the controller 200 may control the curved display 100 to display time information of a country where the user has residence, on the first sub region, and display time information about a country for roaming, on the second sub region.

In yet another example, in response to executing an information search application, the controller 200 may control the curved display 100 to display total results of search (e.g., real-time hot search words, etc.) on the first sub region, and display partial result of search (e.g., location/age-based hot search words, etc.) on the second sub region.

In yet another example, in response to executing a file download application, the controller 200 may control the curved display 100 to display information on status of transmission of the entire file on the first sub region, and display information on status of transmission of currently-transmitting file on the second sub region.

As described above, the user is able to utilize applications with further increased convenience and ease, because, in response to executing a single application, the overall information is displayed on the first sub region and specific information is displayed on the second sub region, or a first type of information is displayed on the first sub region and a second type of information is displayed on the second sub region.

Further, when a plurality of applications are executed, the controller 200 may control the curved display 100 to display a variety of UI elements on a main region and a plurality of sub regions, depending on types of applications being executed. Herein below, various embodiments will be explained with reference to FIGS. 70A to 81D.

Figure 70A:
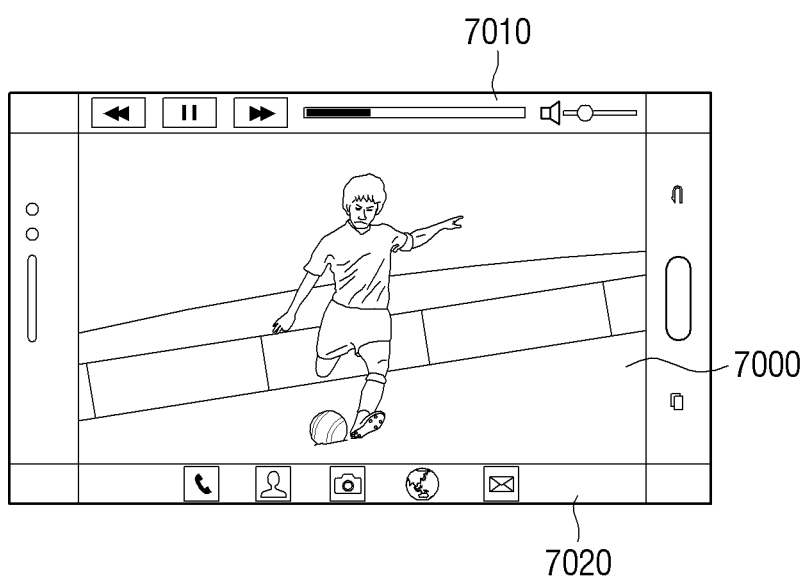
Figure 70B:
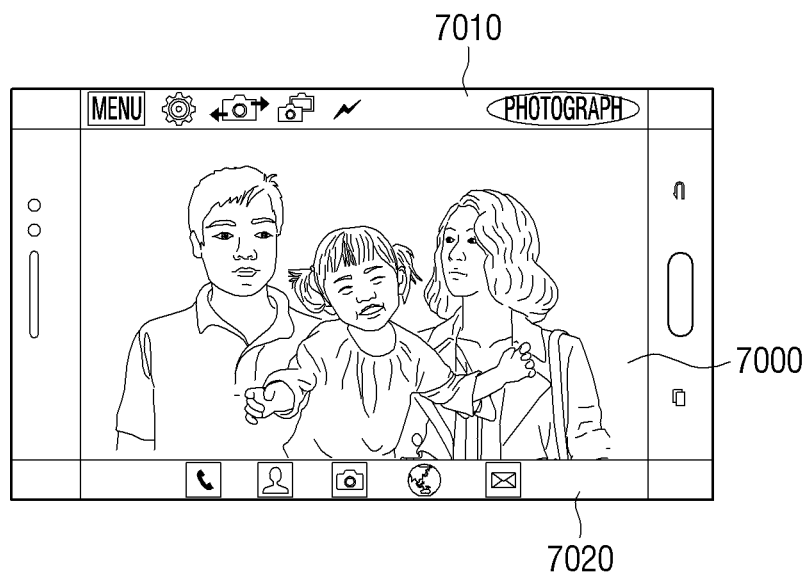

In one embodiment, when a video application is executed, the controller 200 may control the curved display 100 to display video content on the main region 7000, display video control UI to control the video content on the first sub region 7010, and display user's frequently used shortcut icons on the second sub region 7020, as illustrated in FIG. 70A. While the video application is being executed, in response to executing a camera application, the controller 200 may control the curved display 100 to display a photographed screen photographed by a photographer 380 on the main region 7000, display photographing menus (e.g., photographing icon, photography setting icons, etc.) on the first sub region 7010, and display user's frequently used shortcut icons on the second sub region 7020, as illustrated in FIG. 70B.

Figure 71A:
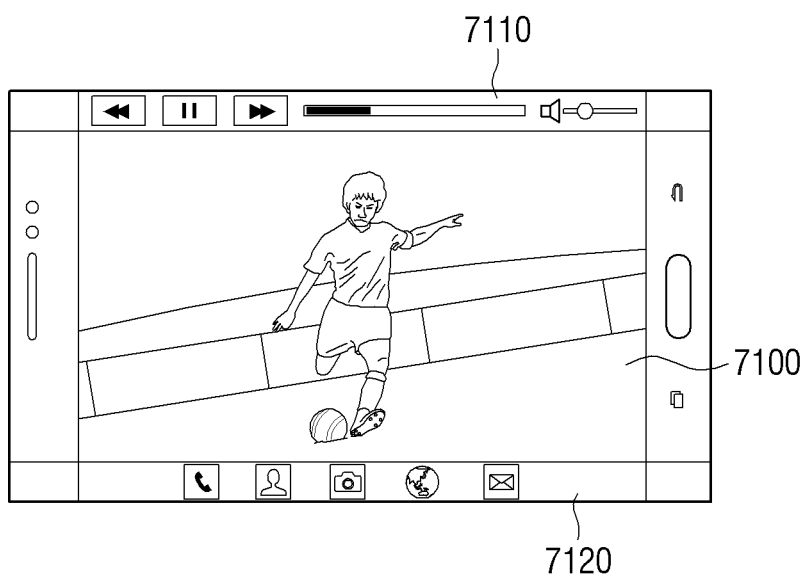
Figure 71B:
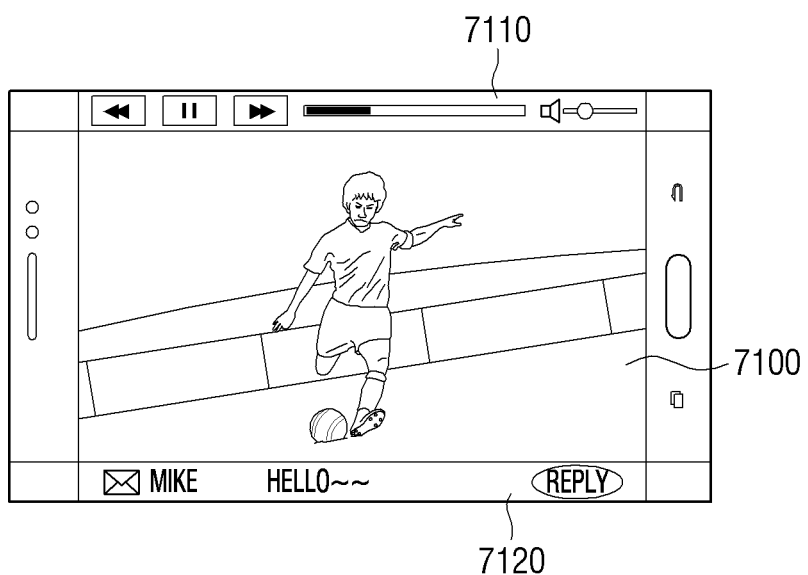
Figure 71C:
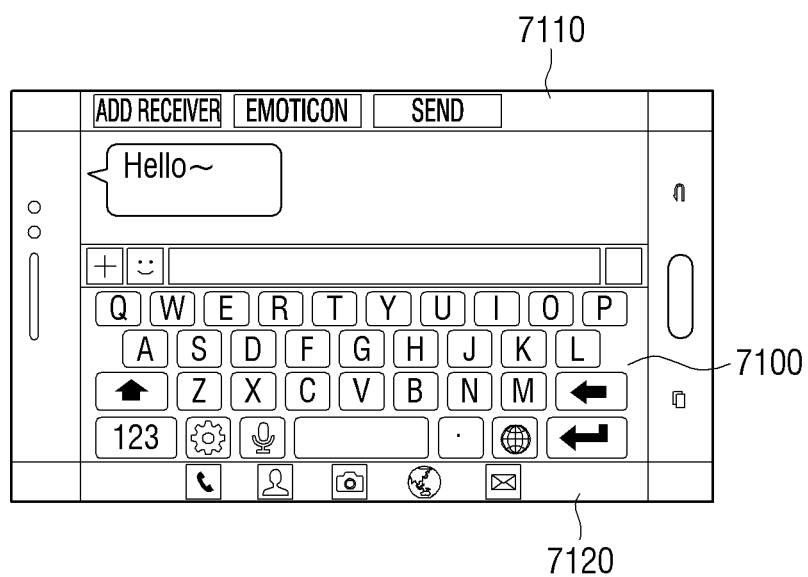

In another embodiment, when the video application is executed, the controller 200 may control the curved display 100 to display video content on the main region 7000, display video control UI to control the video content on the first sub region 7010, and display user's frequently used shortcut icons on the second sub region 7020, as illustrated in FIG. 71A. While the video application is being executed, in response to receiving a message from outside, the controller 200 may control the curved display 100 to continue displaying the video content on the main region 7100, display the video control UI to control the video control the video content on the first sub region 7110, and display notification UI for the received message (e.g., caller information, time of reception, partial content of message, reply button, etc.) on the second sub region 7120, as illustrated in FIG. 71B. Then in response to selecting the reply button displayed on the notification UI, the controller 200 may control the curved display 100 to display a message input window and a keyboard on the main region 7100, display context menus of the message application (e.g., adding receiver, emoticons, send contact info., etc.) on the first sub region 7110, and display user's frequently used shortcut icons on the second sub region 7120, as illustrated in FIG. 71C.

Figure 72A:
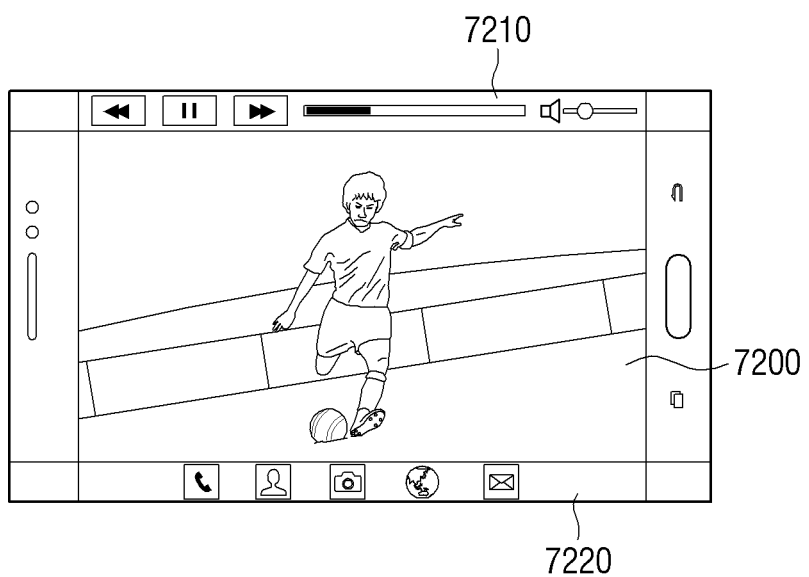
Figure 72B:
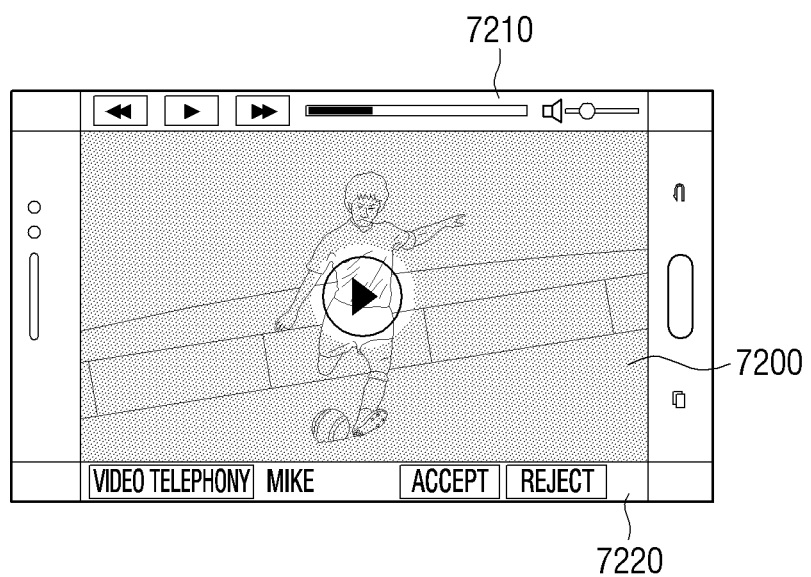
Figure 72C:
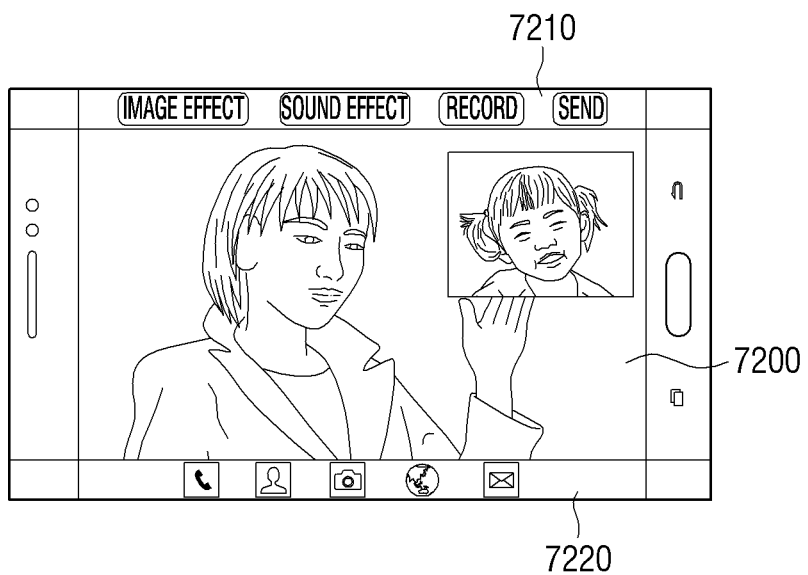
Figure 72D:
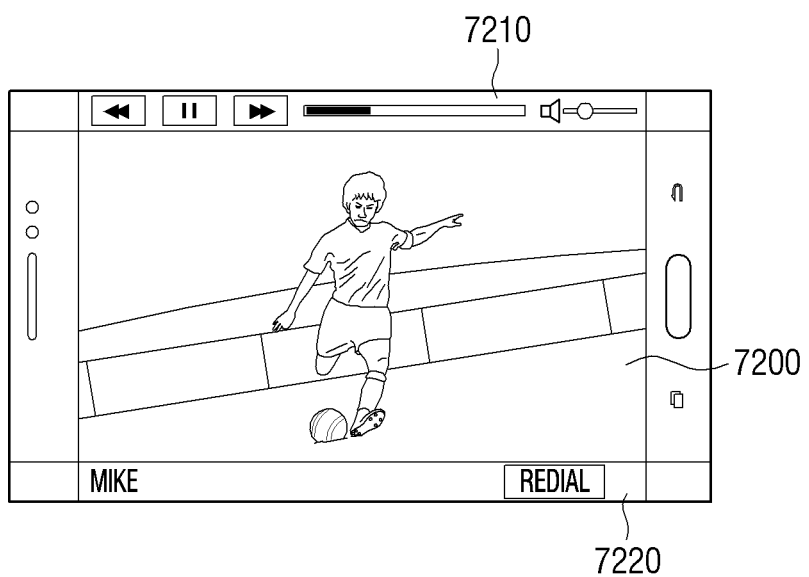

In another embodiment, when the video application is executed, the controller 200 may control the curved display 100 to display the video content on the main region 7200, display video control UI to control the video content on the first sub region 7210, and display user's frequently used shortcut icons on the second sub region 7220, as illustrated in FIG. 72A. Then in response to receiving a request for video telephony from outside, the controller 200 may control the curved display 100 to discontinue playing the video content on the main region 7200, display the video control UI to control the video content on the first sub region 7210, and display video telephony reception UI (e.g., caller information, accept icon, reject icon, etc.) on the second sub region 7220, as illustrated in FIG. 72B. Then in response to selecting the accept icon, the controller 200 may control the curved display 100 to display a video telephony screen on the main region 7200, display video telephony menu (e.g., image effect, sound effect, record, send contact information, etc.) on the first sub region 7210, and display user's frequently used shortcut icons on the second sub region 7220, as illustrated in FIG. 72C. In response to ending the video telephony, the controller 200 may control the curved display 100 to resume displaying the video content on the main region 7200, display the video control UI on the first sub region 7210, and display video telephony redial UI (e.g., caller information, redial icon, telephone icon, etc.) on the second sub region 7220, as illustrated in FIG. 72D. Meanwhile, the video telephony redial UI displayed on the second sub region 7220 may be removed after a preset time (e.g., after 30 seconds), and the user's frequently used shortcut icons may be displayed again on the second sub region 7220.

Figure 73A:
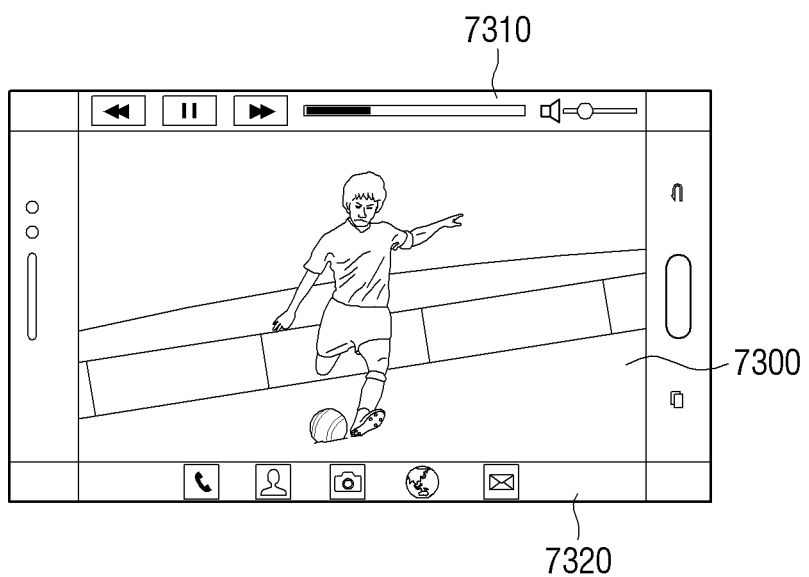
Figure 73B:
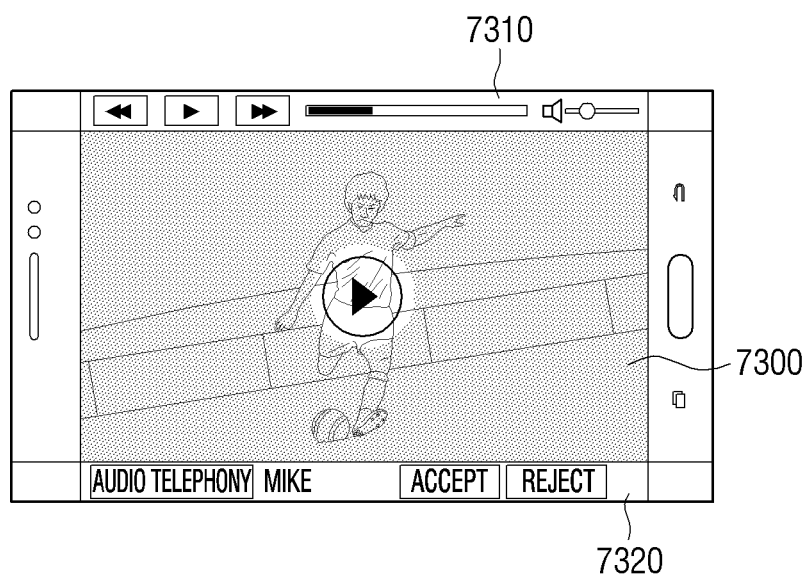
Figure 73C:
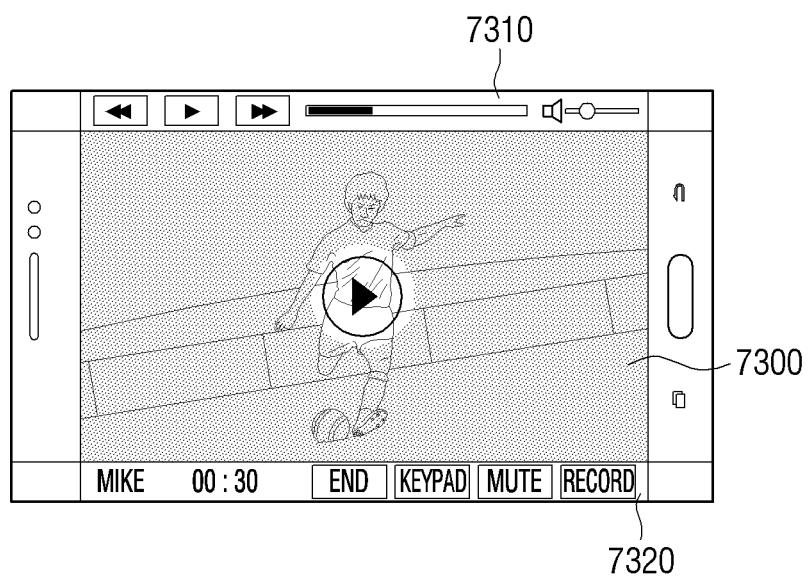
Figure 73D:
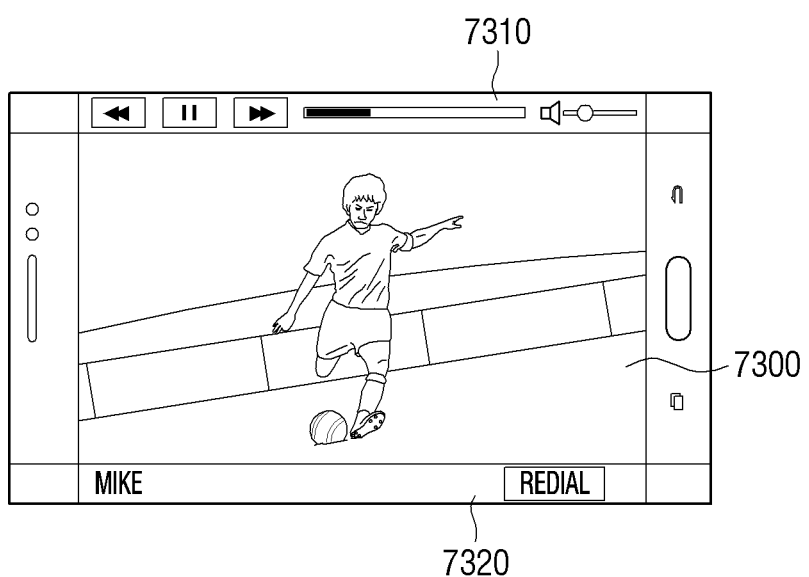

In another embodiment, when the video application is executed, the controller 200 may control the curved display 100 to display the video content on the main region 7300, display video control UI to control the video content on the first sub region 7310, and display user's frequently used shortcut icons on the second sub region 7320, as illustrated in FIG. 73A. Then in response to receiving a request for audio telephony from outside, the controller 200 may control the curved display 100 to discontinue playing (pause or stop) the video content on the main region 7300, continue displaying the video control UI to control the video content on the first sub region 7310, and display audio telephony reception UI (e.g., caller information, accept icon, reject icon, etc.) on the second sub region 7320, as illustrated in FIG. 73B. Then in response to selecting the accept icon, the controller 200 may control the curved display 100 to still discontinue playing the video content on the main region 7300, display UI to control the video content on the first sub region 7310, and display audio telephony menu (e.g., caller information, call duration, end a call, mute sound, etc.) on the second sub region 7320, as illustrated in FIG. 73C. In response to ending the audio telephony, the controller 200 may control the curved display 100 to resume displaying the video content on the main region 7300, display the video control UI on the first sub region 7310, and display audio telephony redial UI (e.g., caller information, redial icon, video telephony icon, etc.) on the second sub region 7320, as illustrated in FIG. 73D. Meanwhile, the audio telephony redial UI displayed on the second sub region 7320 may be removed after a preset time (e.g., after 30 seconds), and the user's frequently used shortcut icons may be displayed again on the second sub region 7320.

Figure 74A:
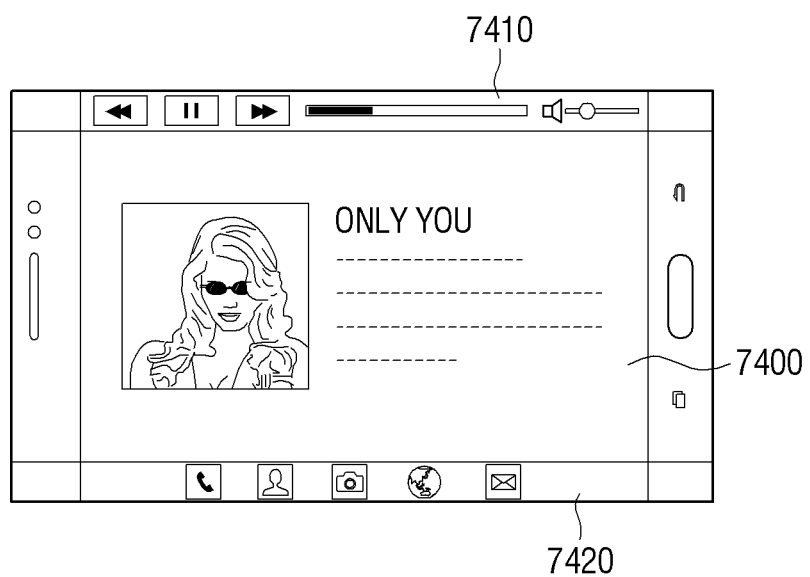
Figure 74B:
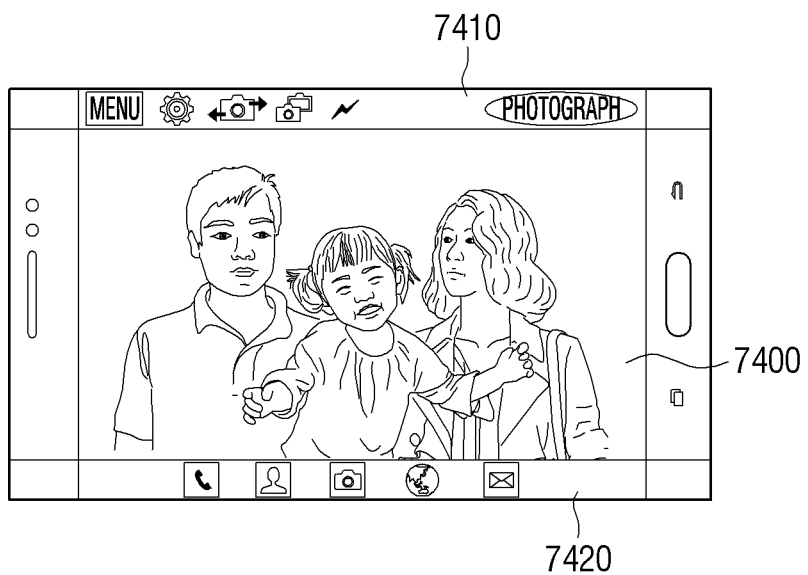

In one embodiment, when the music application is executed, the controller 200 may control the curved display 100 to display information about currently-played music (e.g., album jacket image, lyrics, composer, lyricist, etc.) on the main region 7400, display music control UI to control the music content on the first sub region 7410, and display user's frequently used shortcut icons on the second sub region 7420, as illustrated in FIG. 74A. While the music application is being executed, in response to executing the camera application, the controller 200 may control the curved display 100 to display a photographed screen photographed by the photographer 380 on the main region 7400, display photographing menus (e.g., photographing icons, photography setting icons, etc.) on the first sub region 7410, and display user's frequently used shortcut icons on the second sub region 7420, as illustrated in FIG. 74B.

Figure 75A:
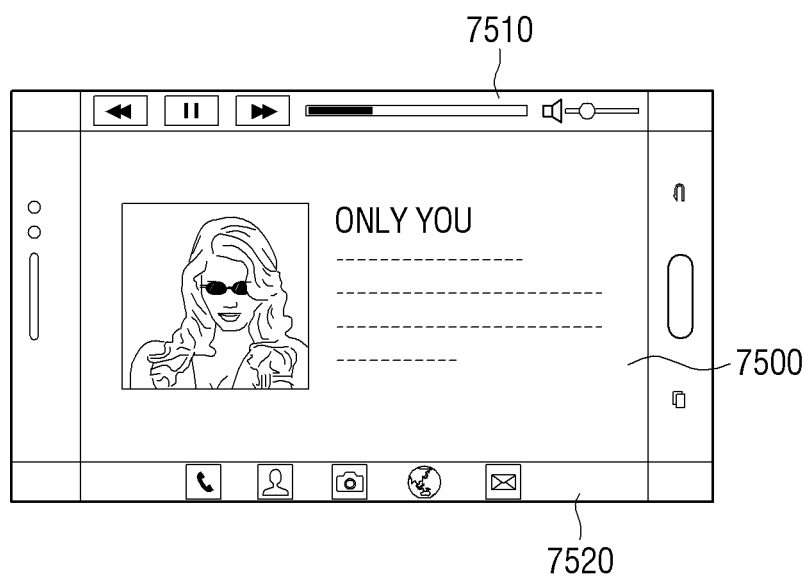
Figure 75B:
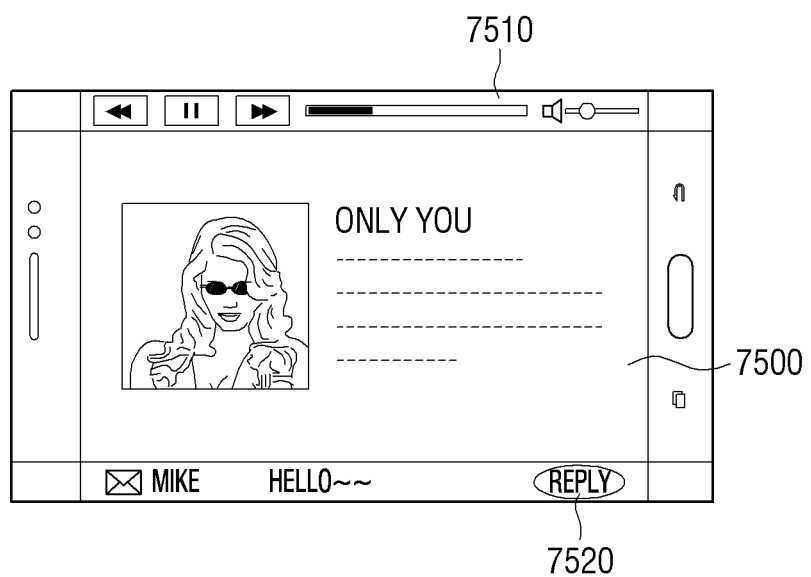
Figure 75C:
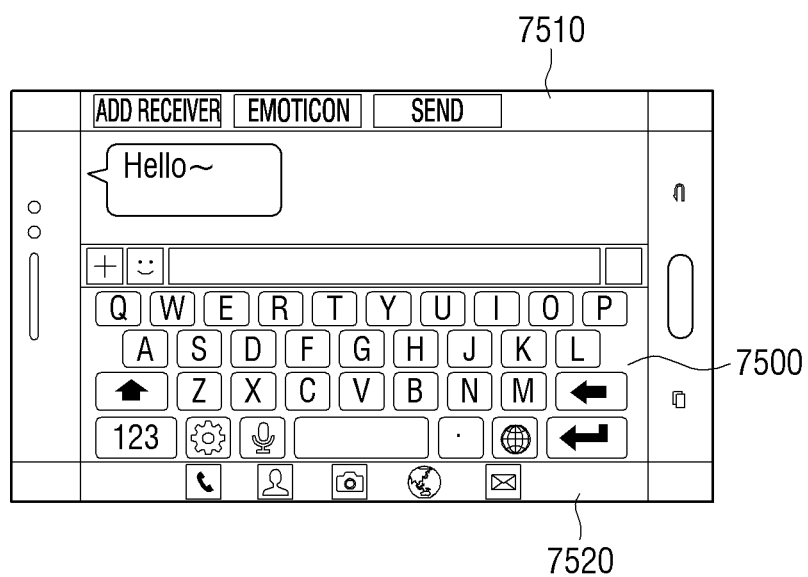

In one embodiment, when the music application is executed, the controller 200 may control the curved display 100 to display information about currently-played music on the main region 7500, display music control UI to control the music content on the first sub region 7510, and display user's frequently used shortcut icons on the second sub region 7520, as illustrated in FIG. 75A. While the music application is being executed, in response to receiving a message from outside, the controller 200 may control the curved display 100 to display information about currently-played music on the main region 7500, display music control UI to control the music content on the first sub region 7510, and display notification UI for the received message (e.g., sender information, arrival time, partial content of message, reply button, etc.) on the second sub region 7520, as illustrated in FIG. 75B. Then in response to selecting the reply button displayed on the notification UI, the controller 200 may control the curved display to display a message input window and a keyboard on the main region 7500, display context menus of the message application (e.g., add receiver, emoticons, send contact information, etc.) on the first sub region 7510, and display user's frequently used shortcut icons on the second sub region 7520, as illustrated in FIG. 75C.

Figure 76A:
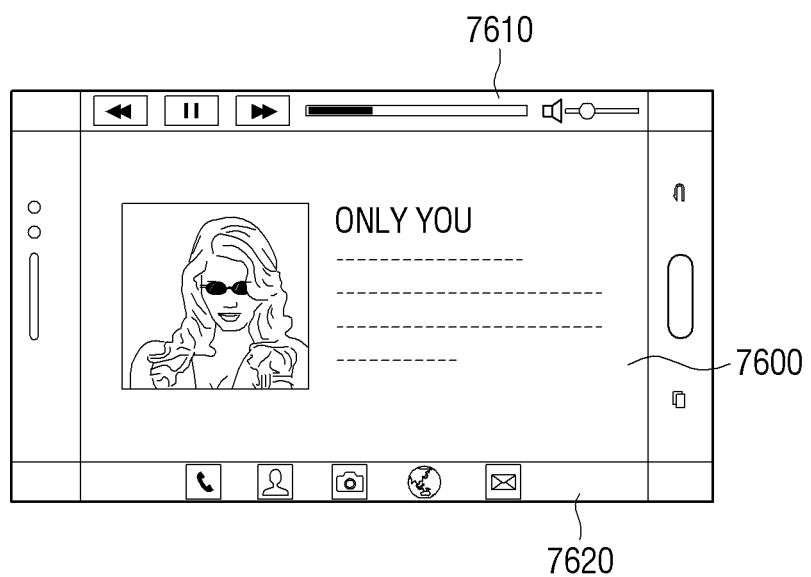
Figure 76B:
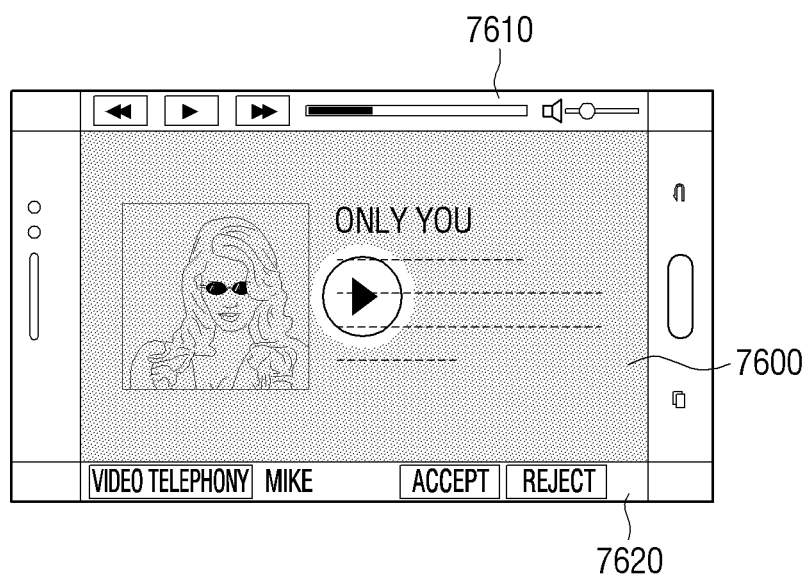
Figure 76C:
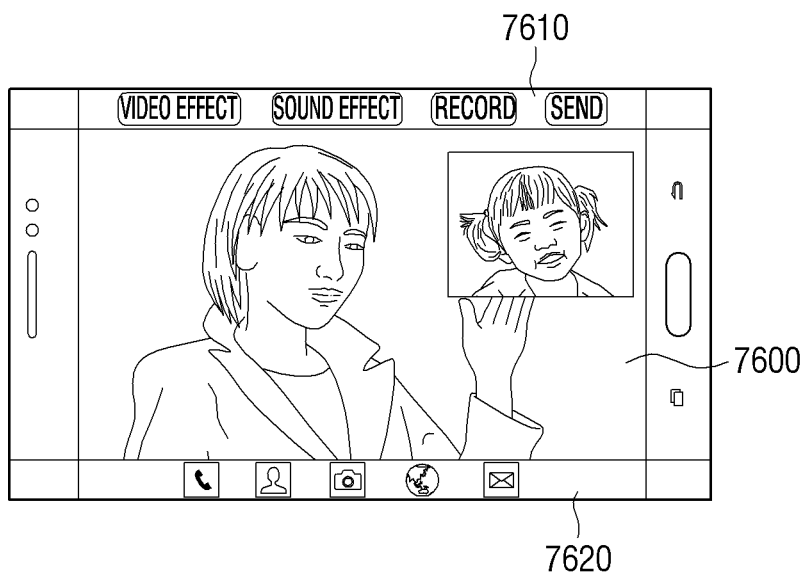
Figure 76D:
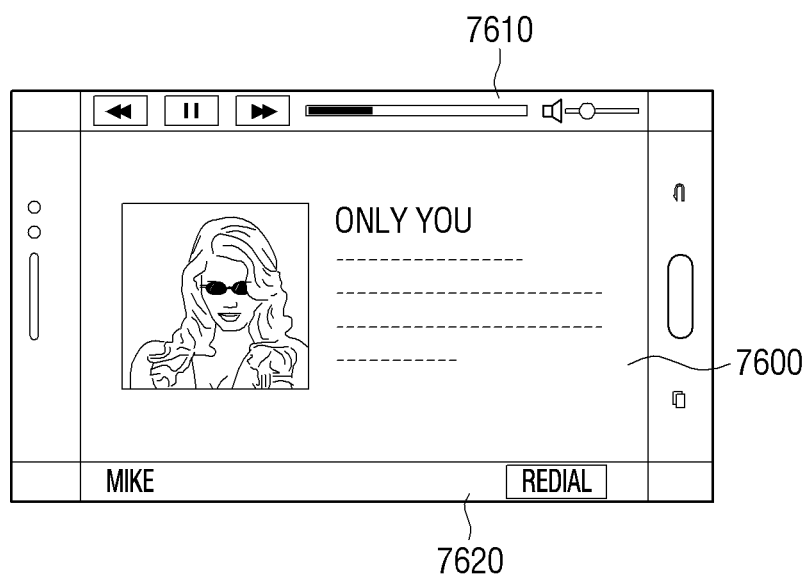

In another embodiment, when the music application is executed, the controller 200 may control the curved display 100 to display information about currently-played music on the main region 7600, display music control UI to control the music content on the first sub region 7610, and display user's frequently used shortcut icons on the second sub region 7620, as illustrated in FIG. 76A. Then in response to receiving a message from outside, the controller 200 may control the curved display 100 to discontinue playing the music content on the main region 7600, display the music control UI to control the music content on the first sub region 7610, and display video telephony reception UI (e.g., sender information, accept icon, reject icon, etc.) on the second sub region 7620, as illustrated in FIG. 76B. Then, in response to selecting the accept icon, the controller 200 may control the curved display 100 to display a video telephony screen on the main region 7600, display video telephony menus (e.g., image effect, sound effect, record, send contact information, etc.) on the first sub region 7610, and display user's frequently used shortcut icons on the second sub region 7620, as illustrated in FIG. 76C. Then in response to ending the video telephony call, the controller 200 may control the curved display 100 to resume displaying the information about the currently-played music on the main region 7600, display the music control UI on the first sub region 7610, and display video telephony redial UI (e.g., caller information, redial icon, telephony call icon, etc.) on the second sub region 7620, as illustrated in FIG. 76D. Meanwhile, the video telephony redial UI displayed on the second sub region 7620 may be removed after a preset time (e.g., after 30 seconds), and the user's frequently used shortcut icons may be displayed again on the second sub region 7620.

Figure 77A:
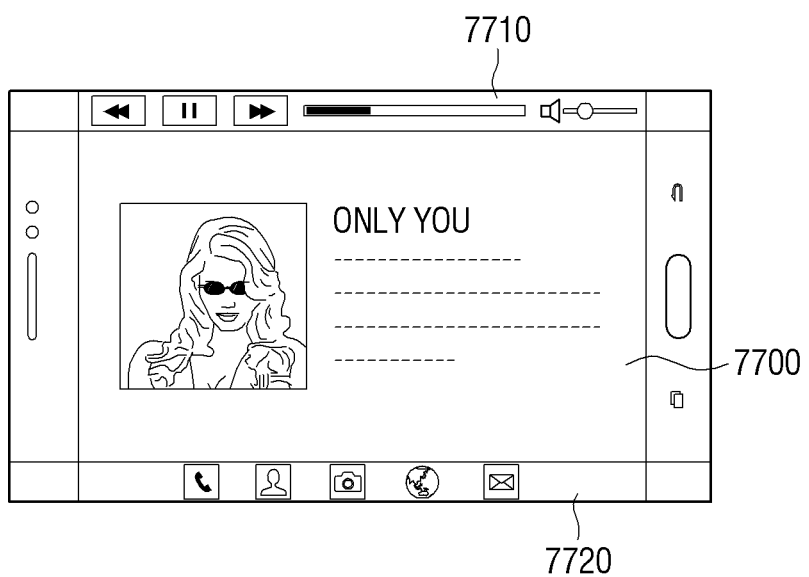
Figure 77B:
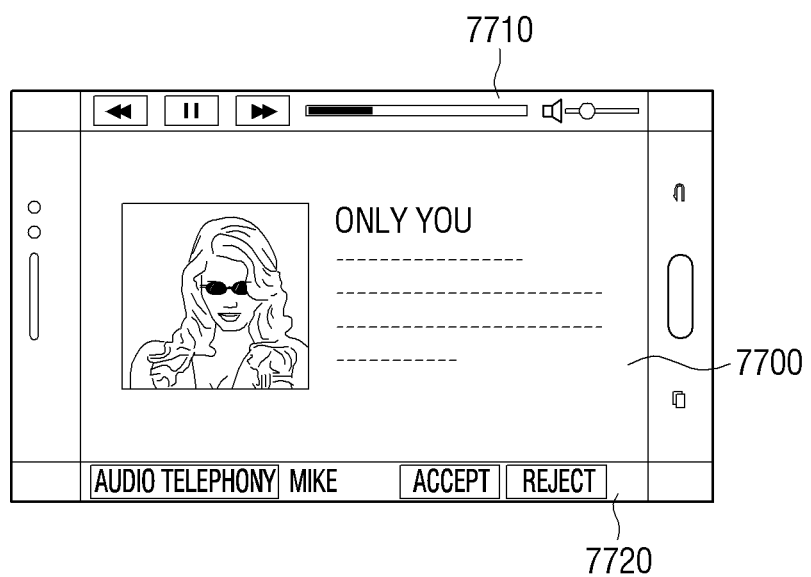
Figure 77C:
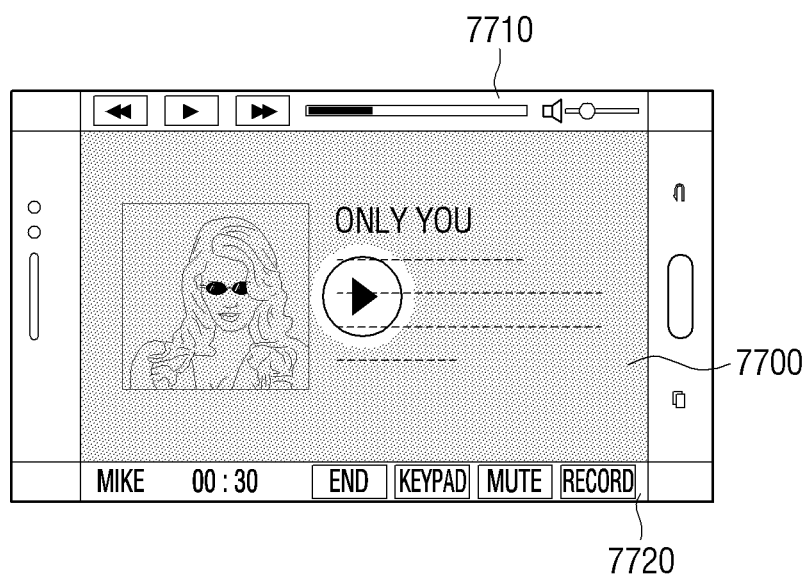
Figure 77D:
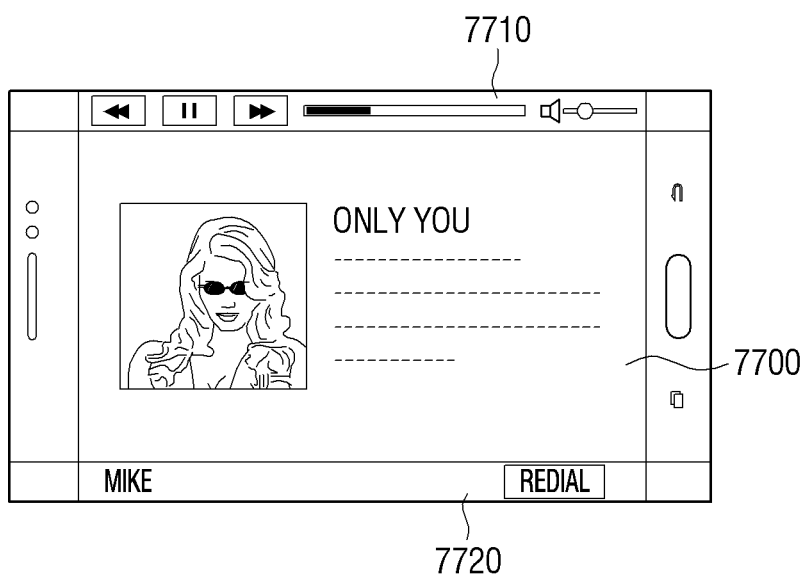

In another embodiment, when the music application is executed, the controller 200 may control the curved display 100 to display information about currently-played music on the main region 7700, display music control UI to control the music content on the first sub region 7710, and display user's frequently used shortcut icons on the second sub region 7720, as illustrated in FIG. 77A. Then in response to receiving a request for audio telephony from outside, the controller 200 may control the curved display 100 to discontinue playing the music content on the main region 7700, still display the music control UI on the first sub region 7710, and display audio telephony reception UI (e.g., caller information, accept icon, reject icon, etc.) on the second sub region 7720, as illustrated in FIG. 77B. Then in response to selecting the accept icon, the controller 200 may control the curved display 100 to still discontinue displaying music content on the main region 7700, display control UI to control the music content on the first sub region 7710, and display audio telephony UI (e.g., caller information, call duration, end call, mute sounds, etc.) on the second sub region 7720, as illustrated in FIG. 77C. Then in response to ending the audio telephony call, the controller 200 may control the curved display 100 to resume displaying the information about the currently-played music on the main region 7700, display the music control UI on the first sub region 7710, and display audio telephony redial UI (e.g., caller information, redial icon, audio telephony icon, etc.) on the second sub region 7720, as illustrated in FIG. 77D. Meanwhile, the audio telephony redial UI displayed on the second sub region 7720 may be removed after a preset time (e.g., after 30 seconds), and the user's frequently used shortcut icons may be displayed again on the second sub region 7720.

Figure 78A:
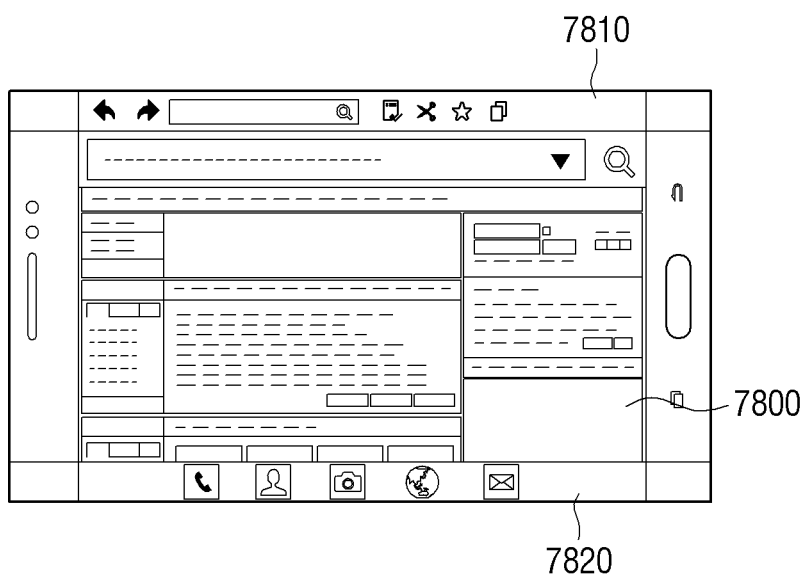
Figure 78B:
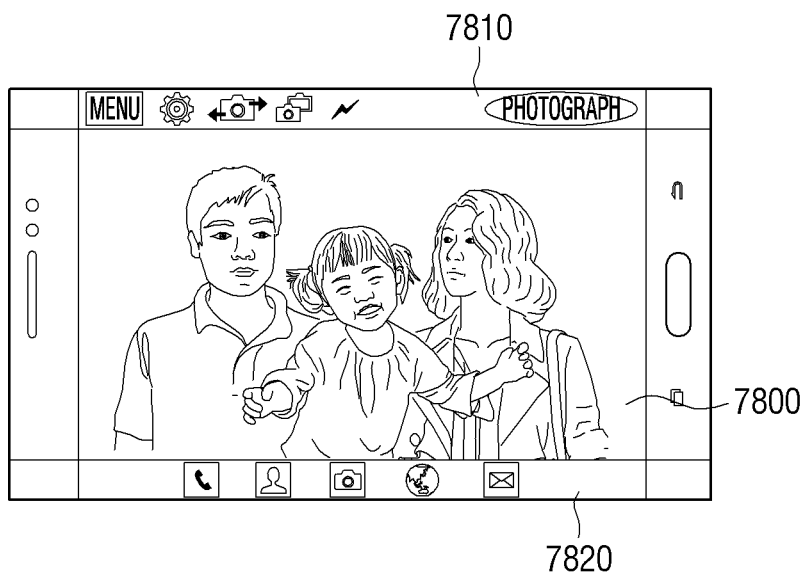

In one embodiment, when the web application is executed, the controller 200 may control the curved display 100 to display a web screen on the main region 7800, display control UI (e.g., previous icon, next icon, home icon, address input window, search window, etc.) to control the web screen on the first sub region 7810, and display user's frequently used shortcut icons on the second sub region 7820, as illustrated in FIG. 78A. While the web application is being executed, in response to executing the camera application, the controller 200 may control the curved display 100 to display a photographed screen photographed by a photographer 380 on the main region 7800, display photographing menus (e.g., photographing icon, photography setting icons, etc.) on the first sub region 7810, and display user's frequently used shortcut icons on the second sub region 7820, as illustrated in FIG. 78B.

Figure 79A:
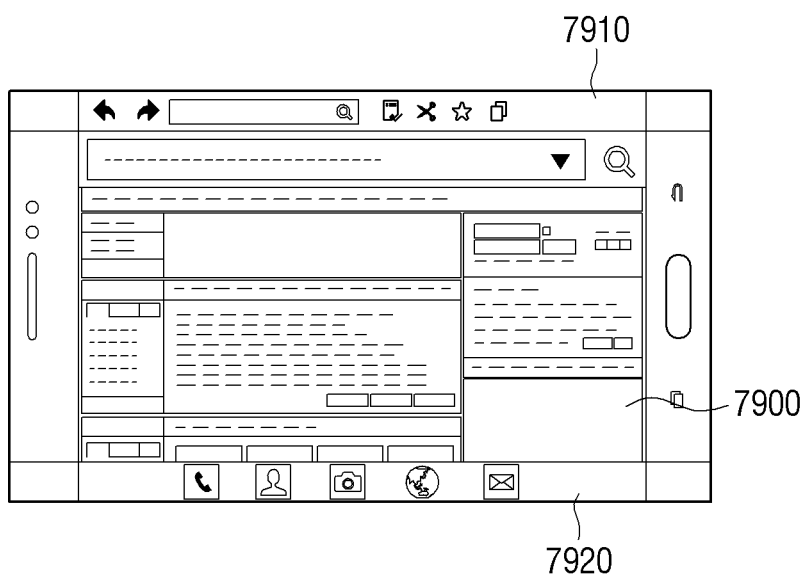
Figure 79B:
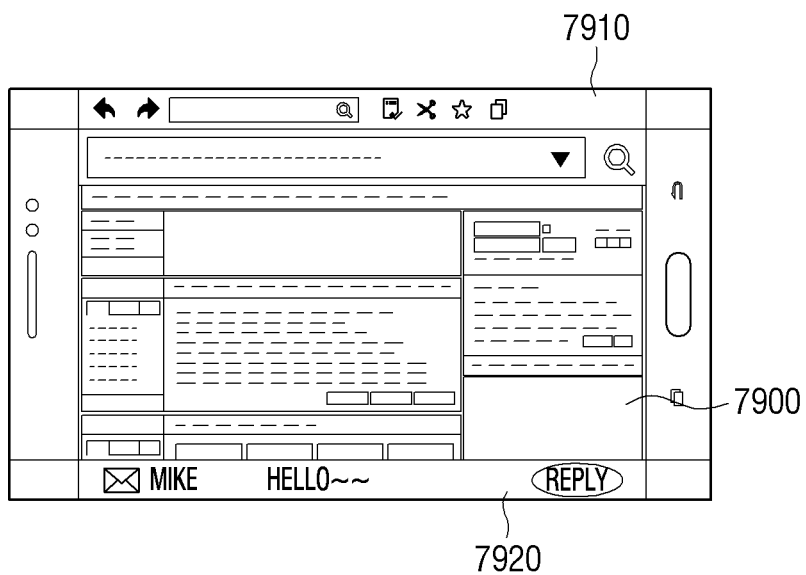
Figure 79C:
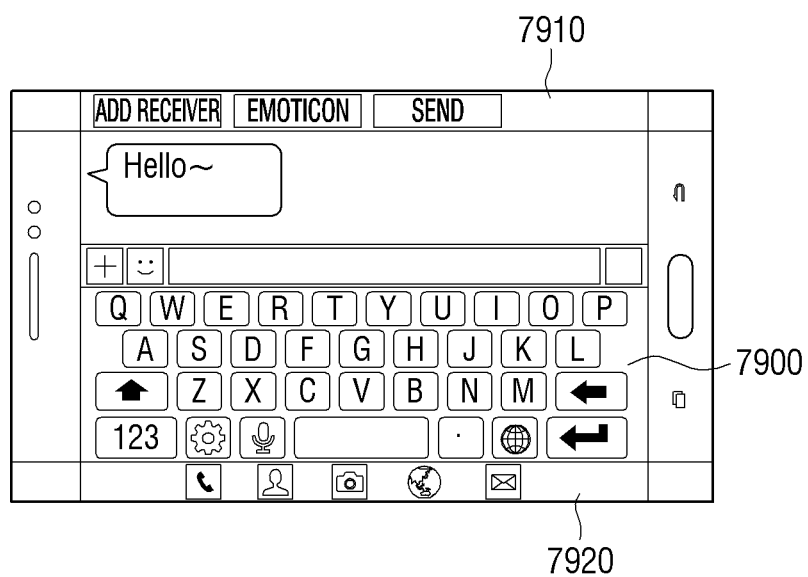

In another embodiment, when the web application is executed, the controller 200 may control the curved display 100 to display a web screen on the main region 7900, display control UI to control the web screen on the first sub region 7910, and display user's frequently used shortcut icons on the second sub region 7920, as illustrated in FIG. 79A. While the web application is being executed, in response to receiving a message from outside, the controller 200 may control the curved display 100 to display web screen on the main region 7900, display control UI to control the web screen on the first sub region 7910, and display notification UI for the received message (e.g., sender information, arrival time, partial content of message, reply button, etc.) on the second sub region 7920, as illustrated in FIG. 79B. Then in response to selecting the reply button displayed on the notification UI, the controller 200 may control the curved display to display a message input window and a keyboard on the main region 7900, display context menus of the message application (e.g., add receiver, emoticons, send contact information, etc.) on the first sub region 7910, and display user's frequently used shortcut icons on the second sub region 7920, as illustrated in FIG. 79C.

Figure 80A:
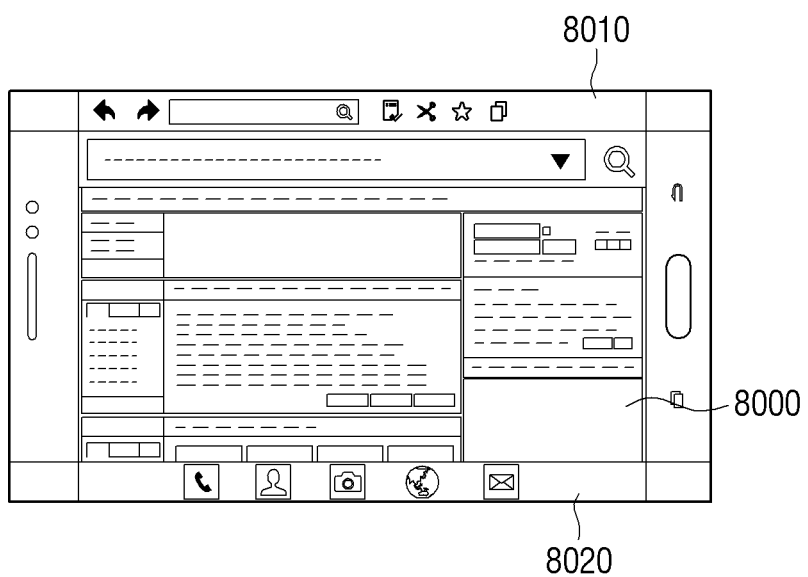
Figure 80B:
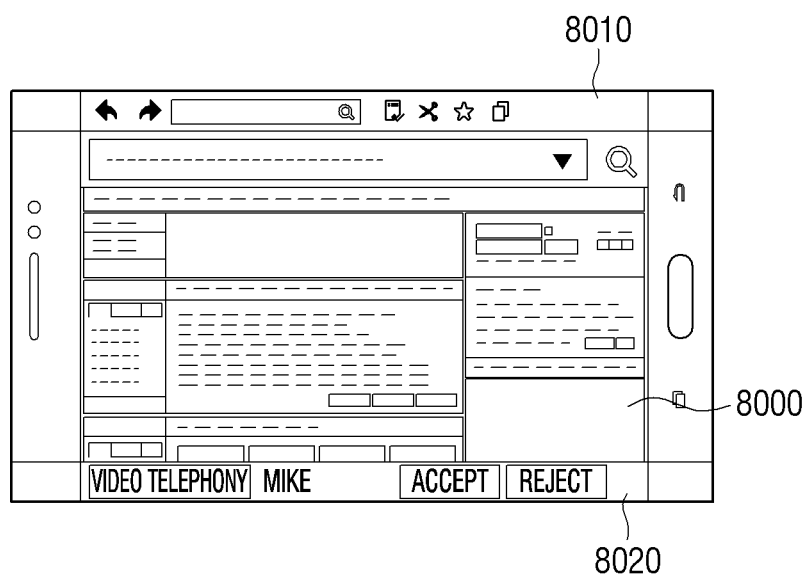
Figure 80C:
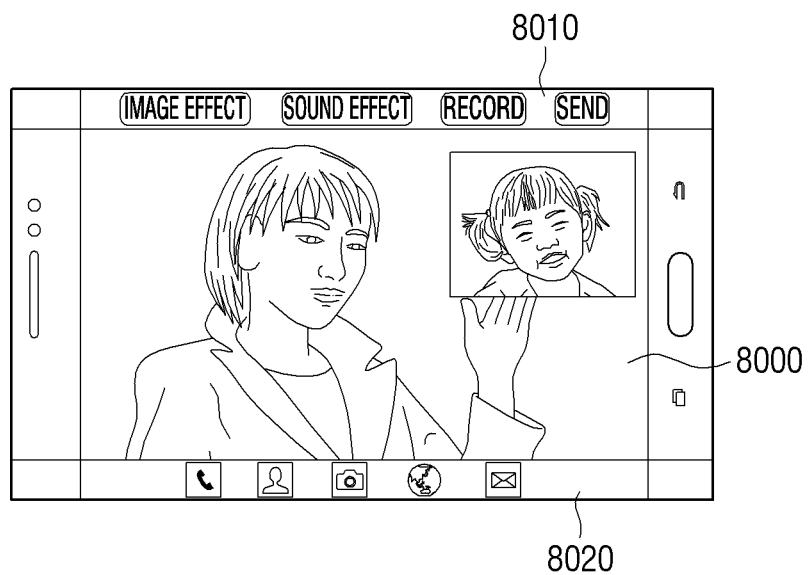
Figure 80D:
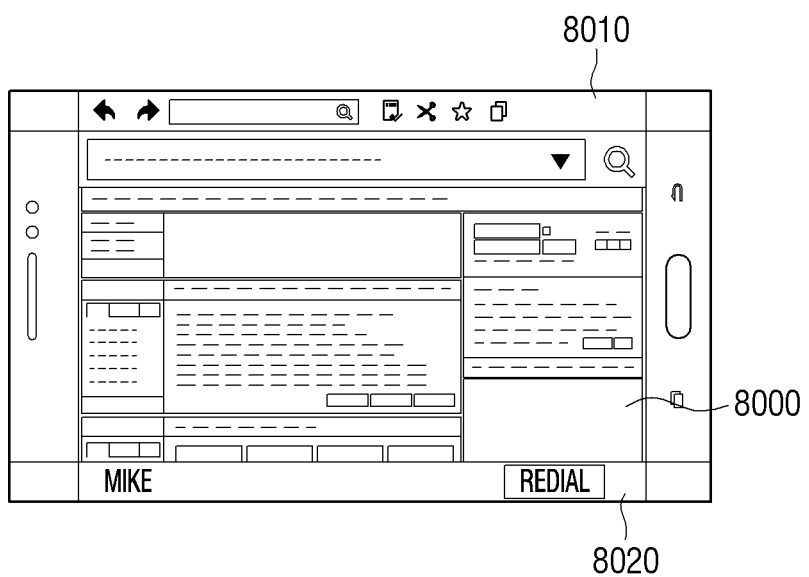

In another embodiment, when the web application is executed, the controller 200 may control the curved display 100 to display a web screen on the main region 8000, display control UI to control the web screen on the first sub region 8010, and display user's frequently used shortcut icons on the second sub region 8020, as illustrated in FIG. 80A. Then in response to receiving a request for video telephony from outside, the controller 200 may control the curved display 100 to still display the web screen on the main region 8000, display the control UI to control the web screen on the first sub region 8010, and display video telephony reception UI (e.g., caller information, accept icon, reject icon, etc.) on the second sub region 8020, as illustrated in FIG. 80B. Then in response to selecting the accept icon, the controller 200 may control the curved display 100 to display a video telephony screen on the main region 8000, display video telephony menu (e.g., image effect, sound effect, record, send contact information, etc.) on the first sub region 8010, and display user's frequently used shortcut icons on the second sub region 8020, as illustrated in FIG. 80C. In response to ending the video telephony, the controller 200 may control the curved display 100 to resume displaying the web screen on the main region 8000, display the control UI to control the web screen on the first sub region 8010, and display video telephony redial UI (e.g., caller information, redial icon, telephone icon, etc.) on the second sub region 8020, as illustrated in FIG. 80D. Meanwhile, the video telephony redial UI displayed on the second sub region 8020 may be removed after a preset time (e.g., after 30 seconds), and the user's frequently used shortcut icons may be displayed again on the second sub region 8020.

Figure 81A:
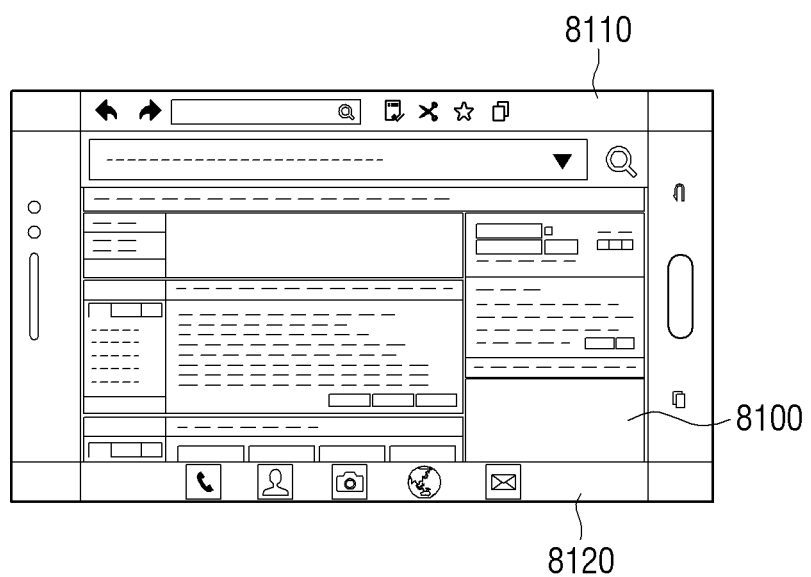
Figure 81B:
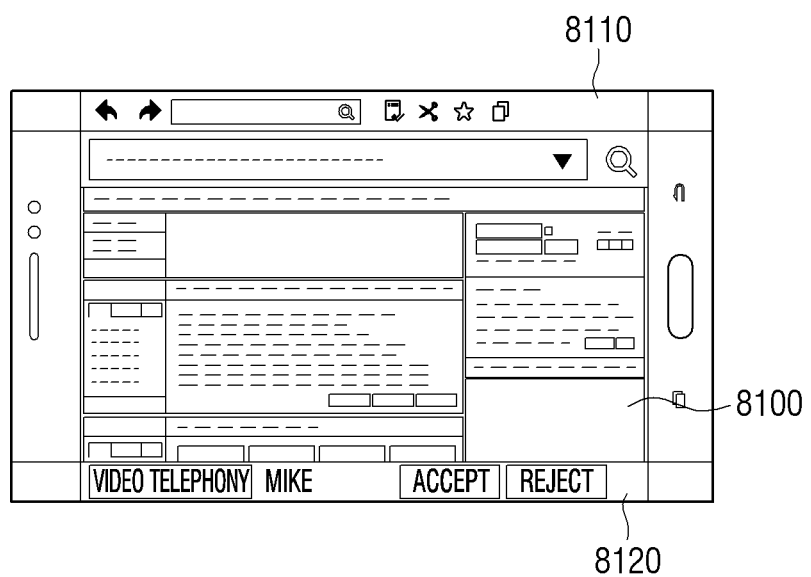
Figure 81C:
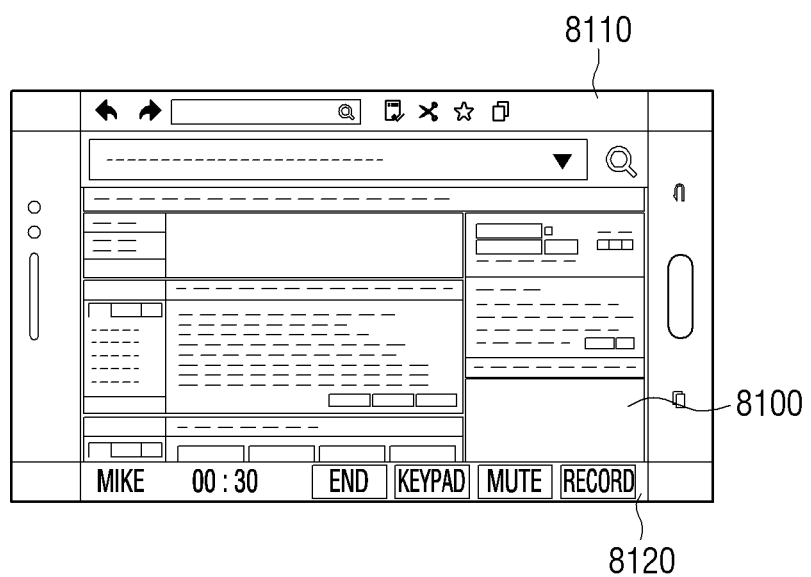
Figure 81D:
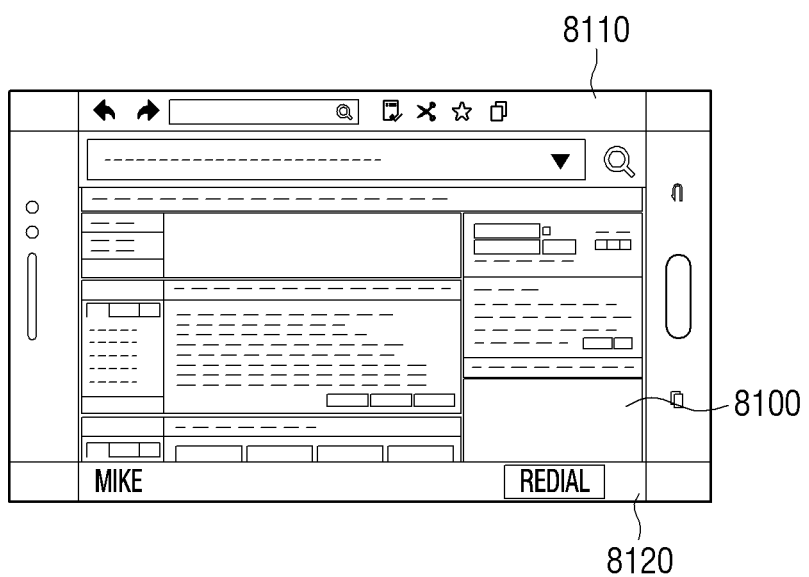

In another embodiment, when the web application is executed, the controller 200 may control the curved display 100 to display a web screen on the main region 8100, display control UI to control the web screen on the first sub region 8110, and display user's frequently used shortcut icons on the second sub region 8120, as illustrated in FIG. 81A. Then in response to receiving a request for audio telephony from outside, the controller 200 may control the curved display 100 to still display the web screen on the main region 8100, still display the control UI to control the web screen on the first sub region 8110, and display audio telephony reception UI (e.g., caller information, accept icon, reject icon, etc.) on the second sub region 8120, as illustrated in FIG. 81B. Then in response to selecting the accept icon, the controller 200 may control the curved display 100 to still display the web screen on the main region 8100, still display the control UI to control the web screen on the first sub region 8110, and display audio telephony UI (e.g., caller information, call duration, end call, mute sounds, etc.) on the second sub region 8120, as illustrated in FIG. 81C. Then in response to ending the audio telephony call, the controller 200 may control the curved display 100 to still display the web screen on the main region 8100, display the control UI to control the web screen on the first sub region 8110, and display audio telephony redial UI (e.g., caller information, redial icon, audio telephony icon, etc.) on the second sub region 8120, as illustrated in FIG. 81D. Meanwhile, the audio telephony redial UI displayed on the second sub region 8120 may be removed after a preset time (e.g., after 30 seconds), and the user's frequently used shortcut icons may be displayed again on the second sub region 8120.

Meanwhile, the user terminal device 1000 may utilize a plurality of sub regions depending on functions, as listed in Table 1 below.

TABLE 1

| Function | Example of utilizing a plurality of sub regions (first sub region + second sub region) |
| --- | --- |
| Voice recognition function | Voice recognized content text + Function using recognized text/application list |
| Content providing function | Title + Control UI |
| | Book title + Bookmark |
| | Index to previous page + Index to next page |
| External device control function | First external device (e.g., DVD) Control UI + Second external device (e.g., TV) Control UI |
| | First function of external device Control UI(e.g., Air conditioner Temp) + Second function of external device Control UI(e.g., Air conditioner capacity) |
| Wallet function | Barcode + Info (e.g., Balance, Deadline) |
| | Info for viewing by cashier (e.g., amount) + Info for viewing by myself (e.g., Authentication screen) |
| | (Barcode is displayed on sub region even when main screen is off) |
| Health management function | Language to translate + Translated language |
| | Normal heart beat range + Measured heart beat data |
| | Heart beat data for yesterday + Current heart beat data |
| Translation function | Calories intake + Calories burnt |
| | Actual activity + Target activity |
| Auto vehicle-related function | Final destination + Current location |
| | Recent destination history + Favorites |
| | Estimated time of arrival + Actual status info |
| | Control menu for driver + Control menu for passenger |
| Gallery function | Time information of when photography was taken + Location information of where photography was taken |
| | Thumbnail of previous photo + Thumbnail of next photo |
| Emergency call function | List of friends who are playing back together + Friends available for invitation |
| Group playback function | |
| Group wireless communication function | Human face + Sound wave |
| Search function | Search window + Search result (App. Icons & number of searched apps.) |

TABLE 1-continued

| Function | Example of utilizing a plurality of sub regions (first sub region + second sub region) |
|---|---|
| Handy connection function | Connected device (Incl. Disconnect icon) + Connectible device (Incl. Connect icon) |
| Content share function | Overall transmission status + Transmission of currently-downloaded file |
| Download function | |
| Weather info. Providing function | Weather for yesterday + Weather for today<br>Specific weather today + Summary weather for a week |
| Social magazine function | Theme index + Comment info (Human face/ID, Display on main region upon tapping) |
| Search word providing function | Real-time hot search word + Location/age-based hot search word |
| Basic function | Favorite contacts + Index<br>Person waiting for call + Person currently in call<br>Camera mode + Camera set value WWJF<br>Time info. for my country + Time info. for country for roaming<br>Gallery control function + Thumbnail info. |

Further, while the first function is being performed, in response to inputting a trigger signal to perform the second function, the user terminal device 1000 may control the main region and a plurality of sub regions according to types of the first and second functions. The functions herein may include functions utilizing images (e.g., web screen providing function, photographing function, etc.), functions utilizing images and audio (e.g., video providing function, video telephony function, etc.), functions utilizing audio (e.g., music providing function, audio telephony function, etc.), and other notification event providing functions (e.g., schedule notification, text message arrival notification, etc.)

Embodiments of controlling main region and a plurality of sub regions will be explained according to types of the functions, with reference to Tables 2 to 5. Table 2 is provided to explain an embodiment in which the controller 200 controls the main region and a plurality of sub regions, in response to performing the image-utilizing function while another function is already being performed.

TABLE 2

| Existent function/new function | Image-utilizing function (e.g., photographing function) |
|---|---|
| Image-utilizing function (e.g., web screen providing function) | Image collision<br>Images provided by the existent function are removed from the main region.<br>Images provided by the new function are provided on main region and a plurality of sub regions. |
| Function utilizing images/audio (e.g., video providing function) | Image collision<br>Audio provided by existent function is continuously outputted.<br>Images provided by new function are provided on main region and a plurality of sub regions. |
| Audio-utilizing function (e.g., music providing function) | No collision<br>Audio provided by existent function is maintained, and images provided by existent function are provided on the first sub region.<br>Images provided by new function are provided on main region and second sub region. |
| Notification event function (e.g., schedule notification function) | No collision<br>Images provided by existent function are provided on first sub region.<br>Images provided by new function are provided on main region and second sub region. |

Table 3 is provided to explain an embodiment in which the controller 200 controls the main region and a plurality of sub regions, in response to performing the function that utilizes images and audio while another function is already being performed.

TABLE 3

| Existent function/new function | Function utilizing images/audio (e.g., video telephony function) |
|---|---|
| Image-utilizing function (e.g., web screen providing function) | Image collision<br>Images provided by the existent function are removed.<br>Images provided by the new function are provided on main region and a plurality of sub regions, and audio provided by new function is outputted. |
| Function utilizing images/audio (e.g., video providing function) | Image and audio collisions<br>Images and audio provided by existent function are removed.<br>Images provided by the new function are provided on main region and a plurality of sub regions, and audio provided by new function is outputted. |
| Audio-utilizing function (e.g., music providing function) | Audio collision<br>Audio provided by existent function is removed, and images provided by existent function are provided on the first sub region.<br>Audio provided by new function is outputted, and images provided by new function are provided on main region and second sub region. |
| Notification event function (e.g., schedule notification function) | No collision<br>Images provided by existent function are provided on first subregion.<br>Images provided by new function are provided on main region and second sub region, and audio provided by new function is outputted. |

Table 4 is provided to explain an embodiment in which the controller 200 controls the main region and a plurality of sub regions, in response to performing the audio-utilizing function while another function is already being performed.

TABLE 4

| Existent function/new function | Audio-utilizing function (e.g., audio telephony function) |
|---|---|
| Image-utilizing function (e.g., web screen providing function) | No collision<br>Images provided by the existent function are provided on main region and first sub region.<br>Images provided by the new function are provided on second sub region, and audio provided by new function is outputted. |
| Function utilizing images/audio (e.g., video providing function) | Sound collision<br>Audio provided by existent function is removed, and images provided by existent function are provided on first sub region.<br>Audio provided by the new function is outputted, and images provided by new function are provided on second sub region.<br>Main region outputs one of images provided by existent function/images provided by new function/other images |
| Audio-utilizing function (e.g., music providing function) | Sound collision<br>Audio provided by existent function is removed, and images provided by existent function are provided on main region and first sub region.<br>Images provided by new function are provided on second sub region and audio provided by new function is outputted. |
| Notification event function (e.g., schedule notification function) | No collision<br>Images provided by existent function are provided on first sub region.<br>Images provided by new function are provided on second sub region, and audio provided by new function is outputted.<br>Main region outputs one of images provided by existent function/images provided by new function/other images |

Table 5 is provided to explain an embodiment in which the controller 200 controls the main region and a plurality of sub regions, in response to performing the notification function while another function is already being performed.

| Existent function/new function | Notification event function (e.g., message notification function) |
| --- | --- |
| Image-utilizing function (e.g., web screen providing function) | No collision<br>Images provided by the existent function are provided on main region and first sub region.<br>Images provided by the new function are provided on second sub region |
| Function utilizing images/audio (e.g., video providing function) | No collision<br>Audio provided by existent function is continuously provided, and images provided by existent function are provided on main region and first sub region.<br>Images provided by the new function are provided on second sub region. |
| Audio-utilizing function (e.g., music providing function) | No collision<br>Audio provided by existent function is maintained, and images provided by existent function are provided on first sub region.<br>Images provided by new function are provided on second sub region.<br>Main region outputs one of images provided by existent function/images provided by new function/other images |
| Notification event function (e.g., schedule notification function) | No collision<br>Images provided by existent function are provided on first sub region.<br>Images provided by new function are provided on second sub region.<br>Main region outputs one of images provided by existent function/images provided by new function/other images |

Hereinafter, referring to FIGS. 82A to 84B, a method for providing a UI to a sub area according to whether a user terminal device is gripped or not will be explained.

The controller 200 may control the flexible display 100 to display a UI of an application on a sub area. Herein, the UI displayed on the sub area may be different from a UI of an application displayed on a main screen. To be specific, the UI displayed on the sub area may provide the number of UI elements less than the UI displayed on the main area. Also, the UI displayed on the sub area may provide a UI element which is smaller than a UI element provided from the UI displayed on the main area. Further, the UI displayed on the sub area may provide a UI element in a simpler shape than a UI element provided from the UI displayed on the main area. That is, the UI displayed on the sub area may provide a function which is more limited than the UI displayed on the main area.

The controller 200 may provide a UI displayed on a sub area by detecting whether the user terminal device 1000 is gripped or not. To be specific, if it is detected that the user terminal device 1000 is not gripped while a specific application is executed or a specific event is generated, the controller 200 may control the flexible display 100 to display a UI of an application or a UI of an event on an entire screen of a plurality of sub areas. If it is detected that the user terminal device 1000 is gripped, the controller 200 may control the flexible display 100 to control and display at least one among a location, a shape and the number of UI elements included in a UI of an application or a UI of an event provided to an entire screen of a plurality of sub areas. To be specific, if it is detected that the user terminal device 1000 is gripped by a user's hand, the controller 200 may control the flexible display 100 to move a location of a UI element provided to an entire screen of a plurality of sub areas to an area which is not covered by a user's hand, and to display the UI element. If it is detected that the user terminal device 1000 is gripped by a user's hand, the controller 200 may control the flexible display 100 to remove at least one of a plurality of UI elements provided to an entire screen of a plurality of sub areas. Also, if it is detected that the user terminal device 1000 is gripped by a user's hand, the controller 200 may control the flexible display 100 to simplify and provide the shape of a plurality of UI elements provided to an entire screen of the plurality of sub areas. Meanwhile, an area which is not covered by a user's hand may be detected by a touch sensor, but this is one of examples, and it may be an area predetermined by a user (for example, an upper area).

Figure 82A:
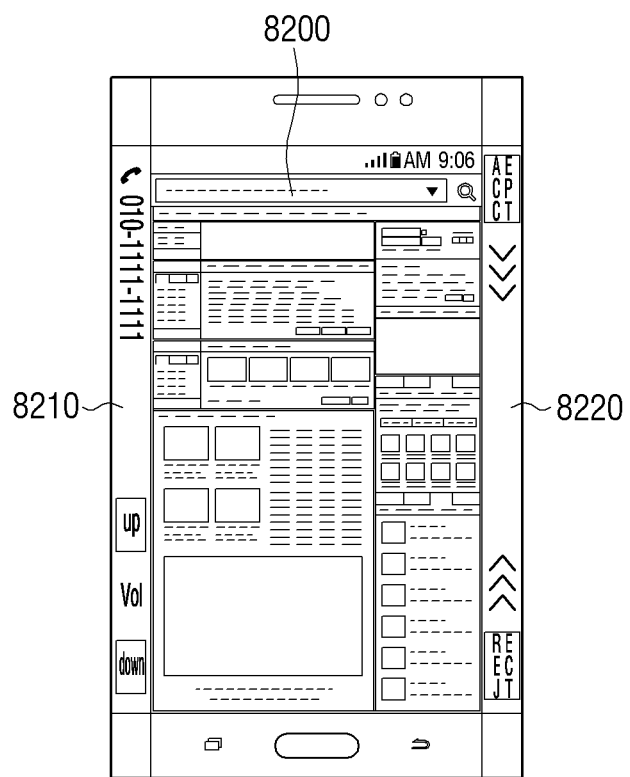
Figure 82B:
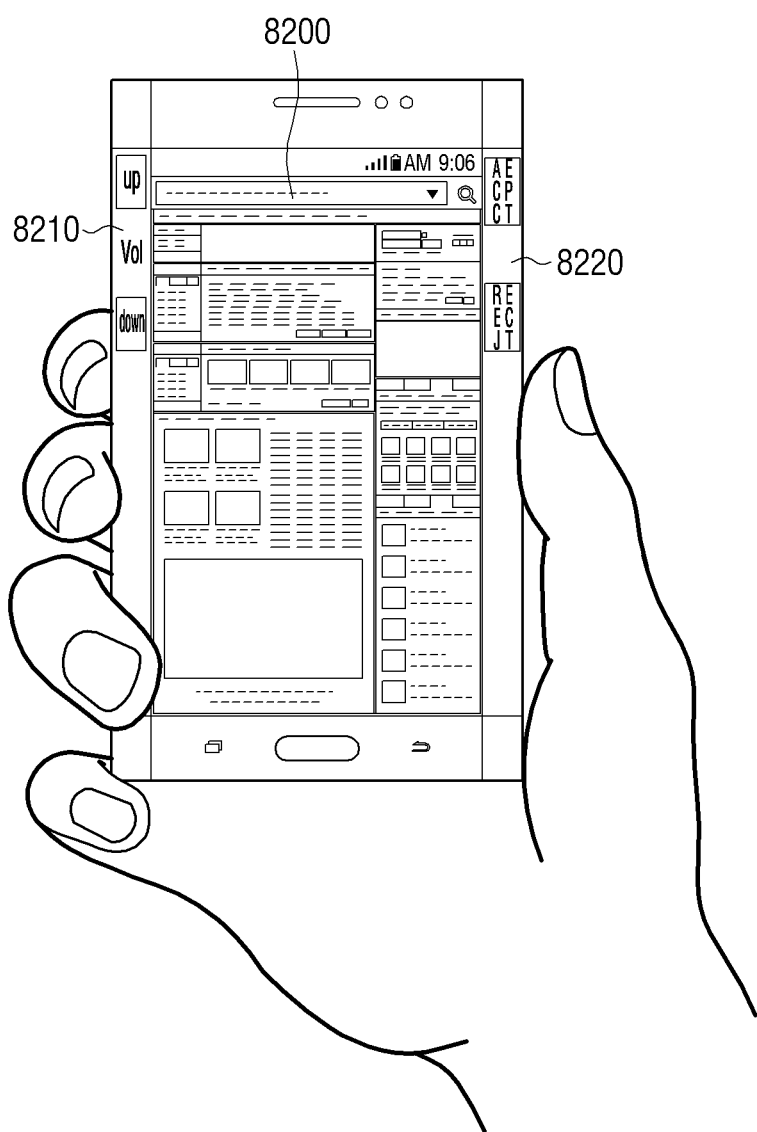

According to a detailed exemplary embodiment, if there is a request to receive telephone call from outside while a user does not grip the user terminal device 1000, the controller 200 may control the flexible display 100 to display a telephone number of a caller, and a volume adjustment icon on the first sub area 8310, and to display an accept icon and a reject icon on the second sub area 8320 as illustrated in FIG. 82A. Herein, if it is detected that the user terminal device 1000 is gripped by a user's hand, the controller 200 may control the flexible display 100 to display a volume adjustment icon on an upper area which is not covered by the user's hand among the first sub area 8210, and to display an accept icon and a reject icon on an upper area which is not covered by the user's hand among the second sub area 8220 as illustrated in FIG. 82b. That is, if a user grips the user terminal device 1000, a location of a UI element provided to a sub area is changed to an area which is not covered by a user's hand, the number of UI elements is reduced, and a shape of a UI element is simplified (for example, an arrow is deleted).

Figure 83A:
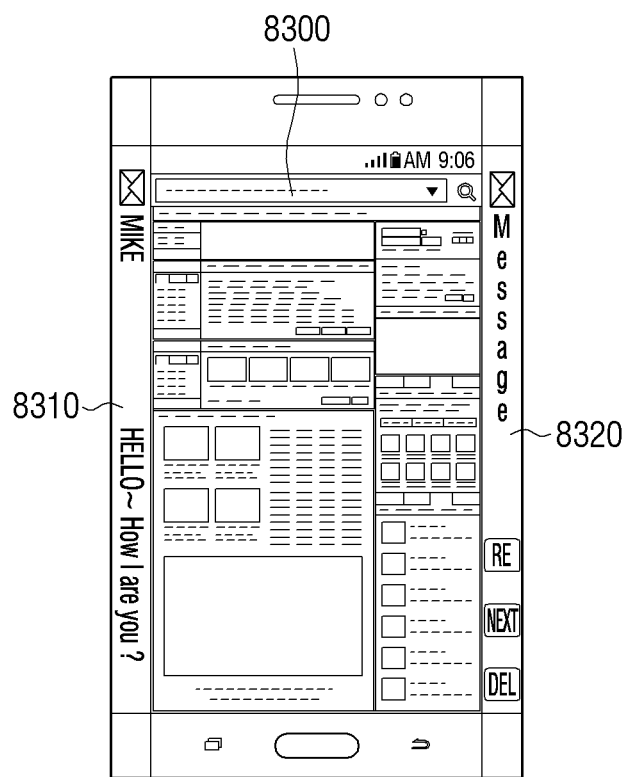
Figure 83B:
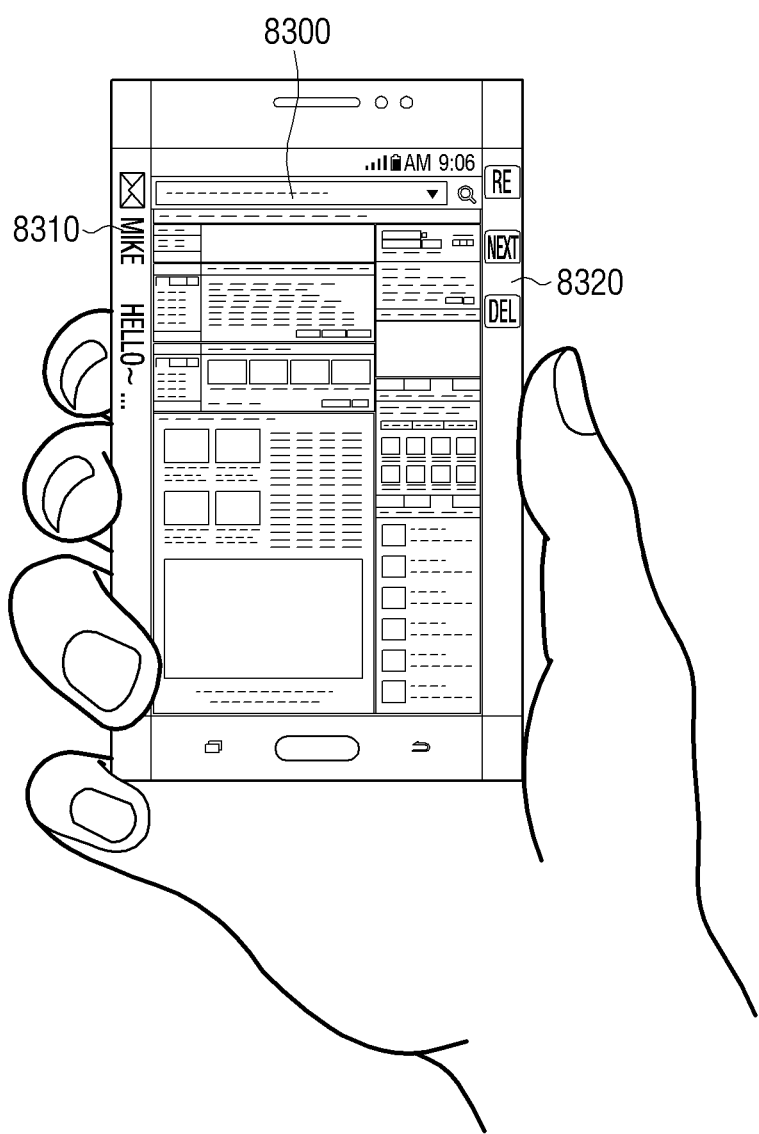

According to another exemplary embodiment, if a message is received from outside while a user does not grip the user terminal device 1000, the controller 200 may control the flexible display 100 to display caller information and content of the message on the first sub area 8310, and display an icon to notify a receipt of a message, a replay icon, a next message icon, a delete icon on the second sub area 8320 as illustrated in FIG. 83A. Herein, if it is detected that the user terminal device 1000 is gripped by a user's hand, the controller 200 may control the flexible display 100 to display caller information and a shortened message content (herein, the message content is scrolled) on an upper area which is not covered by a user's hand among the first sub area 8310, and display a replay icon, a next message icon, a delete icon on an upper area which is not covered by a user's hand among the second sub area 8320 as illustrated in FIG. 83B.

Figure 84A:
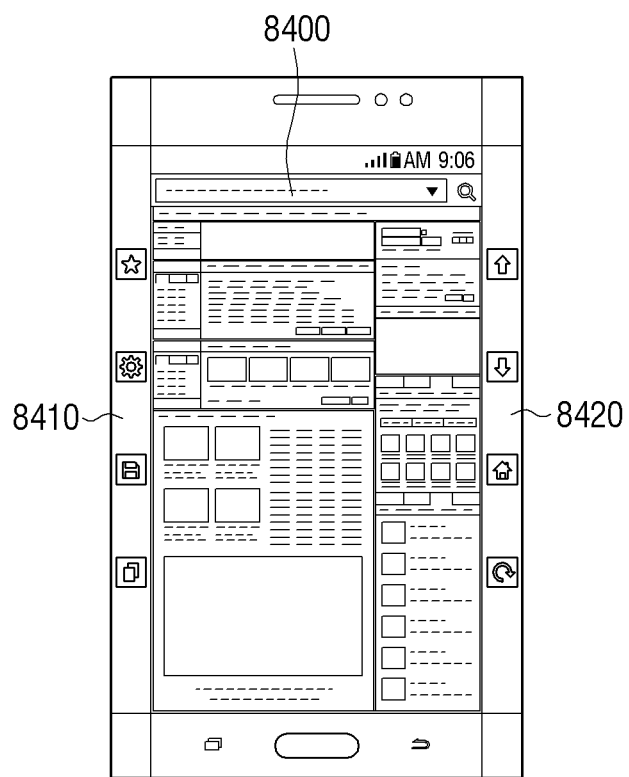
Figure 84B:
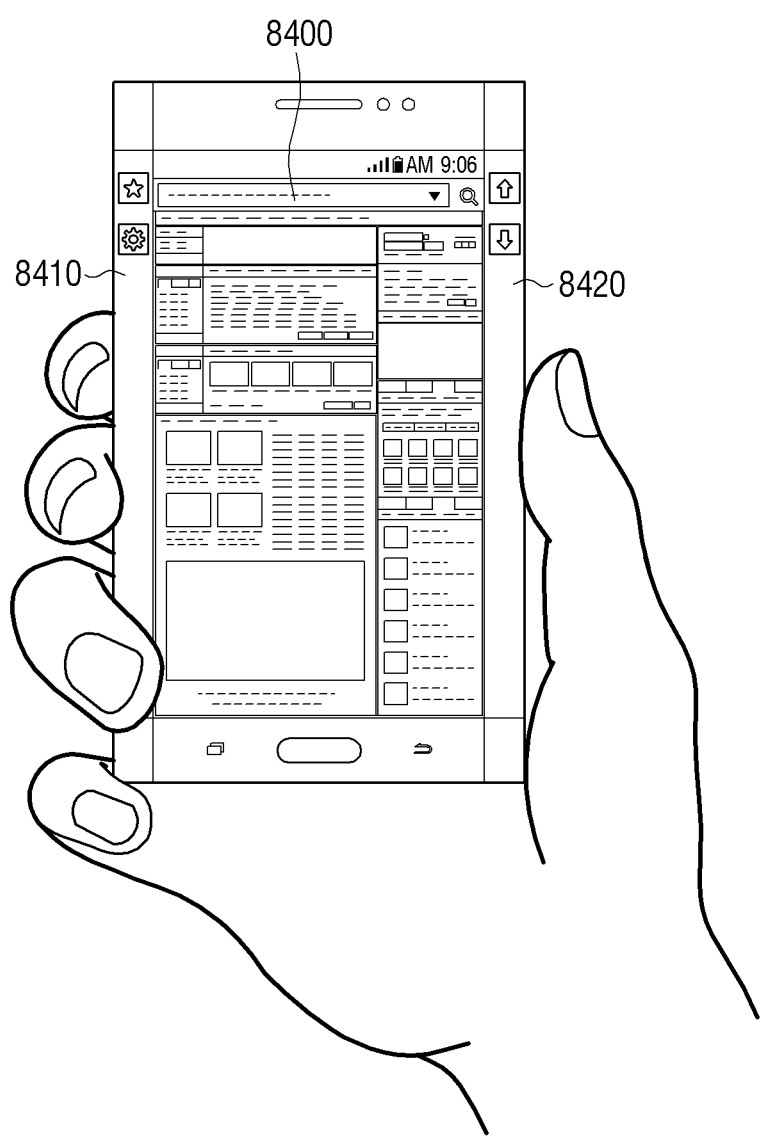

According to another exemplary embodiment, if a web application is executed while the user terminal device 1000 is not gripped by a user, the controller 200 may control the flexible display 100 to display a bookmark icon, a setting icon, a print icon, a store icon on the first sub area 8410, and display a previous icon, a next icon, a home icon, a refresh icon on the second sub area 8420 as illustrated in FIG. 84A. Herein, if it is detected that the user terminal device 1000 is gripped by a user's hand, the controller 200 may control the display to display a bookmark icon and a setting icon on an upper area which is not covered by a user's hand among the first sub area 8410, and to display a previous icon and a next icon on an upper area which is not covered by a user's hand among the second sub area 8420 as illustrated in FIG. 84B.

As explained above, if a user grips the user terminal device 1000, a location, a shape, and the number of UI elements are changed, and thus, the user may remove an icon covered by a user's hand and control the device by a user's hand (especially, a thumb).

However, the exemplary embodiments above are one of exemplary embodiments, and other applications may be applied to the technical spirit of the present invention. For example, if a camera application is executed while the user terminal device 1000 is gripped by a user's hand, the controller 200 may control the flexible display 100 to display a stop image shooting button and a video shooting button on an upper area which is not covered by a user's hand among the first sub area, and to display a gallery button on an upper area which is not covered by a user's hand among the second sub area. Also, if a music application is executed while the user terminal device 1000 is gripped by a user's hand, the controller 200 may control the flexible display 100 to display a volume adjustment icon on an upper area which is not covered by a user's hand among the first sub area, and to display a previous music icon, a next music icon and a pause icon on an upper area which is not covered by a user's hand among the second sub area.

It is explained that a UI is displayed on all of a plurality of sub areas while a user grips the user terminal device 1000, but this is one of examples, and displaying a UI on only one sub area among a plurality of sub areas may be included in the technical spirit of the present invention.

Meanwhile, the control method of a user terminal device 1000 according to various embodiments may be implemented as a program and provided on a display device or an input device. The program including a control method of a display device may particularly be stored and provided on a non-transitory computer readable medium.

The non-transitory computer readable recording medium refers to a medium which store data semi-permanently and can be read by devices, rather than a medium that stores data temporarily, such as, register, cache, or memory. Specifically, the above various applications or programs may be stored and provided on a non-transitory computer readable recording medium such as CD, DVD, hard disk, Blu-ray disk, USB, memory card, or ROM.

Further, the foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. An electronic device, comprising:
   a touch display comprising a main region and curved regions, the curved regions comprising a first curved region extending from the main region in a first direction towards a left side of a front surface of the electronic device and a second curved region extending from the main region in a second direction towards a right side of the front surface of the electronic device; and
   one or more processors configured to:
      display a first screen corresponding to a first application on the main region, and control the touch display to display a first user interface (UI) element on at least one of the first curved region or the second curved region; and
      based on the first UI element being touched and dragged in a direction toward a physical location of the main region, control the touch display to display a second UI element corresponding to the first UI element.

2. The electronic device as claimed in claim 1, wherein the one or more processors are further configured to, based on the first UI element being touched and dragged in the direction of the main region, control the touch display to display the second UI element corresponding to the first element on the main region.

3. The electronic device as claimed in claim 1, wherein the second UI element is displayed on the first screen.

4. The electronic device as claimed in claim 1, wherein the second UI element is displayed near the first UI element in the main region.

5. The electronic device as claimed in claim 1, wherein the second UI element is displayed in full screen.

6. A method of displaying different applications on an electronic device, the electronic device comprising a touch display comprising a main region and a curved regions, the curved regions comprising a first curved region extending from the main region in a first direction towards a left side of a front surface of the electronic device and a second curved region extending from the main region in a second direction towards a right side of the front surface of the electronic device, the method comprising:
   displaying a first screen corresponding to a first application on the main region, and control the touch display to display a first user interface (UI) element on at least one of the first curved region or the second curved region; and
   based on the first UI element being touched and dragged in a direction toward a physical location of the main region, displaying a second UI element corresponding to the first UI element.

7. The method as claimed in claim 6, wherein the displaying the second screen comprises, based on the first UI element being touched and dragged in the direction of the main region, displaying the second UI element corresponding to the first element on the main region.

8. The method as claimed in claim 6, wherein the second UI element is displayed on the first screen.

9. The method as claimed in claim 6,
   wherein the second UI element is displayed near the first UI element in the main region.

10. The method as claimed in claim 6, wherein the second UI element is displayed in full screen.

11. The electronic device as claimed in claim 1, wherein the first screen is displayed such that a left side and a right side of the first screen respectively correspond to the left side and the right side of the front surface.

12. The method as claimed in claim 6, wherein the first screen is displayed such that a left side and a right side of the first screen respectively correspond to the left side and the right side of the front surface.

13. An electronic device, comprising:
a touch display comprising a main region and curved regions, the curved regions comprising a first curved region extending from the main region in a first direction towards a first side of a front surface of the electronic device and a second curved region extending from the main region in a second direction towards a second side of the front surface of the electronic device; and
one or more processors configured to:
in response to a first touch interaction to touch one point of one of the first and second curved regions and move in a direction toward a physical location of the main region being detected, control the touch display to display a first UI at a first area corresponding to the touched curved region, and
control the touch display to remove the first UI displayed in the first area and display a second UI including a plurality of icons corresponding to a plurality of applications on a second area corresponding to the touched curved region.

14. The electronic device of claim 13, wherein the second UI is displayed near the first area where the first UI is displayed.

15. The electronic device of claim 13, wherein the at least one processor is further configured to, in response to a second touch interaction to touch one point of the main region and move in a direction toward the touched curved region being detected while the second UI is being displayed, control the touch display to remove the second UI.

16. The electronic device of claim 13, wherein the at least one processor is further configured to, in response to one of the plurality of icons being selected while the second UI is being displayed, control the touch display to display an application screen corresponding to the selected icon on at least a part of the main region.

17. The electronic device of claim 16, wherein the at least one processor is further configured to:
in response to the one of the plurality of icons being selected while the second UI is being displayed, control the touch display to display a first screen of an application corresponding to the selected icon on a part of the main region, and
in response to the first screen being selected, control the touch display to display a second screen of the application corresponding to the selected icon on the main region,
wherein the second screen is larger than the first screen.

18. The electronic device of claim 13, wherein the first area comprises a part of the main display area adjacent to the touched curved region and the second area comprises a part of the main display area adjacent to the touched curved region.

19. A method of displaying applications on an electronic device, the electronic device comprising touch display comprising a main region and curved regions, the curved regions comprising a first curved region extending from the main region in a first direction towards a first side of a front surface of the electronic device and a second curved region extending from the main region in a second direction towards a second side of the front surface of the electronic device, the method comprising:
in response to a first touch interaction to touch one point of one of the first and second curved regions and move in a direction toward a physical location of the main region being detected, displaying a first UI at a first area corresponding to the touched curved region; and
removing the first UI displayed in the first area and displaying a second UI including a plurality of icons corresponding to a plurality of applications on a second area corresponding to the touched curved region.

20. The method of claim 19, wherein the second UI is displayed near the first area where the first UI is displayed.

21. The method of claim 19, comprising:
in response to a second touch interaction to touch one point of the main region and move in a direction toward the touched curved region being detected while the second UI is being displayed, removing the second UI.

22. The method of claim 19, comprising:
in response to one of the plurality of icons being selected while the second UI is being displayed, displaying an application screen corresponding to the selected icon on at least a part of the main region.

23. The method of claim 22, wherein the displaying the screen of the application on at least a portion of the main region comprises:
in response to the one of the plurality of icons being selected while the second UI is being displayed, displaying a first screen of an application corresponding to the selected icon on a part of the main region; and
in response to the first screen being selected, controlling the touch display to display a second screen of the application corresponding to the selected icon on the main region,
wherein the second screen is larger than the first screen.

24. The method of claim 19, wherein the first area comprises a part of the main display area adjacent to the touched curved region and the second area comprises a part of the main display area adjacent to the touched curved region.

25. A non-transitory computer-readable recording medium having embodied thereon a program, which when executed by a processor of an electronic device causes the electronic device comprising touch display comprising a main region and curved regions, the curved regions comprising a first curved region extending from the main region in a first direction towards a first side of a front surface of the electronic device and a second curved region extending from the main region in a second direction towards a second side of the front surface of the electronic device, the method comprising:
in response to a first touch interaction to touch one point of one of the first and second curved regions and move in a direction toward a physical location of the main region being detected, displaying a first UI at a first area corresponding to the touched curved region; and
removing the first UI displayed in the first area and displaying a second UI including a plurality of icons corresponding to a plurality of applications on a second area corresponding to the touched curved region.

26. The non-transitory computer-readable recording medium according to claim 25,
wherein the second UI is displayed near the first area where the first UI is displayed.

27. The non-transitory computer-readable recording medium according to claim 25, comprising:
   in response to a second touch interaction to touch one point of the main region and move in a direction toward the touched curved region being detected while the second UI is being displayed, removing the second UI.

28. The non-transitory computer-readable recording medium according to claim 25,
   in response to one of the plurality of icons being selected while the second UI is being displayed, displaying an application screen corresponding to the selected icon on at least a part of the main region.

29. The non-transitory computer-readable recording medium according to claim 28,
   wherein the displaying the screen of the application on at least a portion of the main region comprises:
   in response to the one of the plurality of icons being selected while the second UI is being displayed, displaying a first screen of an application corresponding to the selected icon on a part of the main region; and
   in response to the first screen being selected, controlling the touch display to display a second screen of the application corresponding to the selected icon on the main region,
   wherein the second screen is larger than the first screen.

30. The non-transitory computer-readable recording medium according to claim 25, wherein the first area comprises a part of the main display area adjacent to the touched curved region and the second area comprises a part of the main display area adjacent to the touched curved region.

* * * * *